(12) United States Patent
Ahern et al.

(10) Patent No.: US 6,235,067 B1
(45) Date of Patent: *May 22, 2001

(54) COMBUSTION OF NANOPARTITIONED FUEL

(75) Inventors: Brian S. Ahern, Boxboro; Harry R. Clark, Jr., Townsend; Keith H. Johnson, Cambridge, all of MA (US)

(73) Assignee: Massachusetts Institute of Technology, Cambridge, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/933,787

(22) Filed: Sep. 19, 1997

Related U.S. Application Data

(63) Continuation of application No. 08/500,710, filed on Jul. 11, 1995, now abandoned, which is a continuation-in-part of application No. 08/331,014, filed on Oct. 28, 1994, now Pat. No. 5,674,632, which is a division of application No. 08/086,821, filed on Jul. 2, 1993, now Pat. No. 5,411,654.

(51) Int. Cl.$^7$ ....................................................... B01J 13/00
(52) U.S. Cl. ............................................................. 44/301
(58) Field of Search ........................... 44/301, 302, 451; 123/305; 516/53

(56) References Cited

U.S. PATENT DOCUMENTS

| Re. 35,237 | 5/1996 | Gunnerman | 123/1 |
| 2,461,580 | * 2/1949 | Wiczer et al. | 44/302 |
| 3,539,406 | 11/1970 | Lissant | 149/109 |

(List continued on next page.)

FOREIGN PATENT DOCUMENTS

| 0059359 | 9/1982 | (EP) | B01F/11/02 |
| 0581230 | 2/1994 | (EP) | F23K/5/12 |
| 2109405 | 6/1983 | (GB) | C10L/1/32 |

(List continued on next page.)

OTHER PUBLICATIONS

Microencapsulation Methods and Industrial Applications edited by Simon Benita, Marcel Dekker, Inc., Drugs and the Pharmaceutical Sciences, v. 73 p. 600, 1996.*
Surfactants and Interfacial Phenomena, Milton J. Rosen, John Wiley & Sons, Inc. p. 240, 1978.*

(List continued on next page.)

*Primary Examiner*—Margaret Medley
(74) *Attorney, Agent, or Firm*—Theresa A. Lober

(57) ABSTRACT

The invention provides a scheme for combusting a hydrocarbon fuel to generate and extract enhanced translational energy. In the scheme, hydrocarbon fuel is nanopartitioned into nanometric fuel regions each having a diameter less than about 1000 angstroms; and either before or after the nanopartitioning, the fuel is introduced into a combustion chamber. In the combustion chamber, a shock wave excitation of at least about 50,000 psi and with an excitation rise time of less than about 100 nanoseconds is applied to the fuel. A fuel partitioned into such nanometric quantum confinement regions enables a quantum mechanical condition in which translational energy modes of the fuel are amplified, whereby the average energy of the translational energy mode levels is higher than it would be for a macro-sized, unpartitioned fuel. Combustion of such a nanopartitioned fuel provides enhanced translational energy extraction by way of, e.g., a reciprocating piston because only the translational energy mode of combustion products appreciably contributes to momentum exchange with the piston. The shock wave excitation provided by the invention, as applied to combustion of any fuel, and preferably to a nanopartitioned fuel, enhances translational energy extraction and exchange during combustion by enhancing translational energy mode amplification in the fuel and by enhancing transfer of an appreciable amount of energy from that translational mode to the piston before the combusted fuel re-equilibrates the translational energy into other energy modes.

1 Claim, 17 Drawing Sheets

U.S. PATENT DOCUMENTS

| | | | |
|---|---|---|---|
| 3,749,318 | 7/1973 | Cottell | 239/102 |
| 4,046,519 | 9/1977 | Piotrowski | 44/51 |
| 4,048,963 | 9/1977 | Cottell | 123/25 |
| 4,083,698 | 4/1978 | Wenzel et al. | 44/51 |
| 4,084,940 | 4/1978 | Lissant | 44/51 |
| 4,144,015 | 3/1979 | Berthiaume | 431/8 |
| 4,158,551 | 6/1979 | Feuerman | 44/51 |
| 4,203,393 | 5/1980 | Giardini | 123/30 |
| 4,297,107 | 10/1981 | Boehmke | 44/51 |
| 4,355,969 | 10/1982 | Nelson et al. | 431/4 |
| 4,378,230 | 3/1983 | Rhee | 44/51 |
| 4,394,131 | 7/1983 | Marro, Jr. et al. | 44/51 |
| 4,395,266 | 7/1983 | Han | 44/51 |
| 4,396,400 | 8/1983 | Grangette et al. | 44/75 |
| 4,465,494 * | 8/1984 | Bourel et al. | 44/302 |
| 4,510,914 | 4/1985 | Purser | 123/590 |
| 4,565,548 * | 1/1986 | Davis et al. | 44/302 |
| 4,568,354 * | 2/1986 | Davis et al. | 44/302 |
| 4,589,398 | 5/1986 | Pate et al. | 123/596 |
| 4,599,088 * | 7/1986 | Davis et al. | 44/302 |
| 4,629,472 | 12/1986 | Haney, III et al. | 44/51 |
| 4,666,457 | 5/1987 | Hayes et al. | 44/51 |
| 4,696,638 | 9/1987 | DenHerder | 431/4 |
| 4,804,495 | 2/1989 | Bouchez et al. | 252/312 |
| 4,821,757 | 4/1989 | Hayes et al. | 137/13 |
| 4,834,775 | 5/1989 | Rodriguez et al. | 44/51 |
| 4,877,414 | 10/1989 | Mekonen | 44/51 |
| 4,908,154 * | 3/1990 | Cook et al. | 44/302 |
| 5,000,757 | 3/1991 | Puttock et al. | 44/301 |
| 5,004,479 * | 4/1991 | Schon et al. | 44/302 |
| 5,027,764 | 7/1991 | Reimann | 123/143 B |
| 5,122,353 | 6/1992 | Valentine | 423/244 |
| 5,148,776 | 9/1992 | Connor | 123/25 |
| 5,237,964 | 8/1993 | Tomoiu | 123/25 |
| 5,245,953 | 9/1993 | Shimada et al. | 123/25 |
| 5,249,957 | 10/1993 | Hirata | 431/354 |
| 5,284,492 | 2/1994 | Dubin | 44/301 |
| 5,298,230 | 3/1994 | Argabright et al. | 423/239 |
| 5,344,306 | 9/1994 | Brown et al. | 431/4 |
| 5,372,613 | 12/1994 | Mekonen | 44/301 |
| 5,688,761 * | 11/1997 | Owens et al. | 424/400 |

FOREIGN PATENT DOCUMENTS

| | | | |
|---|---|---|---|
| 58-091796 | 5/1983 | (JP) | C10L/1/32 |
| 8301210 | 4/1983 | (WO) | B01J/13/00 |
| 9010149 | 9/1990 | (WO) | F02M/25/00 |

OTHER PUBLICATIONS

Emulsions Fundamentals and Applications in the Petroleum Industry, edited by Laurier L. Schramm, ACS, Washington, DC., Advances in Chemistry Series 231, p. 7. 1992.*

Law, "A Model for the Combustion of Oil/Water Emulsion Droplets," *Combustion Science and Technology*, vol. 17, pp. 29–38, 1977. Month unknown.

Talisman et al., "Development of Water–Gasoline Emulsions," *Khimiya I Teknologiya Topliv i Masel*, No. 8, pp. 27–30, Aug., 1980.

Robustov, "Problems and Prospects in use of Emulsified Fuels," *Khimiya I Teknologiya Topliv I Masel*, No. 9, pp. 18–20, Sep. 1980.

Zavodov et al., "Features of carburetor engine operation on emulsion of water in straight–run gasoline," *Khimiya I Teknoglogiya Topliv I Masel*, No. 11, pp. 56–57, Nov., 1980.

Rajan, "Water–Ethanol–Gasoline Blends–Physical Properties, Power, and Pollution Characteristics," *Journal of Engineering for Gas Turbines and Power*, vol. 106, pp. 841–848, Oct. 1984.

Hsu, "Combustion of water–in–diesel emulsion in an experimental medium speed diesel engine," *SAE Technical Paper Series*, #860300, Detroit, MI, Feb. 24–28, 1986.

Tsao et al., "Puffing and Micro–explosion Phenomena of Water Emulsion Fuels," *SAE Technical Paper Series*, #860304, Detroit, MI, Feb. 24–28, 1986.

Strandell et al., "A review of water emulsified fuel investigations for shipboard applications," *Naval Engineers Journal*, pp. 54–69, Mar., 1986.

Kimoto, "The Vaporizing Behavior of the Fuel Droplet of Water–in–Oil Emulsions on the Hot Surface," *Bulletin of JSME*, vol. 29, No. 258, pp. 4247–4255, Dec. 1986.

Sekar et al., "Effects of Oxygen Enrichment and Fuel Emulsification on Diesel Engine Performance and Emissions," ICE–vol. 15, *Fuels, Controls, & Aftertreatment*, ASME, pp. 21–28, 1991. Month Unknown.

Whaley et al., "An Evaluation of Heavy Oil Emulsions for Potential Industrial Combustion Applications," PD–vol. 36, *Emerging Energy Technology*, ASME, pp. 23–27, 1991. Month unknown.

Harbach et al., "Effects of Emulsified Fuel on Combustion in a Four–Stroke Diesel Engine," *Journal of Ship Research*, vol. 35, No. 4, pp. 356–363, Dec., 1991.

Sawa et al., "Phys. Prop. of Emulsion Fuel (Water/Oil–Type) and Its Effect on Engine Performance under Transient Operation" *SAI Technical Paper Series*, #920198, pp. 97–107, Feb., 1992.

Adiga, "Vaporization and Combustion Behavior of Water–in–Oil Microemulsions of Petroleum Distillates," PD–vol. 41, *Emerging Energy Technology*, ASME, pp. 9–14, 1992. Month Unknown.

Brown et al., "Long–Term $NO_x$ Control. Demo. of Turbino$_x$ Light Oil Emulsion Proc. in Oil and Dual Fueled Combustion Turbines," IGTI–vol. 7 *ASME Cogen–Turbo*, ASME, pp. 521–527, 1992 Month Unknown.

Zhou et al., "Emulsified Fuels Atomization Study with High Speed Photographic Technology," PD–vol. 50, *Emerging Energy Technology*, ASME, pp. 23–30, 1993. Month Unknown.

Vander Wal et al., "Laser–Induced incandescence applied to droplet combustion," *Applied Optics*, vol. 34, No. 6, pp. 1103–1107, Feb. 20, 1995.

Sekar et al., "Diesel engine experiments with oxygen enrichment, water addition and lower–grade fuel," *Proc. 25 Intersociety Energy Conv. Eng. Conf.*, vol. 4, pp. 320–325, Aug. 12–17, 1990.

Kyoji et al., "Observation of Combustion Behavior for Single Droplets of Water–in–Oil Emulsified Fuels," *Trans. of the Japan Society of Mech. Engs.*, V. 60, N. 574, pp. 2216–2222, 1994. Month Unknown Considered Only English Abstract.

Yasufumi et al., "Studies on the microexplosion of emulsified fuels," *Trans. of the Japan Society of Mech. Engs.*, V. 55, N. 519, pp. 3538–3543, 1989 Considered Only English Abstract Month Unknown.

Jido, "Study of Electrostatically Combined Droplet," *Journal of Mechanical Engineering Laboratory*, V. 40, N. 5, pp. 224–233, Sep. 1986. Considered Only English Abstract.

PCT Written Opinion under PCT Rule 66, Aug. 6, 1997, for International Application No. PCT/US96/11474.

Caponetti et al., "Effect of Surfactant Neutralization on Hexadecane/Water/1–Pentanol/Oleic Acid/Ethanolamine Microemulsions–A SANS Study," *Langmuir*, V. 4, N. 3, pp. 606–610. 1988.

Caponetti et al., "Effect of Composition on Sizes of W/O Ethanolamine–Oleic Acid Microemulsions by Small–Angle Neutron Scattering," *Langmuir*, V. 5, N. 2, pp. 357–363, 1989.

Griffith et al., "Correlating Microemulsion Fuel Composition, Structure, and Combustion Properties," Oak Ridge National Lab, Publ. TAO–2942, 017779, ORNL/TM–11248, Dec. 1989.

* cited by examiner

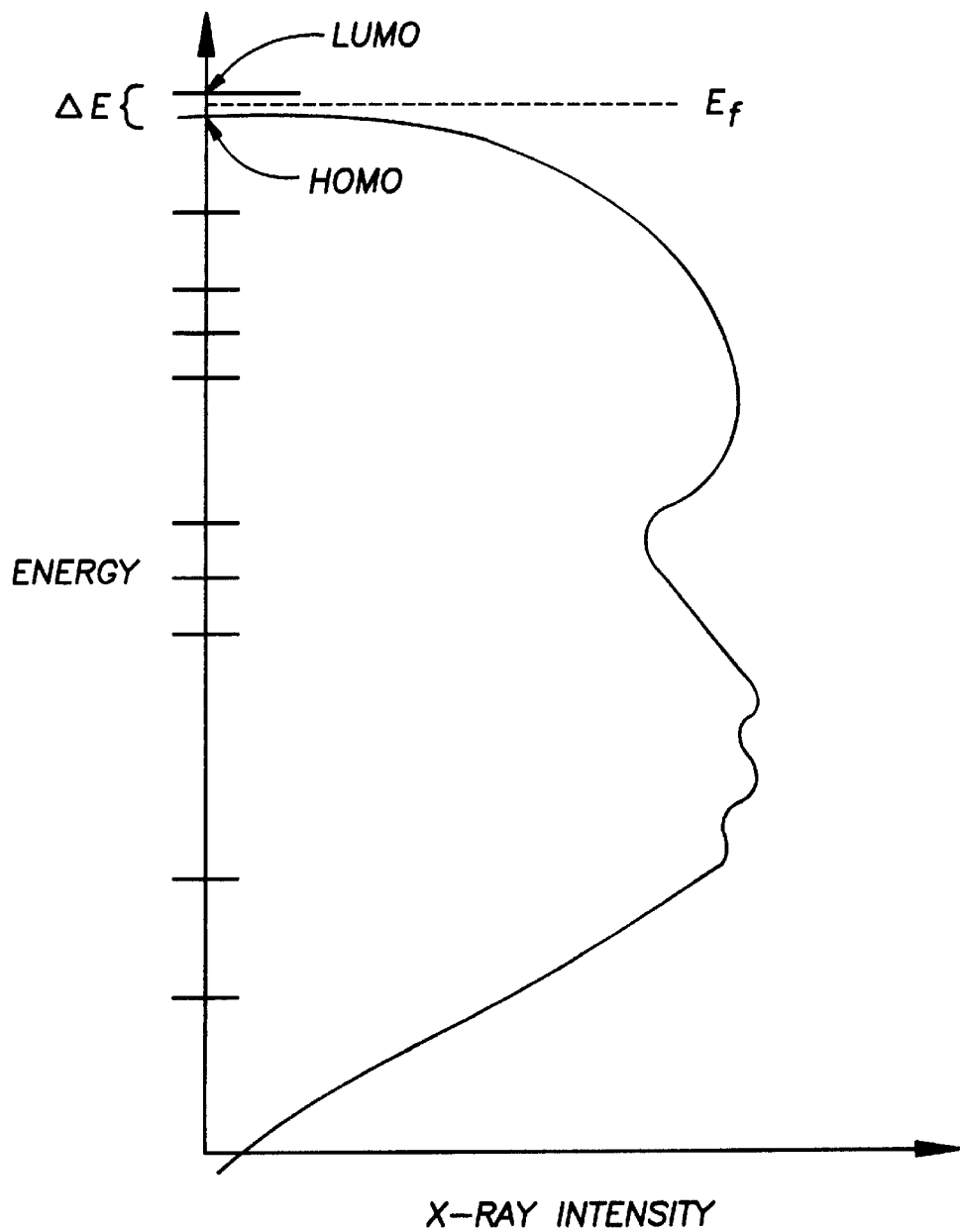

PERCENT BOND OVERLAP OF ELECTRON MOLECULAR
ORBITAL OF SECOND NEAREST NEIGHBOR HYDROGEN
ATOMS NEAR FERMI ENERGY

COPPER   NICKEL   PALLADIUM

COMBUSTION OF NANOPARTITIONED FUEL

This application is a continuation of application Ser. No. 08/500,710, filed on Jul. 11, 1995, now abandoned, which in turn is a continuation in part of application Ser. No. 08/331,014, filed Oct. 28, 1994 now issued as U.S. Pat. No. 5,674,632, which in turn is a divisional of application Ser. No. 08/086,821, filed Jul. 2, 1993, now issued as U.S. Pat. No. 5,411,654.

GOVERNMENT RIGHTS IN THE INVENTION

This invention was made with U.S. Government support under contract No.

F19628-95-C-0002, awarded by the Air Force. The U.S. Government has certain rights in this invention.

FIELD OF THE INVENTION

This invention relates to hydrocarbon fuels, and more particularly relates to hydrocarbon fuel compositions and techniques for combusting such hydrocarbon fuel compositions.

BACKGROUND OF THE INVENTION

Classical thermodynamic analyses of combustion processes consider only the combustion end states, due to an inability to analyze the high-speed, high-temperature chemical processes that occur before the end states are reached during the combustion event. As a result, accepted combustion analyses typically combine energy conservation laws with the requirement for end state equilibrium conditions to determine the range of energies expected to be available and accessible to the combustion products produced in an internal combustion engine.

Historically, it has been demonstrated that the efficiency of a combustion process increases slightly with increasing pressures. This increased efficiency has been attributed to the fact that most chemical reactions involved in combustion are known to proceed more completely when the pressure of the reaction is increased. It is also historically known that diesel combustion engines tend to produce more efficient combustion when the ratio of fuel with respect to air injected into the engine is decreased, in a fuel-air composition known as a lean-burn fuel mixture. It has additionally been demonstrated that the combustion event, being inherently an exothermic process, proceeds more completely at low temperatures relative to high temperatures. This has important consequences in that it is also well-known that production of unwanted combustion by-products, such as CO, $H_2$, OH, H, O, and $NO_x$, increases as the temperature of the combustion event increases.

These three well-known observations suggest that for optimization of combustion efficiency and simultaneous suppression of unwanted by-products like $NO_x$, a combustion process should be controlled to proceed at a relatively high pressure and a relatively low temperature, and should employ a relatively lean fuel mixture. In practice, however, it has been demonstrated historically that lean fuel mixtures produce even higher $NO_x$ levels than conventional fuel-air ratios under normal combustion conditions; and further that high pressure combustion conditions cannot be maintained at low temperatures. This last result is, in fact, predicted by the thermodynamic equilibrium conditions and end-state analysis on which classical combustion theory is based, as mentioned above.

Combustion technology and its classical theoretical underpinnings have thus heretofore produced only suboptimal fuel compositions and combustion processes.

SUMMARY OF THE INVENTION

In view of the above considerations, the inventors herein have analyzed combustion processes and fuel compositions from a quantum mechanical perspective. Based on this analysis, the inventors have recognized that through purposeful design of fuels and combustion processes to enable quantum mechanical phenomena, large departures from expected equilibrium conditions are achieved that result in temperature and pressure combustion conditions that are unanticipated by classical thermodynamic considerations and that provide combustion engine performance that is superior to prior conventional combustion engine performance.

The invention provides, in one aspect, a method for combusting a hydrocarbon fuel to generate and extract enhanced translational energy, wherein the hydrocarbon fuel is partitioned into nanometric fuel regions having a diameter less than about 1000 angstroms, and either before or after the nanopartitioning, is introduced into a combustion chamber. A shock wave excitation of at least about 50,000 psi with an excitation rise time of less than about 100 nanoseconds is then applied to the nanopartitioned fuel.

A fuel partitioned into such nanometric regions enables a quantum mechanical condition in which translational energy modes of the fuel are amplified, whereby the average energy of the translational energy mode levels is higher than it would be for a macro-sized, unpartitioned fuel. Combustion of such a nanopartitioned fuel by way of a shock wave excitation provides enhanced translational amplification and enhanced translational energy extraction capabilities.

In preferred embodiments, the combustion chamber has a moveable momentum transducer to which extracted translational energy can be transferred; preferably, this momentum transducer is a reciprocating piston. In preferred embodiments, the shock wave excitation is applied at a time coincident with positioning of the reciprocating piston at a top-dead-center position in the combustion chamber. Because only the translational energy mode of combustion products appreciably contributes to momentum exchange with a reciprocating piston, the amplified translational energy spectra resulting from nanopartitioning of a fuel to be combusted and shock excitation of the fuel, both in accordance with the invention, provides enhanced translational energy and momentum exchange with the piston.

In another aspect, the invention provides a method for combusting a hydrocarbon fuel to generate and extract enhanced translational energy; a hydrocarbon fuel is first introduced into a combustion chamber having a reciprocating piston. Then a first shock wave excitation is applied to the hydrocarbon fuel in the combustion chamber to initiate a combustion event. After initiation of the combustion event, a plurality of shock wave excitations are then applied during the combustion event. Each of the first and plurality of shock waves are at least about 50,000 psi with an excitation rise time of less than about 100 nanoseconds. Additionally, each shock wave excitation is applied in a direction to produce a shock wave front aligned with reciprocating motion of the piston. Preferably, the first shock wave excitation is applied at a time coincident with positioning of the reciprocating piston at a top-dead-center position in the combustion chamber.

In other aspects, the invention provides a combustible fuel consisting of distinct hydrocarbon fuel molecular aggregations. Each such hydrocarbon fuel molecular aggregation has a diameter of less than about 1000 angstroms. Preferably, the hydrocarbon fuel molecular aggregations each have a diameter of less than about 100 angstroms, and more preferably, each hydrocarbon fuel molecular aggregation has a diameter of greater than about 20 angstroms. In other embodiments, the combustible fuel consists of distinct hydrocarbon fuel droplets each having a diameter of less than about 1000 angstroms and greater than about 50 angstroms.

Preferably, the hydrocarbon consists of petroleum or consists of gasoline, in which case an alcohol phase is preferably included. In other preferred embodiments, a second phase that is immiscible with the hydrocarbon fuel is included; the second phase in other embodiments consists of a solvent, which preferably is water. In other preferred embodiments, a surfactant phase is included. In other embodiments, the combustible fuel consists of a water phase and a hydrocarbon fuel phase and the water and fuel phases each consist of distinct molecular aggregations each having a diameter of less than about 1000 angstroms.

The invention provides, in another aspect, an internal combustion engine. The engine provides a combustion chamber and a fuel supply consisting of distinct hydrocarbon fuel molecular aggregations each having a diameter of less than about 1000 angstroms. A fuel supply injector is connected between the hydrocarbon fuel supply and the combustion chamber, and an air intake supply injector is connected to the combustion chamber. The combustion engine further provides a piston slidingly engaged in the combustion chamber and having a piston head oriented parallel with one wall of the combustion chamber. A combustion ignitor is positioned in the one wall of the chamber oriented parallel with the piston head for igniting the hydrocarbon fuel injected into the combustion chamber.

In preferred embodiments, the combustion ignitor consists of a shock wave excitation initiator for igniting the hydrocarbon fuel and for producing a shock wave excitation having a planar shock wave front parallel to the piston head. A shock wave excitation applied in accordance with the invention to combustion of any fuel, and preferably to a nanopartitioned fuel, enhances momentum exchange during the combustion process in at least three ways. First, a shock wave applied to a fuel produces a transient pressure pulse in the fuel, during which translational energy mode amplification is produced. Second, initiation of a planar shock wave front along the translational axis corresponding to that of a piston stroke enhances transfer of momentum to the piston from the one translational mode of the fuel that corresponds to the piston stroke axis. Third, the supersonic speed of the shock wave excitation enhances transfer of an appreciable amount of energy from the fuel before the combusted fuel re-equilibrates and repartitions the enhanced translational energy back into other energy modes.

In another aspect, the invention provides an internal combustion engine having a combustion chamber; a fuel supply injector and an air intake supply injector are connected to the chamber. An amount of hydrocarbon fuel is provided in the combustion chamber, the fuel being characterized by fuel droplets having a diameter of less than about 1000 angstroms. A piston is slidingly engaged in the combustion chamber and has a piston head oriented parallel with one wall of the combustion chamber. A combustion ignitor is positioned in the one wall of the chamber oriented parallel with the piston head for igniting the hydrocarbon fuel injected into the combustion chamber.

In preferred embodiments, the combustion ignitor consists of a shock wave excitation initiator made up of an electrical discharge device, an acoustic transducer, a piezoelectric transducer, or a shock wave excitation initiator characterized by an ability to produce a shock wave excitation of at least about 50,000 psi with an excitation rise time of less than about 100 nanoseconds and an excitation repetition rate of at least about 30 excitations/second.

In other preferred embodiments, the combustion chamber includes a nickel catalyst positioned on a wall of the combustion chamber, a piston in the chamber is characterized by reciprocation in the combustion chamber based on a two-stroke combustion cycle, and the fuel supply injector is made up of an array of injector orifice.

In other aspects, the invention provides a combustion chamber including a fuel supply injector positioned in a wall of the chamber. An amount of hydrocarbon fuel is provided in the chamber, the fuel being characterized by hydrocarbon fuel molecular aggregations having a diameter of less than about 1000 angstroms. A combustion ignitor is positioned in one wall of the chamber for igniting the hydrocarbon fuel injected into the combustion chamber. A moveable momentum transducer is positioned in the chamber for extracting momentum from hydrocarbon fuel combustion in the chamber.

In preferred embodiments, the hydrocarbon fuel contains water, and preferably, the moveable momentum transducer consists of a reciprocating piston. Preferably, the combustion ignitor consists of a shock wave initiator for igniting the hydrocarbon fuel and for producing a shock wave excitation having a planar shock wave front traveling in the direction of extraction by the momentum transducer.

In other aspects the invention provides a combustion chamber having a fuel supply injector that is made up of an array of injector orifice positioned in a wall of the chamber—each orifice has a diameter in the range of microns for injecting an amount of hydrocarbon fuel into the combustion chamber at a pressure of at least about 10,000 psi to partition the injected hydrocarbon fuel into molecular aggregations of less than about 1000 angstroms.

In still other aspects the invention provides a combustion chamber having a fuel supply injector, an air intake supply injector, and a piston slidingly engaged in the combustion chamber and with a piston head oriented parallel with one wall of the combustion chamber. A shock wave excitation initiator is positioned in the one wall of the combustion chamber oriented parallel with the piston head. The shock wave excitation initiator is characterized by a capability to produce a shock wave excitation of at least about 50,000 psi with an excitation rise time of less than about 100 nanoseconds, for partitioning fuel injected into the chamber into molecular aggregations of less than about 1000 angstroms, for igniting the hydrocarbon fuel to initiate a combustion event, and for producing multiple shock wave excitations, during the combustion event, that each have a planar shock wave front parallel to the piston head.

In other aspects, the invention provides a method of surface treatment of a condensed matter host lattice for causing a condensed matter guest species dissolved in the host lattice to undergo dynamic anharmonic oscillations. In the method, host lattice surfaces are treated to provide surface features having a radius of curvature less than about 2000 angstroms on the surfaces, whereby the dissolved guest species undergoes dynamic anharmonic oscillations. Preferably, the host lattice comprises nickel and the guest species comprises deuterium.

The nanopartitioned fuel system and combustion schemes provided by the invention are applicable to a wide range of combustion technologies, including, e.g., internal combustion engines, turbine engines, and jet engines, among others; superior combustion efficiency is provided by the fuel system and combustion schemes of the invention. Other features and advantages of the invention will be apparent from the description of a preferred embodiment, and from the claims.

BRIEF DESCRIPTION OF THE DRAWINGS

FIG. 1 is a rendering of a conventional X-ray photo-spectroscopy plot of X-ray intensity as a function of molecular orbital energy for a hypothetical condensed matter sample;

DESCRIPTION OF A PREFERRED EMBODIMENT

We first present a discussion of anharmonicity in condensed matter. Referring to FIG. 1, there is shown a conventional X-ray photo-spectroscopy plot of X-ray intensity (horizontal axis) as a function of molecular orbital energy (vertical axis) for a hypothetical condensed matter sample. The vertical axis also depicts specific molecular orbital energy levels for the sample. Beginning with the orbital of lowest energy, some number of molecular orbitals of the sample are fully occupied, up to an energy level above which the molecular orbitals are unoccupied. The fully occupied orbitals are each associated with a specific symmetry and steric state. The Fermi energy, $E_f$, is defined as that energy level halfway between the energy level of the highest occupied molecular orbital (HOMO) and that of the lowest unoccupied molecular orbital (LUMO). The energy gap, $\Delta E$, is defined as the energy difference between the energy levels of the HOMO and LUMO.

As the temperature of a sample is increased or radiation is applied to the sample, the population of the HOMO shifts toward the LUMO, and the mean energy of the molecular orbitals shifts a corresponding amount. Under certain arrangements of matter, the HOMO and LUMO can actually co-exist at the same energy level. This condition is referred to as orbital degeneracy. Under degenerate molecular orbital conditions, condensed matter systems generally find it energetically favorable to lower the free energy of the system by dynamically distorting, or in extreme cases, statically distorting to a state of symmetry lower than its existing symmetry state. An example of such a distortion is a cubic material undergoing a trigonal lattice distortion.

This static distortion is one embodiment of the well-known Jahn-Teller effect, relating to condensed matter distortion. According to the Jahn-Teller effect, when electron molecular orbital degeneracy conditions are achieved, both static distortions and dynamic distortions are possible and both result in an energetically more favorable state. Of great importance is the fact that under dynamically degenerate conditions the electrons in the degenerate molecular orbitals can tunnel back and forth in space between degenerate orbitals, centered on separate atoms, at very high rates, where the tunneling rate is denoted as $\omega_c$. The amplitudes of these tunneling oscillations are under certain conditions so large that the positive nuclei of the parent atoms to the tunneling electrons respond to the oscillations in some fashion, i.e., the electron oscillations may couple to the parent nuclei lattice. In this case, the amplitude of the oscillations of the parent nuclei, in response to the electron tunneling oscillations, is termed $\delta$.

Figure 2A:
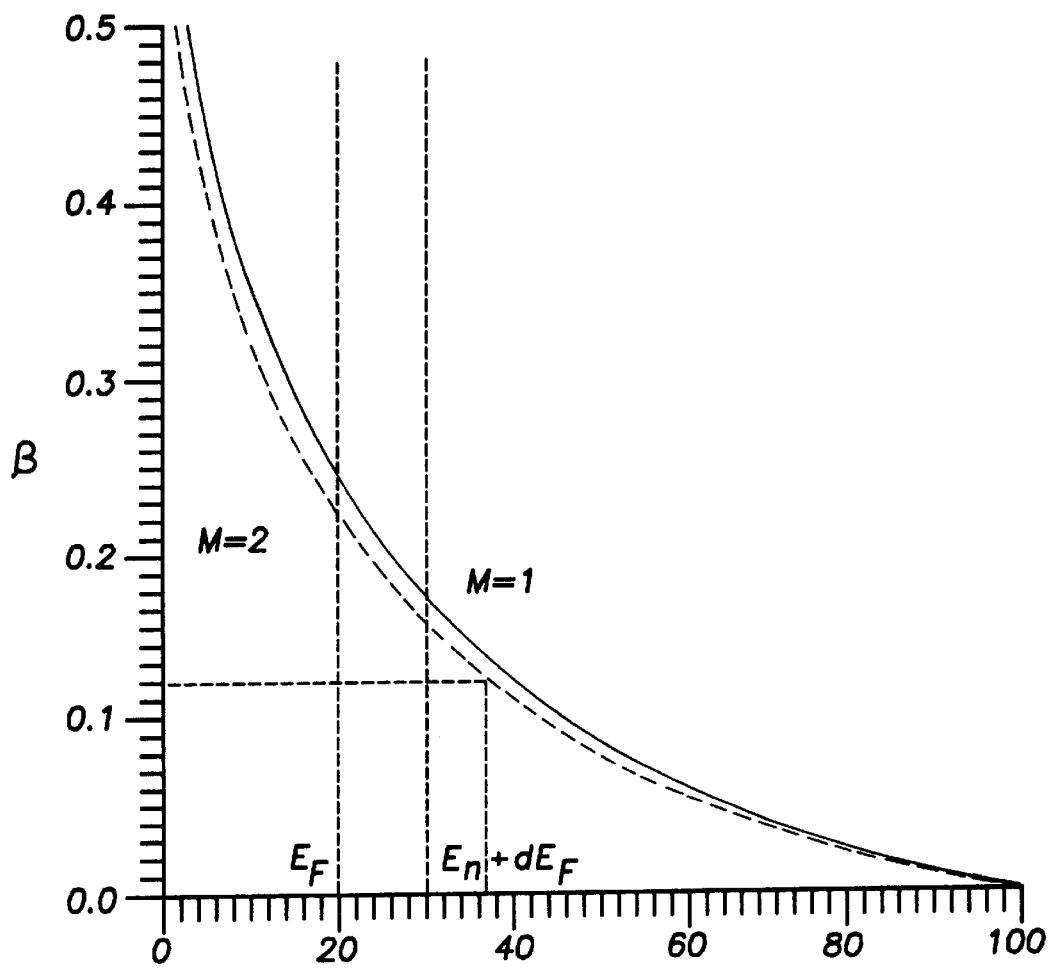
FIG. 2A is a plot of the Jahn-Teller coupling parameter $\beta$ as a function of the percent bond overlap of electron molecular orbitals of second nearest neighbor hydrogen atoms near the Fermi energy.

Referring to FIG. 2A, the Jahn-Teller coupling parameter, $\beta$, characterizes the degree of degeneracy of a particular molecular orbital energy configuration, and correlates that degree to a measure of the electronic molecular orbital overlap of the configuration. The coupling parameter $\beta$ has a range between 0 and ½. For a condensed matter lattice characterized by $\beta=½$, the lattice is not experiencing Jahn-Teller tunneling oscillations, but rather, oscillations are characterized as thermal parabolic oscillations expected of harmonic oscillation behavior. As the local bonding arrangements of the condensed lattice are shifted towards degeneracy, the $\beta$ parameter decreases below ½, and the overlap of molecular orbitals increases. The tunneling oscillations of electrons in the degenerate molecular orbitals become less and less harmonic in character. This type of tunneling oscillation is referred to as anharmonic oscillation because the oscillations are derived from statistical fluctuations in molecular orbital occupancy and are nearly insensitive to temperature, unlike harmonic oscillations, which are thermal in nature. In general, systems characterized by a $\beta$ parameter less than about ¼ become so structurally unstable during dynamic tunneling oscillations that they statically distort to a lower symmetry and settle into a new harmonic condition, like the cubic to trigonal distortion mentioned above.

A method for predicting the molecular orbital overlap resulting from a given orbital degeneracy is given in "Hydrogen-hydrogen/deuterium-deuterium bonding in palladium and the superconducting/electrochemical properties of $PdH_xPdD_x$," by Dr. Keith Johnson, et al, *Modern Physics Letters* B, Vol. 3, no. 10, pp. 795–803, July 1989, and is herein incorporated by reference. Based on this orbital overlap prediction technique, which provides a method for quantizing the Jahn-Teller coupling parameter, $\beta$, the orbital degeneracy of a condensed lattice system may be selectively "tuned", or specified, to provide a desired degree of molecular orbital overlap. By tuning the degeneracy of the system to, e.g., increase the system degeneracy, the β coupling parameter characterizing the material is in turn (or inherently) decreased.

Referring again to FIG. 1, as the degeneracy of a condensed matter system is tuned so that the HOMO and LUMO come closer together, the energy gap, ΔE, between the HOMO and LUMO approaches zero. The magnitude of this energy gap is directly related to the rate of molecular orbital electron tunneling, $T_R$, by:

$$T_R = A e^{-\Delta E/KT} \quad (1)$$

where:

K is the Boltzmann constant

T is degrees Kelvin.

From this relationship (1) it is clear that as the energy gap between the HOMO and LUMO approaches zero, the electron tunneling rate $T_R$ correspondingly increases.

At high tunneling rates, the tunneling electrons impart their oscillatory motion to the corresponding parent nuclei; the nuclei are effectively "dragged" through the anharmonic oscillatory motion of the tunneling electrons. Thus, the corresponding rate of anharmonic nuclei oscillation, is also, as expected, related to the degree of molecular orbital overlap, via the coupling parameter β. The frequency of nuclei oscillations, $\omega_c$, in terms of the coupling parameter, is given as:

$$\omega_c = h(m_e/M_i)^\beta / 2 m_e d^2 \quad (2)$$

where:

$m_e$=mass of electron $M_i$=mass of parent nuclei

β=Jahn-Teller coupling parameter (quantified based on the orbital overlap-degeneracy prediction model)

d=separation between second nearest neighbor nuclei (the correlation distance between molecular orbitals of opposite phase, $\Psi^+$ and $\Psi^-$ (not the lattice parameter))

h=Plank's constant.

Figure 2B:
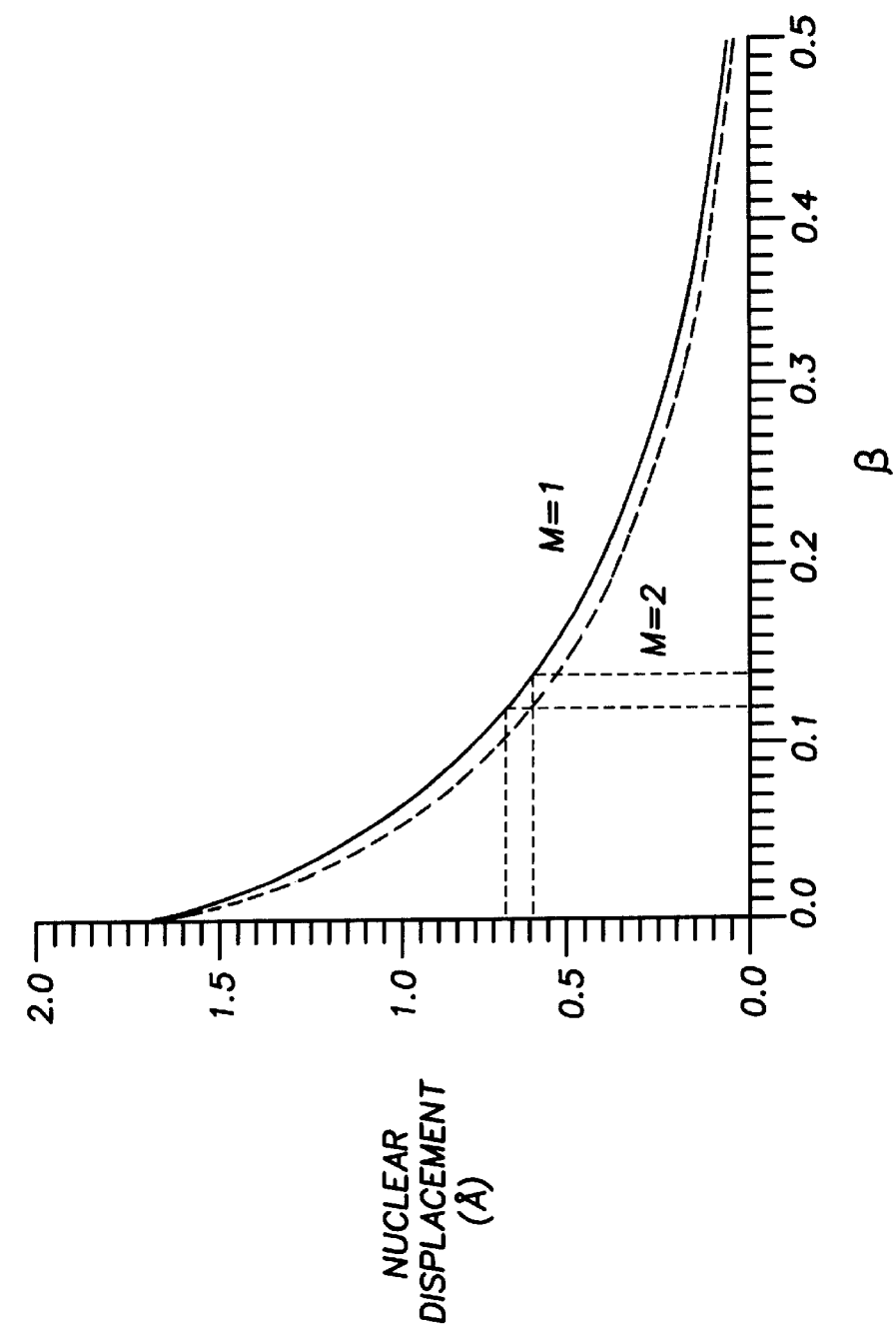
FIG. 2B is a plot of nuclear displacement oscillation amplitude as a function of the Jahn-Teller coupling parameter $\beta$.

Referring to FIG. 2B, the amplitude of parent nuclei oscillation, δ, resulting from the degree of anharmonicity caused by orbital overlap, as given by the coupling parameter β, mathematically ranges between 0–1.7 Å, for β ranging between 0–0.5, although, as explained above, β values close to zero are physically meaningless. The details of bonding overlap, however, restrict the value of β to above 0.1. Thus, referring also to FIG. 2A, a measure of the coupling parameter β provides a means for correlating a degree of molecular orbital overlap, or degeneracy, to the amplitude of nuclear displacement resulting from anharmonic oscillations of electrons in the degenerate molecular orbitals.

The relationship nuclear displacement amplitude, δ, to the Jahn-Teller coupling parameter, β, is quantified as:

$$\delta = (m_e/M_i)^\beta d. \quad (3)$$

Based on this relationship, as illustrated in FIG. 2B, it is seen that as β decreases from 0.5 toward 0.1 (becoming more degenerate) the parent nuclei (e.g., deuteron) displacement amplitude δ increases to over 10 times the amplitude associated with thermal (harmonic oscillations. In fact, the parent nuclei displacement amplitude may realistically approach or exceed 0.6 Å.

The average distance of closest approach of adjacent parent nuclei which are anharmonically oscillating is determined based on the displacement amplitude δ, described above, and the interstitial site distance between two such oscillating nuclei. With this interstitial distance between the nuclei, or bond separation parameter, given as d, the average distance of closest approach for adjacent anharmonically oscillating nuclei is given as d−2δ. This distance may be equivalently considered as the average distance of penetration into the coulomb barrier achieved by adjacent oscillating nuclei.

The inventors herein have recognized that the probability for interaction of neighboring nuclei may be dramatically increased via enhancement of the anharmonic nuclei oscillation phenomenon discussed above, and further that this anharmonic oscillation may be "tuned" by specifying a particular molecular orbital degeneracy (and corresponding electron orbital tunneling) via a corresponding degree of molecular orbital overlap. Both the anharmonic oscillation nuclei displacement amplitude, δ, and the frequency of anharmonic oscillation, $\omega_c$, were shown above to be strongly dependent on β, the Jahn-Teller coupling parameter, which provides a measure of the molecular orbital overlap, or degeneracy, for a given system. The probability for two nuclei to interact will be shown below to be strongly dependent on the distance of closest approach between any two nuclei, given above as d−2δ, and the frequency at which this closest approach occurs. The coupling parameter β thus provides a mechanism for correlating a given state of molecular orbital degeneracy with a probability of nuclei interaction. To achieve a maximum probability for interstitial nuclei interaction, then, a molecular orbital degeneracy state is selected which, for a given condensed matter system, minimizes the distance of closest approach of nuclei during oscillations while at the same time maximizing the frequency of those oscillations.

For a condensed matter system containing hydrogen, deuterium, tritium, or other interstitial species dissolved in a host lattice, the inventors herein have recognized that by "tuning" the molecular orbital degeneracy of the host lattice, the anharmonicity of the dissolved hydrogen or deuterium nuclei sublattice residing in the host lattice may be enhanced to achieve the conditions described above, i.e., a large displacement amplitude, δ, of the hydrogen or deuterium nuclei and a correspondingly small distance of closest approach, and a high oscillation frequency of deuterium or hydrogen nuclei. It must be emphasized that it is the electron molecular orbital topology of the host lattice that creates an energy state giving rise to degenerate sublattice orbitals related to the second nearest neighbors of, e.g., H—H guest bonding orbitals. Thus, it is the nuclei of the guest sublattice that are set in anharmonic motion as a result of the orbital topology.

The invention herein provides methods for enhancing this sublattice anharmonicity via "tuning" of the host lattice molecular orbital degeneracy. These methods, described below, all provide common results: they act to promote second nearest neighbor bonding between sublattice nuclei; and they thereby promote maximization of the anharmonic oscillation amplitude and oscillation frequency of the sublattice nuclei.

A variety of metal alloys have been investigated to determine that alloy, which by the nature of its molecular orbital degeneracy, maximizes anharmonic oscillations of deuterium or hydrogen dissolved in the alloy lattice. The molecular orbital overlap, corresponding coupling parameter β, and anharmonicity of deuterated palladium alloyed with lead, bismuth, titanium, silver, copper, zirconium, germanium, silicon, aluminum, thallium, and gold has been investigated, as well as deuterated nickel alloyed with titanium. "Deuterated" is here defined to include any of the three hydrogen isotopes deuterium, tritium, and protons. All of the investigated alloys possess tetrahedral and octahedral interstitial sites, yet not all of the alloys serve to enhance the molecular orbital degeneracy of interstitial guest species. Based on an analysis of the degree of molecular orbital degeneracy of each of the palladium alloys, palladium silver is the preferred alloy, as it maximizes hydrogen isotope anharmonicity.

In pure palladium and palladium alloys, the lattice parameter, a, of the palladium atoms in the lattice ≈3.6 Å. The space in the palladium lattice may be populated by a guest species, e.g., introduction of deuterium nuclei dissolved in the lattice to occupy octahedral and tetrahedral interstitial locations of the lattice, via electrolytic charging. After this charging, the deuterium nuclei constitute second nearest neighbors (with each other) in a degenerate orbital condition. Deuterium is the preferred guest nuclei species, but hydrogen is also an acceptable guest species.

While the separation between second nearest neighbor deuterium nuclei located at octahedral interstitial sites within the host lattice is 3.6 Å, the same length as the palladium lattice parameter, once electrolytic charging of deuterium reaches a high level, the deuterium nuclei begin to populate the smaller tetrahedral interstitial sites of palladium and its alloys, and the distance between a neighboring interstitial tetrahedral and octahedral site is 1.7 Å, less than one-half the lattice parameter distance. Thus, deuterium nuclei populating adjacent octahedral and tetrahedral sites are closer together, and have a higher spatial density, than nuclei populating only octahedral sites.

This small equilibrium distance between tetrahedral and octahedral sited deuterium nuclei, in combination with enhanced anharmonic oscillations of those nuclei, create the conditions necessary for enhanced interaction between the deuterium nuclei.

Of the metal alloys investigated, it is found that palladium silver provides the highest degree of guest deuterium nuclei anharmonicity. This silver compound increases the $dΔ-s\sigma$ antibonding component of the palladium-deuterium molecular orbitals, at concentrations up to about 23% silver, thereby promoting more overlap of the second nearest neighbor D—D(sσ) bonding molecular orbitals and providing an enhanced molecular orbital degeneracy. A particular deuterated palladium silver compound, $Pd_{.77}Ag_{.23}D$, is preferred for a bulk alloy embodiment, but other palladium silver compounds, as well as other metal compounds such as Au—Ni, Cu—Pd, Cu—Ni, Ni—Pd, Cu—Ni, Ni—Ti, Zr—P, Pd—P, Ni—Zr, Zr—Pd, and Zr—Ti also provide a degree of anharmonicity sufficient to enhance interaction of deuterium nuclei in the alloy lattice. Thus, while the following discussion focuses on palladium silver, it must be recognized that other alloy compounds are also suitable.

Using the molecular orbital overlap modeling technique of Johnson described above, the computed bond overlap of $Pd_{.77}Ag_{.23}D$ (near the Fermi level) is calculated to be 35%. Using the graphical relationships in FIGS. 2A and 2B, this bond overlap correlates to a Jahn-Teller coupling parameter β of 0.13, and a deuterium nuclei anharmonic oscillation amplitude, δ, equal to 0.6. Then, using the relationship (d−2δ), given above, for determining the average distance of closest approach for anharmonically oscillating deuterons in the palladium alloy lattice, with the bond separation parameter, d, being 1.7 Å between an octahedral and tetrahedral deuterium nuclei, the average distance of closest approach of a D—D nuclei pair is 0.5 Å. This distance is closer than even the bond distance in deuterium gas, which is 0.7 Å. The average distance of closest approach must be reduced below 0.5 Å to observe any strong force interactions at a rate above the expected background rate. Thus, the probability, or expectation value, of finding an anharmonically oscillating deuteron pair inside the strong force envelope is dramatically enhanced by small reductions in this distance of closest approach to reduce this distance below 0.5 Å.

Specific details of the energy potential between the deuterium atoms in this anharmonic system are unknown. However, a semi-qualitative analysis may be performed using an expression derived by Sichlen and Jones for the rate, R, of D—D nuclei interaction, using a Morse potential, as follows:

$$R = Ae^{(-\lambda(rd))} \quad (4)$$

where

A=the nuclei interaction attempt rate $\lambda(r_d)$=the reaction distance $(r_d)$=the Coulomb barrier penetration factor.

Factoring out the barrier width, such that $\lambda(r_d)=[(d−2δ)−λ'(r_d)]$ and using $(d−2δ)=1.05$ and $\lambda(r_d)=180$ for a $D_2$ molecule, and setting A equal to the anharmonic oscillation frequency, $\omega_c$, the interaction rate of deuterium nuclei in a deuterium molecule is $10^{-70}$ interactions/D—D pair/sec, at room temperature.

Using the substitutions given above for the palladium system at room temperature, the equation is correlated to a PdD system given by:

$$R = \omega_c e^{-(d-2\delta)171}. \quad (5)$$

Substituting the values of (d−2δ) as 1.05 Å for the system of PdD, a deuterium nuclei interaction rate of $10^{-50}$ is indicated. In contrast, substituting $5×10^{11}$ rad/sec and 0.5 Å for the values of $\omega_c$ and (d−2δ), respectively, computed for the system of $Pd_{.77}Ag_{.23}D$, indicates a deuterium nuclei interaction rate of $7×10^{-27}$ interactions/D—D pair/sec under the enhanced anharmonic conditions set up by the $Pd_{.77}Ag_{.23}$ host lattice. Based on this analysis, it is clear that deuterium nuclei interaction is significantly promoted by anharmonic oscillation conditions.

The nature of the strong force nuclei interaction having a rate quantified by the above equation is not here specified; rather, the chemical and physical conditions that amplify the probability for the occurrence of this strong force interaction are provided by the enhanced anharmonicity system of the invention.

Optimally, the strong force interaction of deuterium nuclei which are anharmonically oscillating occurs in the host lattice with a high degree of coherency. The more non-linear, or anharmonic, the deuterium sub-lattice behaves, the higher the coherency of the anharmonic oscillations. Condensed matter systems in which the deuteron nuclei motions are synchronized to such a high degree are expected to generally tend toward conditions that favor 3- and 4-body strong force interactions. Such many-bodied, cooperative oscillations permit 3 nuclei to be confined in, or close to, the strong force envelope simultaneously, providing a corresponding increase in interaction potential. Prediction of reaction by-products of 3- and 4-body strong force interactions are beyond current understanding. High energy scattering experiments are of no predictive use, owing to the immeasurably low probability of even a 3-body interaction.

It must also be recognized that the anharmonic tunneling oscillations described herein occur in a space regime such that the inertial wavelength of the deuterons is much greater than that typically associated with high- energy events. Thus, substantial overlap of the wave-functions of nearby nuclei, even those outside of the interaction envelope of a nuclei pair, can be expected. Additionally, interference effects of the low-energy tunneling oscillations can not be dismissed. Indeed, the energy of the deuterated palladium silver system is computed to be seven orders of magnitude lower than the lowest energy scattering experiments ($\approx$20,000 eV compared with 20 meV). Conversely, the deBroglie wavelength of a wave/particle deuteron is increased by $\sqrt{10^7}$ over that of scatter high energy experiments. Thus, interference effects of the tunneling phenomena can not be discounted.

Anharmonic oscillations resulting from specific molecular orbital degeneracy may be understood from another viewpoint. The amplitude, $\delta$, of the anharmonic oscillations may be equated with the energy of the oscillating system. The energy of the oscillator thereby correlates a wavelength with the oscillating particle. When the wavelength, $\lambda$, of an anharmonically oscillating deuteron coincides with the length of a potential well, here the Coulomb barrier, a resonance is expected. Tuning of the anharmonicity of a condensed matter system thus acts to adjust the wavelength of the wave/particle entity (here, the deuteron) to induce particular resonances. The induced resonance further enhances the oscillation amplitude, $\delta$, and can dramatically increase the probability of a strong force interaction between neighboring nuclei.

The inventors herein have recognized that in addition to precisely selecting an alloy host lattice for enhancing anharmonicity of guest deuterium nuclei, the application of an electric field may be employed to shift the HOMO and LUMO populations and energy spectra of a given host lattice to achieve molecular orbital degeneracy and enhanced anharmonicity. It is recognized, however, that E-fields are confined to the near-surface region of conducting materials. Therefore, E-fields only control the system anharmonicity in a region of the system whose depth is less than about 200 Å-deep into the bulk of a host material. Additionally, the inventors herein have recognized a third mechanism for tuning the degeneracy and anharmonicity of a system, namely, using nanometric surface preparation (NSP) techniques on the host lattice. Such preparation is intended to impart nanoscale surface topology to the host lattice; this topology acts to create a low coordination of the surface atoms. Surfaces with a low coordination of atoms develop anharmonic properties owing to orbital de-localization at regions of high curvature, where the radius of curvature of such regions is generally less than 0.2 $\mu$m. Nanometric surface preparation, like the application of E-fields, is confined to effect only the surface and near surface regions of a host lattice. Each of these anharmonicity tuning mechanisms will be described in turn below.

Electric fields, which are limited to the near surface of a metal, make substantial changes to the local force constants and accompanying vibrational response of near-surface atoms of a metal. Anharmonic oscillations driven by molecular orbital degeneracy are modified by the applications of electric fields, mediated by the local adjustments to the force constants. However, these effects are distributed over the interaction distance of the anharmonic potentials, which may extend normal to the surface over many lattice parameters.

As described below it is intended that a "tuned" degenerate host lattice be charged, via electrolysis, to populate interstitial sites with deuterium. The strong electric fields developed during such electrolysis is recognized to provide two effects, based on an understanding of the system: a strong E-field insures that a high concentration of deuterium (or other guest species) is obtained and maintained within the lattice; and a strong E-field provides a driving force to further delocalize the D(1s) orbitals of the host lattice nuclei, beyond that resulting from a particular selection of host alloy. Fields on the order of $10^4$–$10^7$ Volts/cm occur within and at the surface of conducting materials undergoing electrolysis, extending normal to the surface on the order of nanometers. The exact quantification of the effect of an E-field on the surface can not be made at this time. However, Hellman-Feynman theory suggests that the E-fields act on the population of electron molecular orbitals, which action can be systematically employed to shift the Fermi energy in a direction leading to further degeneracy, for the proper E-field polarity. Of course, the E-field may detract from a particular orbital population as well, depending on the E-field polarity; hence it is appropriate to consider the application of an E-field as degeneracy tuning.

Consider $Pd_{.77}Ag_{.23}D$, discussed above as providing a high degree of enhanced deuterium anharmonicity and a rate of deuterium nuclei interaction of $7\times10^{-27}$ interactions/D—D pair/sec. The application of an electric field to this system during, e.g., electrolysis, further delocalizes the already degenerate molecular orbitals by an additional 5–10%, resulting in an increase of the anharmonic oscillation amplitude, $\delta$, of the deuterium nuclei by an additional 0.1 Å beyond the 0.6 Å oscillation amplitude caused by the anharmonic conditions of the $Pd_{.77}Ag_{.23}D$ alloy lattice alone. In this case, the barrier penetration parameter, or average distance of closest approach, of two deuterium nuclei, is then 0.5 Å, and the rate of deuterium nuclei strong force interactions increases from $7\times10^{-27}$ interactions/D—D pair/sec to $4.6\times10^{-10}$ interactions/D—D pair/sec. Thus, the application of an E-field, e.g., during electrolysis, increases the interaction rate by seventeen orders of magnitude. As explained previously, the nature of these interactions is not here specified; rather, chemical and physical conditions that promote the occurrence of these interactions are provided by the enhanced anharmonicity system of the invention.

For the majority of materials having properties which lend them as a host lattice, and particularly for nickel and nickel alloys, the anharmonicity tuning mechanisms of E-field applications and nanometric surface preparation do not present a hinderance to system performance, because ideal heat transfer favors a surface phenomenon, and these mechanisms promote anharmonicity at the surface, rather than the bulk of the material.

The third anharmonicity tuning mechanism of the invention, nanometric surface preparation (NSP), acts to adjust the local coordination of surface atoms, as explained above. High curvature surfaces, such as prismatic edges and asperities, are optimal low atomic coordination surfaces, and may be fabricated with existing technology to create a high density of such features with nanometric curvature radii of less than 0.2 $\mu$m. The new atomic coordinations produced by the resulting surface topology induce variations in electron molecular orbitals expected of atoms of a smooth surface; these electron molecular orbitals have different size, shape, orientation and, perhaps most importantly, population than those associated with a smooth surface. The new molecular orbital occupancy levels associated with this lower atomic coordination tend to shift the Fermi level such that the degeneracy of the system is increased, and the anharmonicity of the system is correspondingly increased. Additionally, NSP surfaces enhance the dissolution of hydrogen isotopes in a host lattice during electrolysis, thereby promoting population of tetrahedral sites in the host lattice.

Considered in another way, partitioning of a highly nonlinear, i.e., anharmonic, solid such as the $Pd_{.77}Ag_{.23}D$ alloy so that the alloy is nanometrically discretized, using, for example, NSP methods of the invention, leads to enormous vibrational instabilities in the solid, and correspondingly large vibration spectra. That is, atomic scale discreteness effects give rise to localized vibrational states that would not exist in a continuum, nondiscretized system. It is these localized vibrational states that provide the large amplitude anharmonicity recognized by the inventors herein as the foundation for enhancing nuclear interaction between nearest neighbor guest species in a host lattice. The existence and quantification of the correlation between nanometric partitioning and vibrational instabilities is provided by, for example, Douxois and Peyrard, "Energy Localization in Nonlinear Lattices," *Physical Review Letters,* Vol. 70, No. 25, Jun. 21, 10993, pp. 3935–3938; and Kivshar and Peyrard, "Modulational instabilities in discrete lattices," *Physics Review A,* Vol. 46, No. 6, Sep. 15, 1992, p. 3198.

Several host lattice surface preparation techniques are preferred to produce this effect, but those skilled in the art will recognize that other techniques are equally applicable to achieve the desired increase in anharmonicity. These techniques can be classified into two categories: first, post-processing techniques, such as wire drawing, nanoscribing, lithography, and back-etching, and secondly, materials synthesis techniques, such as CVD, MBE, ED, or PVD over articulated surfaces, surface coatings, and selective binary compound etching, all of which are described below.

In a first technique for providing nanoscopic topology to the surface of a host lattice material, the host lattice material, in the form of wire, is drawn through a diamond die which has been processed to include relief topology. Such a topology is achieved on a diamond die by positioning a high-power laser, for example, a $CO_2$ or YAG laser, focused to a spot size of less than 30 $\mu$m, at sufficient power to ablate diamond, to locally evaporate carbon on the inside radial surface of the die. The laser is focused to a desired diameter spot size, which is preferably not more than 30 $\mu$m, and either raster scanned or modulated in a pulsed fashion along the inner wall of the diamond die.

This rastering or pulsing action results in the effective "drilling" of beveled holes in the diamond die. Pulsed laser sources, as opposed to continuous wave sources, provide the most flexibility for "customizing" the imparted relief topology. By selectively programming the rastering and dwell time of the laser as it is applied to the inner wall of a diamond die, the inner wall surface of the die may be sculpted in a predefined way to provide beveled features. The resulting features may be smoothed with a laser annealing step or subsequent diamond paste polishing step to remove rough spots on the interior of the holes. Preferably, in this application, the diamond die is processed to intentionally impart nanometric and microscopic features into the trailing edge, i.e., smallest diameter, of the die.

In an alternative technique, a diamond abrasive, in the form of a paste, may be applied to a diamond die to provide topology on the inner surface of the die by scoring that surface as the paste is passed through the die.

Once a diamond die is processed to include on its inner surface nanometric-sized beveled features or scored asperities, host lattice wire, e.g., nickel or palladium wire, is drawn through the die. After being drawn through the die, the wire will take on the relief structure of the die; handling care is called for to avoid post-process rounding of the nanometrically sharp features on the drawn wire. Indeed, conventional wire drawing technology is designed to minimize topological features on drawn wire, and thus, typically includes a surface polishing step. Such a polishing step is disadvantageous for this process.

Specific preferable steps of the wire drawing process are as follows. Prior to being drawn through a prepared diamond die, the wire to be processed is cleaned via a series of solvent washes, for example: wash (1)—15 minute immersion in 40° C. trichloroethane with ultrasonic agitation; wash (2)—15 minute immersion in fresh 40° C. trichloroethane with ultrasonic agitation; wash (3)—15 minute immersion in room-temperature acetone with ultrasonic agitation; wash (4)—15 minute immersion in room-temperature methanol with ultrasonic agitation; wash (5)—15 minute immersion in room-temperature isopropanol with ultrasonic agitation; and final wash (6)—30 minute rinse in distilled water. After this cleaning process, the wire is drawn through the die while being lubricated. A suitable lubricant is selected based on the need to avoid organic contamination of the alloy surface.

Figure 3A:
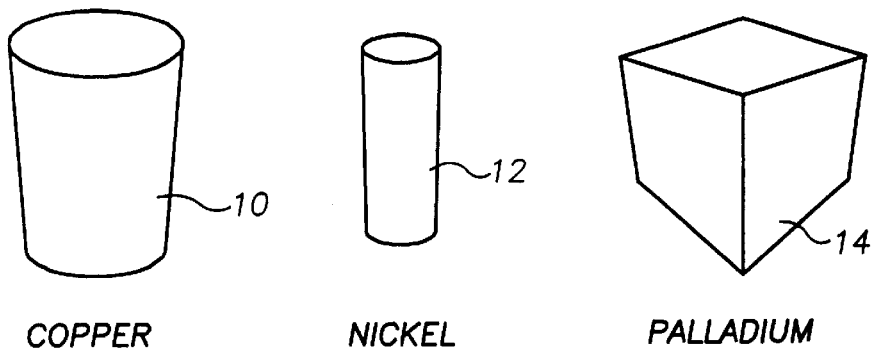
FIGS. 3A–3D illustrate the steps of producing a palladium-nickel clad wire according to one aspect of the invention.
Figure 3B:
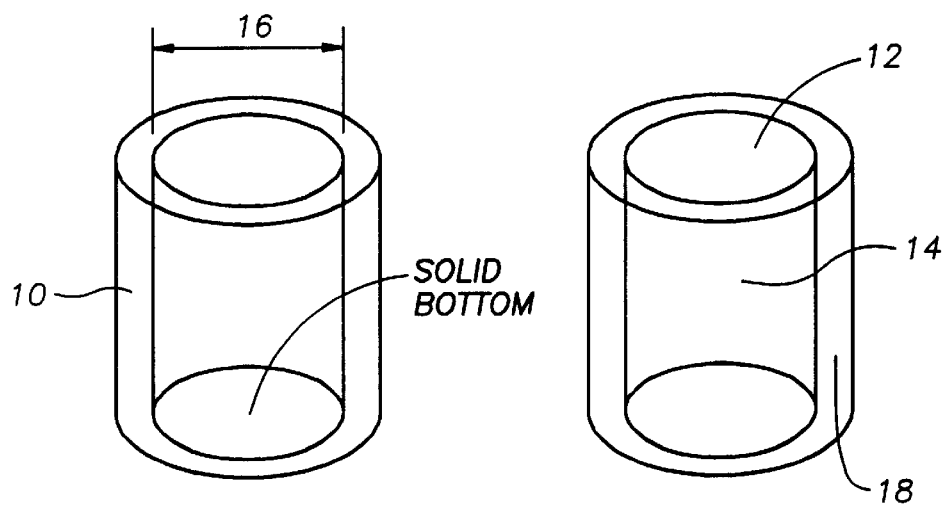
Figure 3C:
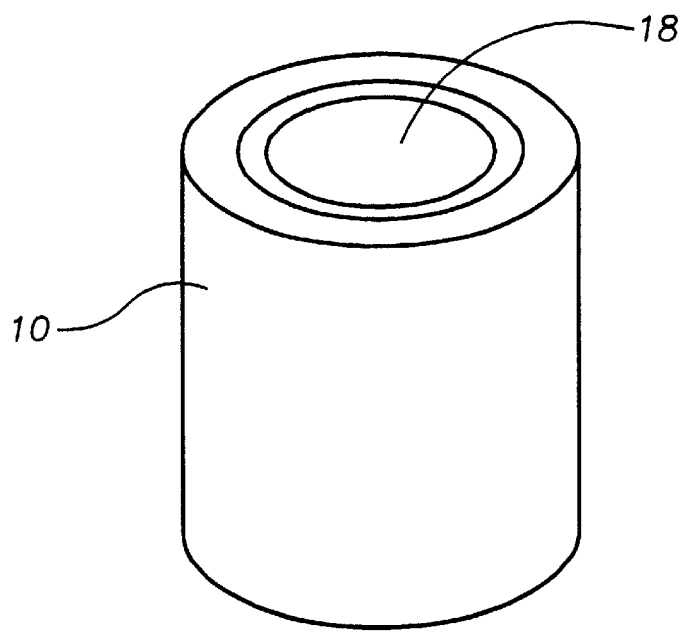
Figure 3D:
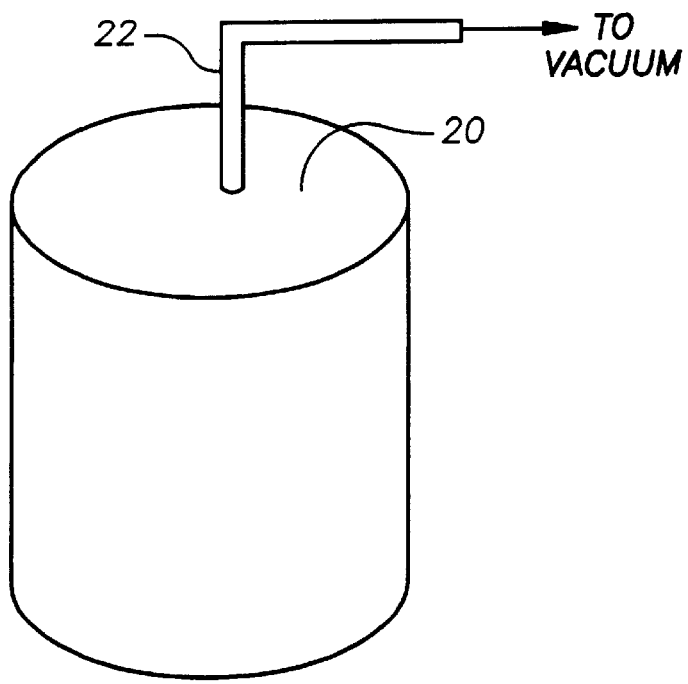

In an alternate embodiment, multi-clad wire of nickel and palladium may be fabricated to provide enhanced anharmonicity due to both a specific alloy combination and surface topology. Referring to FIG. 3A, such multi-clad wire is fabricated using a solid, cylindrical copper rod 10, a solid, cylindrical nickel rod 12 of a diameter less than the diameter of the copper rod, and a palladium sheet 14 having a length equal to that of the copper and nickel rods. The length and diameters of the rods are determined based on the desired final length and diameter of the multi-clad wire to be produced. In a first fabrication step, shown in FIG. 3B, the copper rod 10 is machined to remove copper from the interior of the rod, thereby creating a copper tube. The inner diameter 16 of the copper tube is preferably machined to match the diameter of a cylindrical assembly 18 comprising the nickel rod 12 around which is wrapped the palladium sheet 14. In a next step, shown in FIG. 3C, the nickel rod-palladium sheet assembly 18 is pressed into the copper tube 10 to form a billet. As shown in FIG. 3D, a copper cap 20 having a centrally located hole is then welded to one end of the billet and a pumping lead 22 is attached to the cap hole.

The pumping lead 22 is connected to a vacuum system and the billet is evacuated via the system for approximately 12 hours at a temperature of 300° C. At the end of the evacuation period, the pumping lead 22 is weld-sealed to isolate the billet from atmosphere, and the assembly is cooled to room temperature. Once the billet is cooled, it is extruded, using conventional extruding techniques, to have an outside diameter of not more than 2 inches. Then, using a group of successively smaller dies, the extruded billet (now a wire) is drawn through the dies from largest die to smallest, in sequence, to reach a final desired diameter. After the final die drawing, the copper cladding tube is etched off of the palladium sheet to expose the palladium-nickel assembly. A solution of $Hf/HNO_3$ at room temperature, using standard etching and rinsing techniques, adequately removes the copper and cleans the palladium surface. The resulting multi-clad wire may be used as is or alternatively, the wire may be drawn through a diamond die having surface features on its inner walls, using the process described above, to form the desired surface asperities on the wire.

In an alternative embodiment, an arbitrarily-shaped host lattice material piece may be mechanically processed to create a planar surface having nanometric topology using a lapping process as follows. If the piece is rather small, it is first mounted on a quartz optical flat using a low-melting point temperature wax. The optical flat is first positioned on a hot plate at approximately 90° C. The temperature of the optical flat is then increased until a small portion of wax melts on the flat, at which point the rectangular piece is positioned on the melted wax. The optical flat, now supporting the rectangular sample, is then removed from the hot plate and cooled to room temperature.

The host lattice sample alone, or a supported smaller sample is positioned on a nylon lapping pad of a standard lapping plate on a polishing wheel. A polishing slurry consisting of standard soluble 5 $\mu$m diamond oil paste and mineral kerosene is loaded on the wheel to lubricate the sample during the lapping process. With the lubricated sample in place, the wheel is run for about 30 minutes, throughout which time the lubrication is maintained.

At the end of the 30 minute-lapping period, the nylon lapping pad is replaced with a new pad and the sample is positioned on the pad and lubricated with standard 2 $\mu$m diamond oil paste and mineral kerosene. The wheel is then run again for 30 minutes. In a third lapping process, the nylon pad is again replaced and the sample is run on the wheel for 45 minutes using 0.5 $\mu$m diamond oil paste and mineral kerosene as the lapping lubricant. Finally, in a fourth lapping process, the nylon pad is again replaced and the sample is run on the wheel for 2 hours using 0.1 $\mu$m diamond oil paste and mineral kerosene as the lapping lubricant. This last lapping process using diamond paste imparts the desired nanometric features on the planarized surface.

If the arbitrarily-shaped host lattice sample was of such a small size that it was mounted on an optical flat, the sample is removed from the flat, after the last lapping process, by melting the wax on the flat using a hot plate and removing the sample from the melted wax. Whether or not an optical flat support was employed, the sample is preferably cleaned at the end of the lapping procedure, following the multistage solvent cleaning process described above in connection with the wire drawing procedure, or other suitable cleaning procedure.

Alternative mechanical processing techniques may be employed to produce nanometric surface topology for enhancing condensed anharmonicity according to the teachings of the invention herein. For example, in one method according to the invention, a diamond stylus is used to mechanically scribe the surface of a host lattice material in a predetermined scribe pattern. The diamond stylus is preferably "ultrasharp" in that the effective working tip diameter of the stylus is of nanometric proportions, and can thereby produce nanometric-sized scribe patterns. The stylus is precisely moved across the surface of the material using a computer-controlled actuating mechanism. Such a system and methods for using the system to produce nanometric scribe patterns are disclosed in U.S. patent application Ser. No. 929,341, entitled "Method and apparatus for forming nanometric features on surfaces," filed on Sep. 13, 1992, by Harry Clark et al., and herein incorporated by reference. An extension of this diamond stylus patterning technique employs a stylus fixture having an array of such diamond tips which each are characterized by nanometric-sized tip radii. The array of tips provides the ability to in tandem scribe many patterns across the surface.

Using such a system, scratched relief topology is imparted to the surface of, e.g., a sheet of host lattice material. It is not required that the original surface topology of the sheet be planar, but rather, the topology may even be slowly undulating. Active sensors, for example, or other means of the computer-controlled actuating mechanism permit an array of styli to ride lightly on the surface, no matter its topology, and additionally, restrict the depth of cut to, e.g., less than 2 $\mu$m. In this way, a large surface area can be processed in an acceptable time period. As described below, such a nanometrically processed sheet may be used in its initial form as a sheet or may be wound into a small spatial volume, to form a coiled tube, much in the manner of an electrolytic capacitor design.

According to a preferred embodiment of the invention herein, nanometric surface features are produced using the diamond stylus scribing scheme described above, in combination with a "post-scribe" ultrasonic anodic etch process. The application of an E-field during the etching serves to populate antibonding orbitals in the near surface of the host lattice, thereby facilitating decohesion of, typically, metallic bonds. Such an anodic etch is carried out using, e.g., a solution of hydrochloric acid diluted with three parts water. A platinum electrode may be employed, for example. The anodic cell is operated under reverse bias at several milliamps/cm$^2$ for a selected time period, such as 300 seconds, sufficient to produce a high density of nanoscale features on the surface of the host lattice material. Ultrasonic agitation of the anodic etch bath promotes feature formation. The two-step scribe-anodic etch process produces a high density of nanoscale features on any size host lattice sheet.

There are still other materials processing techniques that result in surfaces with sub-microscopic features. For example, diamond turning, fly cutting, and milling techniques are suitable for creating surface structures. Alternatively, various metallurgical techniques may be employed; suitable metallurgical methods include the process of co-solidification of a binary mixture with low solubility in the solid phase. The resulting solidified matrix will have dendritic (needle-like) filaments in the midst of the second phase element. Selective etching of the second phase element results in a porous, spongy material with high curvature surfaces. Ni—Al and Pd—B are two examples of relatively insoluble metal systems that are preferred for this technique. Vapor deposition techniques that are customized to favor discontinuous, rather than smooth and continuous deposition characteristics result in sub-micron sized nucleation sites that enhance the anharmonicity of the underlying substrate surface. Conversely, vapor deposition of a smooth coating over a highly textured surface achieves this same result of sub-micron sized asperities. An example of this process is the autoclaving of open-cell polystyrene. The decomposition resulting from the autoclaving produces a carbonaceous skeleton with very small feature sizes.

Chemical vapor deposition (CVD) is a molecular level process whereby two molecules react only when conjoined on a hot surface, This thermally activated process is thus useful in producing a selected surface topology, because the two or more molecular species employed in the process do not react in the gas phase. Deposition onto a heated substrate can be precisely controlled with adjustments to the temperature of the substrate, as well as the relative composition of the gas phase constituents.

For this application, deposition quality and thickness are best obtained at low pressures, an operating regime providing the ability to produce very thin layers. This is especially true for an articulated surface, such as a pyrolized organic foam. Coating the interior regions of such a surface is referred to as chemical vapor infiltration (CVI). Clearly, ultrathin coatings are preferred for this application, lest the small pores of the foam plug up and obstruct the nanometric surface reactivity.

Whatever mechanical technique is chosen for imparting sub-micron sized surface features to a material surface, that technique should optimally provide a high density of surface asperities, which preferably include points, prisms, and corners, or comprise any geometries having features with a radius of curvature less than 0.5 µm, but preferably less than 0.2 µm. Such features provide a location of small radius curvature. Geometries having a radius of curvature more than 0.2 µm will enhance anharmonicity to some extent, but to a lesser degree than smaller curvature surface features.

While nanometric surface features, as described above, have been shown to be effective in enhancing anharmonicity, techniques of the invention herein for discetization of metallic grain size at nanometric dimensions also provides the ability to promote enhanced anharmonicity. Based on prior work by Peyrard, et al., "Energy Localization in Nonlinear Lattices," *Physical Review Letters,* Vol. 70, no. 25, p.3935, 1993, it is known that energy localization occurs in one-dimensional nonlinear lattices. The inventors herein have recognized that in three dimensions, discrete nanodots or nanocrystals of anharmonic metals can develop large amplitude oscillations resulting from quantum size effects. Rather than damping large oscillations, nonlinear nanodot structures favor the growth of large amplitude, low frequency anharmonic lattice oscillations. Such intrinsically localized vibrational states augment the anharmonicity enhancement provided by the schemes described above and provide a mechanism for sustaining resonant dynamic Jahn-Teller oscillations.

Such resonant oscillations are only to be expected to be observable in materials that have in some way been partitioned or discretized. In contrast to the expected material behavior, partitioning of condensed matter on a nanoscale relaxes the assumption of equi-partitioning of energy. Thus, local modes of vibration that would normally decay in a harmonic lattice spontaneously grow in amplitude in a nonlinear, anharmonic lattice. These massive, but localized oscillations do not follow classical continuum mechanics principles.

For example, it has been shown by Suryanarayana, in "The Structure and Mechanical Properties of Metallic Nanocrystals," *Metallurgical Trans. A,* Vol. 23, p. 1074, 1992, that materials with ultrafine grain dimensions are characterized by extremely high diffusion rates. Such high diffusion rates provide the ability to diffuse a guest species, e.g., a hydrogen isotope such as deuterium, in a host lattice, e.g., nickel or a palladium silver alloy, to a high ratio.

There are many materials processing techniques within the scope of the invention for introducing resonant anharmonic oscillations into a guest species of a host lattice. Grain boundaries, stacking faults, free surfaces and abrupt compositional variations are materials structures that discretize or partition condensed matter to develop the vibrational instabilities that are recognized by the inventors herein to promote nuclei interaction. The simplest such method is grain refinement, which may be produced via splat cooling, atomization, selective deposition techniques, and cold working. Cold working by mechanical attrition has been shown to provide nanograined, polycrystalline material composition by Koch, in "The Synthesis and Structure of Nanocrystalline Materials Produced by Mechanical Attrition," *Nanostructured Materials,* Vol. 2, p. 109, 1993.

Cold working or work hardening tends to result in metal morphology that is brittle and prone to fracture. Such fracture, i.e., large cracking, of surfaces is to be avoided here because an electric field applied to such a cracked surface would not penetrate into cracks and fissures. As a result, dissolved guest hydrogen isotopes in a host lattice would have an available path to be re-emitted from the host material, thereby preventing the ability to attain a high guest to host ratio. Thus, optimization of grain size must be balanced against tendency of a grained material to fracture. Annealing is not a viable technique because it causes grain growth.

Figure 4A:
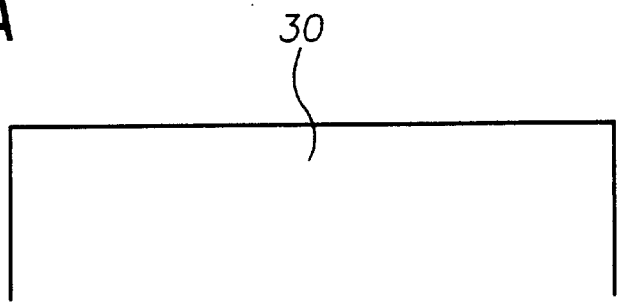
FIGS. 4A–4F illustrate the steps of a first method for lithographically defining nanoscopic surface features according to another aspect of the invention.

As an alternative to mechanical and metallurgical techniques for producing nanometric surface features, lithographic wet-etch techniques may be used. For example, referring to FIG. 4A, in a first lithographic process, a bare substrate 30 of a selected host lattice material, for example, nickel, is provided with a selected crystallographic orientation, for example, the 110 or 100 orientation. The 110 crystal faces are favored in the case of a nickel host lattice substrate because the 110 planes support the highest solubility of hydrogen isotopes of any crystallographic planes.

Figure 4B:
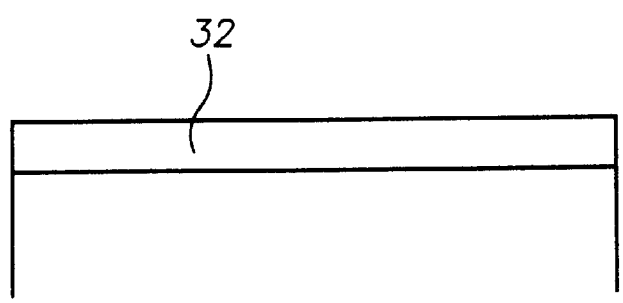
Figure 4C:
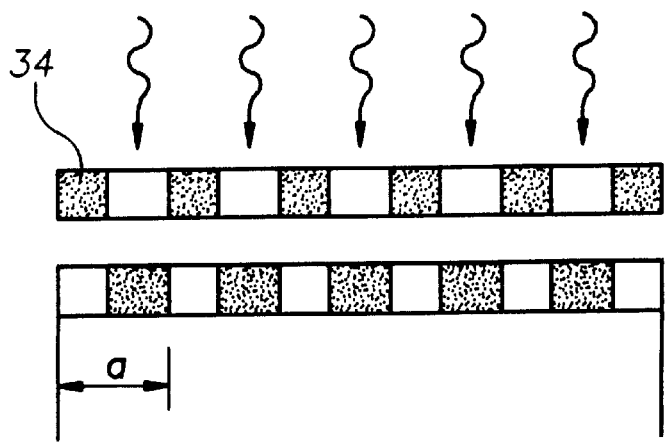
Figure 4D:
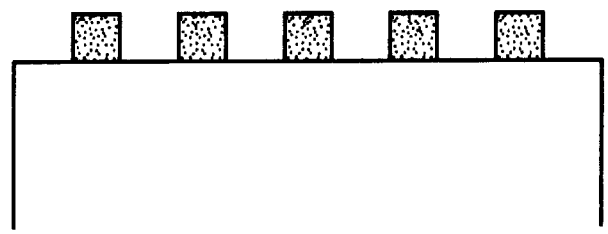
Figure 4E:
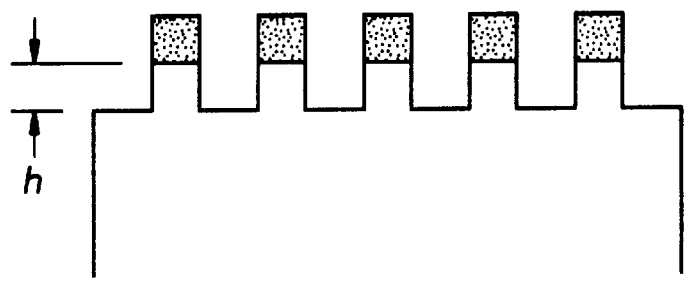
Figure 4F:
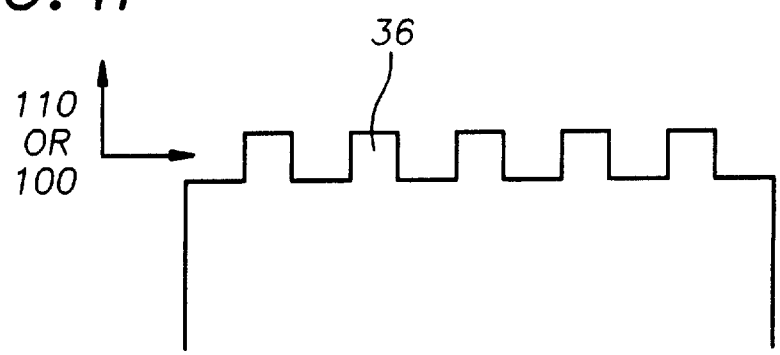
Figure 5A:
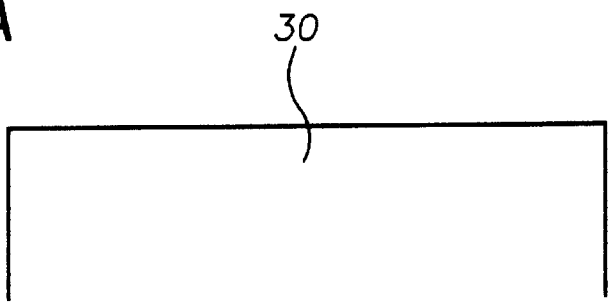
FIGS. 5A–5F illustrate the steps of a second method for lithographically defining nanoscopic surface features according to another aspect of the invention.
Figure 5B:
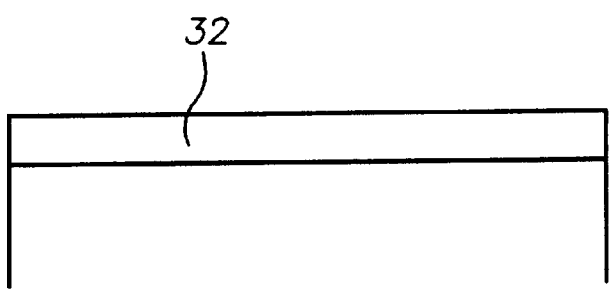
Figure 5C:
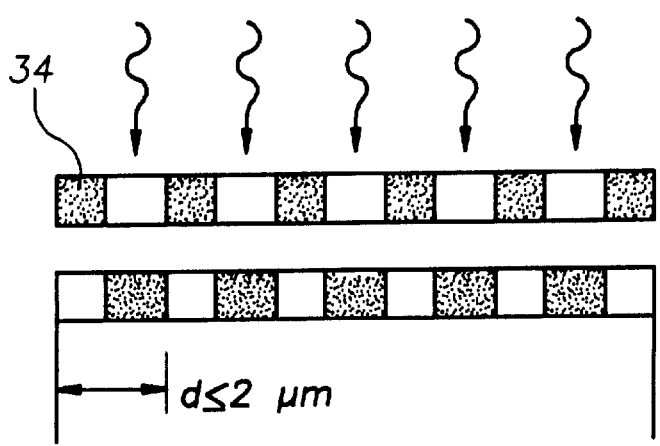
Figure 5D:
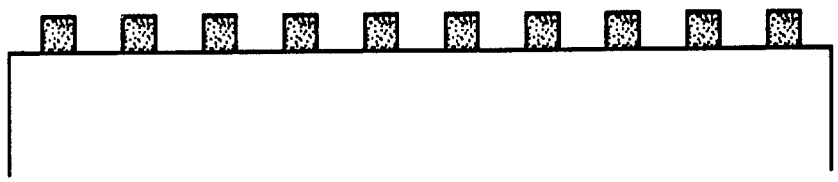
Figure 5E:
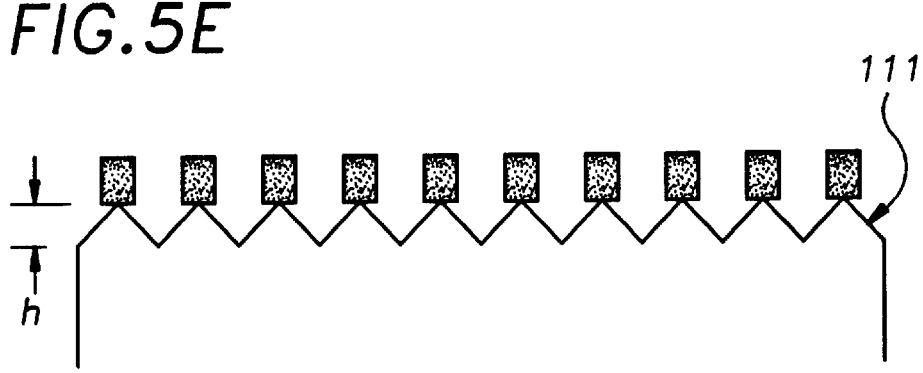
Figure 5F:
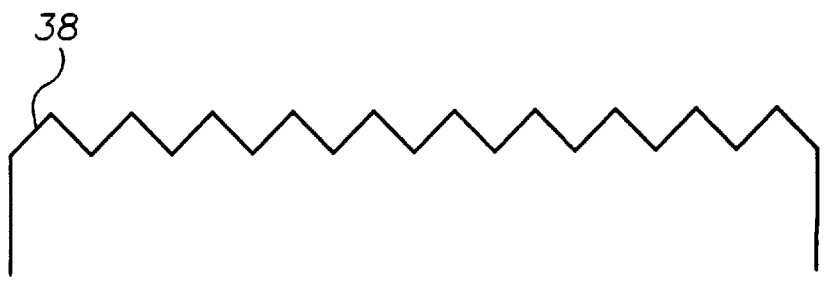

As shown in FIGS. 4B, 4C and 4D, photoresist 32 is spun on the substrate and exposed using a patterned lithographic mask 34 having a selected pattern of sub-micron sized geometries. Preferably, the maximum pattern dimension, d, or "duty cycle" of repeated pattern is about 0.2 µm in length. Such nanoscale features require the use of thin, state of the art photoresists. The unexposed resist is then removed using standard techniques to produce a photoresist etch mask. As shown in FIGS. 4E and 4F, the underlying substrate is then anisotropically etched using an appropriate etch to produce grooves in the substrate surface having a depth, h, of less than about 1 µm. Grooves of a greater height are less preferable because they would allow the prismatic faces of grooves exceeding about 1 µm to reconstruct to a more harmonic, high atomic coordination state. After removing the resist etch mask using standard photoresist processing techniques, the substrate 30 is provided with a topology of steps 36 which all ideally exhibit sharp corners and straight walls.

In a second lithographic process, shown in FIGS. 5A–5F, a bare substrate 30 oriented in a preferred crystallographic orientation of [100] has photoresist spun on its surface. The resist is then exposed using a mask having a maximum pattern width, d, of 1 µm in a grid pattern. The unexposed resist is removed using standard resist process techniques and the substrate is preferentially etched through openings in the remaining photoresist etch mask. The preferential etch stops on the 111 crystallographic planes of the substrate lattice, which act as etch stop planes and cause the etch to end at the intersection of the 111 planes within the substrate.

At the completion of the etch and after the removal of the photoresist etch mask using standard photoresist process techniques, the substrate surface comprises a pattern of grooves 38 having sharp points at the peak of the groove and a correspondingly reverse pointed indentation into the substrate surface. As explained in the discussion earlier, these grooves act to produce a low coordination of surface atoms, and consequently, to increase the anharmonicity of the hydrogen or hydrogen isotope dissolved in the surface material. It is intended that alternative lithographic techniques may also be employed to create suitable surface topology structures which enhance the anharmonicity of the surface material.

The inventors herein have found that mechanically derived surface nanofeatures manifest a different set of properties than lithographically etched features. By their nature, etch processes attack the most reactive regions of a surface preferentially over the less reactive regions. The less reactive regions are then, in turn, what is left exposed at the end of the etch process. These exposed regions are generally characterized by localized molecular orbitals. In contrast, mechanical processes, as opposed to etch processes, do not selectively modify surface regions of particular reactivity, thereby retaining the original surface reactivity, to a large extent.

However, wet-chemistry techniques, such as electroplating and chromatography, also provide mechanisms for creating finely dispersed nanometric structures on the surface of a material to enhance the material anharmonicity. For example, in one method according to the invention, enhanced anharmonicity of a material is achieved using nanometric-sized particles of a second material to promote selected surface geometry via a process such as electroplating the material of interest. In one scheme, nanometric particles such as fullerenes are coated with 3–20 atomic layers of a selected host lattice material, such as Ni, Ti, Pd, Zr, or their alloys discussed above. In this scheme, the diameter of the coated fullerene ($C_{60}$)-material coating combination is between 10–30 Å. The outer metal atomic layers have such a low coordination of atoms in this geometry that the outermost electron molecular orbitals of the layers de-localize and enhance the anharmonicity of the metal layer at its surface. To be useful, coated particles such as metalized fullerenes must be distributed in some inert media, such as zeolites or carbonaceous devitrified foams. The inert media serves two functions: it provides a support structure for the fullerenes, and it accommodates suspension of each $C_{60}$ Fullerene ball such that they each provide the entire $4\pi r^2$ of active surface area per ball. The inert media must be of a porous nature such that it is permeable, so that the fullerene balls can be charged via, e.g., an electrolyte, that provides the charging interstitial species, such as hydrogen, deuterium, or tritium.

In an alternative embodiment according to the invention, a superlattice of alternating materials is produced to enhance anharmonicity of the alternating materials at each superlattice layer interface. In one scheme, alternating layers of two materials are created using molecular beam epitaxy, organometallic chemical vapor deposition, evaporation, laser ablation, or sputtering techniques to fabricate a prespecified superlattice configuration. Ideally, these deposition and growth processes are highly controlled such that they produce high quality superlattice structures having abrupt interfaces at each layer. Preferred material groups for the alternating superlattice layer pairs include Au—Ni, Cu—Pd, Cu—Ni, Ag—Pd, Ni—Pd, Cu—Ni, Ni—Ti, Zr—P, Pd—P, Ni—Zr, Zr—Pd, and Zr—Ti. Other layer material groups may also be suitable. The layer thicknesses preferably vary from about 1–30 nm, depending on the growth or deposition technique. At these small layer thicknesses, the interfacial regions where one material layer meets the next are characterized by lattice distortion, altered atomic coordinations and orbital de-localization. As explained in the discussion above, these conditions promote an enhancement of the system's anharmonicity, and corresponding enhancement of nuclei interaction rate.

Ion sputtering of metallic targets is perhaps the superlattice fabrication process most amenable to a large area processing scheme. Such large area processing is ideal for creating a host lattice structure of desired size. In this process, the substrate is placed is a vacuum chamber, after which the chamber is evacuated. An ion beam is directed at, for example, a nickel target located in the chamber or with access to the chamber, and nickel vapors are deposited onto the substrate. To produce the superlattice, the ion beam is alternately directed at the nickel target and, for example, a copper target, for a prescribed amount of time sufficient to deposit alternating layers of nickel and copper. Typical deposition times are based on a deposition rate of less than about 2 nanometers/minute. Based on this rate, a superlattice of 30 Ni—Cu layers, each 2 nm-thick, may be processed in one hour. The temperature of the superlattice substrate is selected to maximize the abruptness of each layer junction, keeping in mind that low temperature depositions reduce the amount of alloying at, for example, each Ni—Cu interface.

Superlattice structures so created enhance local anharmonic conditions not only at the external surface of the structures, but also at every interface in the superlattice array. Thus, for a 40–50 layer superlattice, the active volume of less than about 5 μm in thickness generates heat, due to anharmonicity effects on deuterium nuclei interaction at each interface of the superlattice, that cannot be transferred away from the interface as effectively as heat generated at the external surface of the superlattice. In this case, the interior of the lattice begins to "overheat" as the heat production via anharmonic interactions exceed the thermal diffusivity of the lattice materials. Temperature does not strongly effect anharmonic oscillation, as it does harmonic oscillation, but several hundred degrees Centigrade of generated heat may be sufficient to initiate a static Jahn-Teller distortion that results in quenching anharmonic oscillations.

Still other surface processing techniques are intended by the invention herein. For example, ion implantation of, for example, Cr into Ni, creates surface damage of the Nickel and provides a mechanism for producing the desired atomic delocalization.

Figure 6:
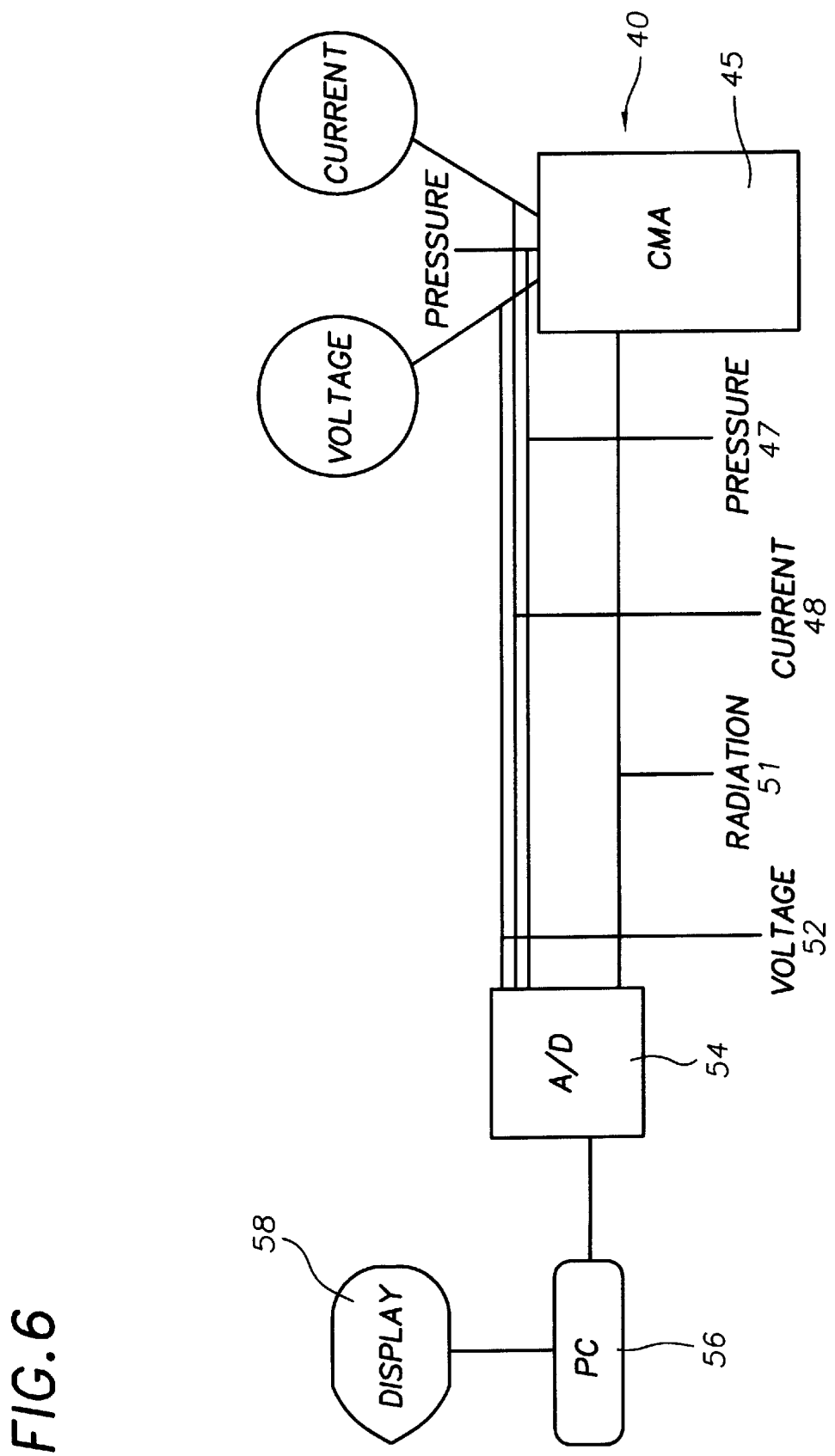
FIG. 6 schematically illustrates a cell activation and measurement set-up according to one aspect of the invention.

Referring to FIG. 6, there is shown an experimental setup 40 for producing and measuring the effect of enhanced anharmonicity on the interaction of guest sublattice nuclei dissolved in a host lattice. This setup 40 comprises, for example, an interaction cell 45, which is monitored to provide indicative signals via a pressure line 47, a current line 48, a radiation line 51, and a voltage line 52. Each of these signal lines are provided to an analog to digital converter (A/D) 54, which is connected to a PC 56, provided with a display 58.

Figure 7:
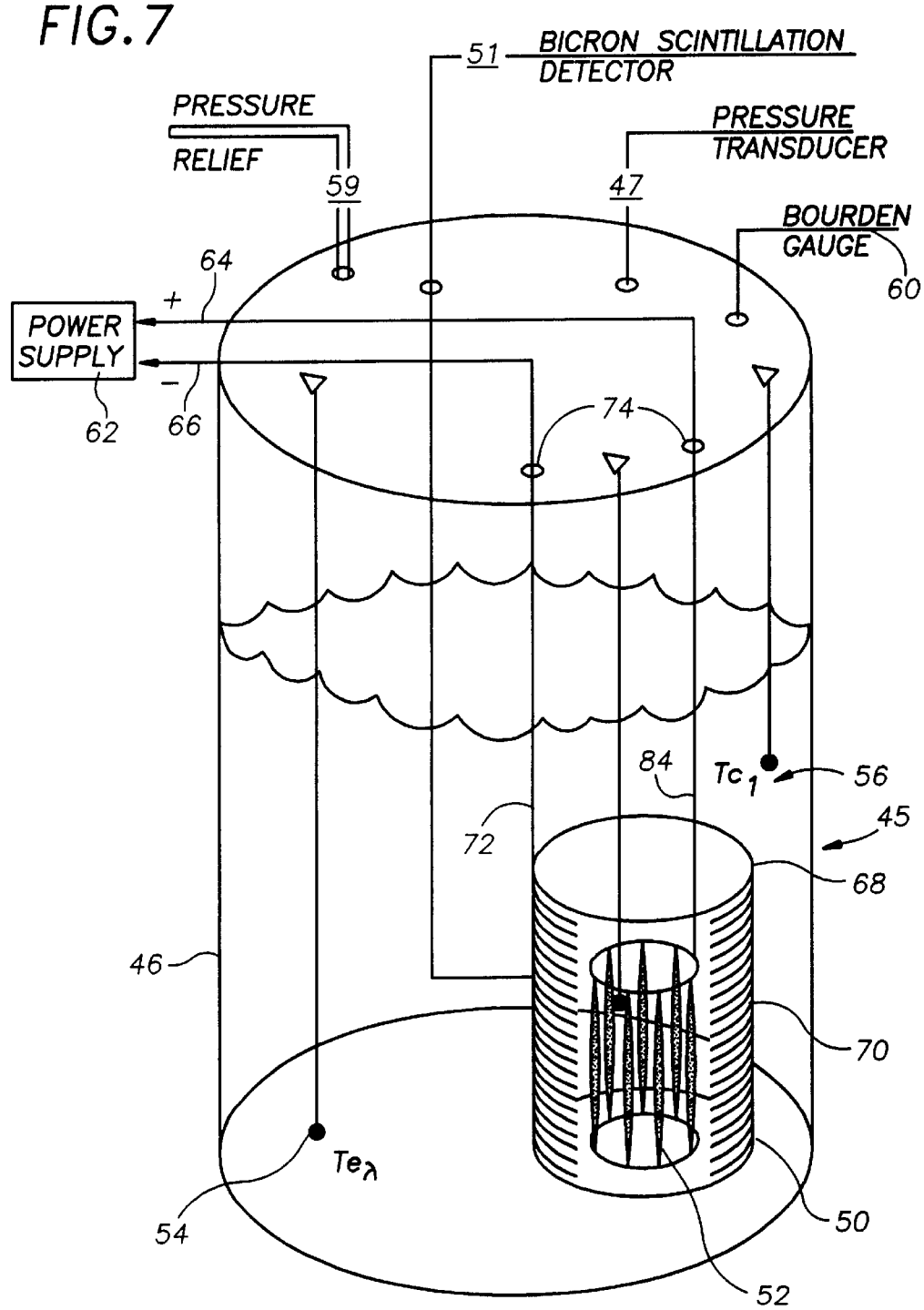
FIG. 7 schematically illustrates the activation cell of FIG. 6 in more detail.

As shown in FIG. 7, the interaction cell 45 consists of, for example, a 30 liter Pyrex calorimetry vessel 46 containing heavy water, light water, or a suitable mixture of the two, and a suitable electrolyte, such as 0.6 Molar potassium carbonate ($K_2CO_3$) in which are submerged electrodes 50, 52, described below. Nonwater-based electrolytic solutions may also be suitable. The containment vessel 46 serves primarily to contain the electrolyte and not decompose contamination into electrodes submerged within it. The electrolyte provides a source of protons or deuterons without contaminating the surface of the electrodes. It also serves to establish a high double potential just outside the surface of the electrodes that provides a voltage gradient which shifts the dynamic equilibrium of solvation and favors a high density of protons or deuterons in the solid, once such species dissolves in the solid, as explained below. The volume of electrolyte is of secondary importance. Heat transfer mechanisms are the main purpose of the water. Water is excellent in this capacity because it is chemically stable, inflammable, and has a large specific heat. Other electrolytes may be used. The electrical conductivity as well as the polarizability of the electrolyte may be preferably optimized for a given type of electrode material. For example, $NaCO_3$ or $RbCO_3$ may be used.

Also submerged in the liquid within the containment vessel are two thermocouples 54, 56, for determining the temperature in the liquid and the air above the liquid, respectively, within the vessel. Each of the thermocouples is monitored by suitable apparatus, such as the PC 56 of the experimental setup.

The containment vessel 46 is provided with a Teflon lid (not shown), which is to be loosely mounted on the vessel once the vessel configuration is in place. The looseness of the mounting is intended to allow pressure release during operation such that no hazardous pressure build-up occurs within the vessel. Additionally, a pressure relief valve 59 may be provided on the vessel lid. The lid also provides for the pressure line mentioned above, and sensing lines for a gauge, for example, a Bourdon gauge, and a radiation detector 51. The radiation detector may be mounted either inside or outside the vessel, or preferable, one detector is mounted inside while a second detector is mounted outside of the vessel. The detector located inside the vessel may be located, for example, very close to the electrode 50. One suitable detector (for Tritium) is the Bicron Industries Corp. scintillation detector.

A programmable DC power supply 62 is connected to the electrodes 50, 52 within the vessel via corresponding connections 66, 64, in a configuration as given below. The electrodes within the vessel comprise a cathode 50 and an anode 52. The cathode 50 consists of, for example, a perforated Teflon spacer 68 having an 8-inch diameter, around which is wound a suitable host lattice material, such as nickel wire 70, or other selected material. A suitable amount of nickel wire is approximately 2–20 pounds of wire.

Such nickel wire 70 might comprise 0.003" nickel-200 wire. This commercially available wire is composed of >98.5% nickel, with small amounts of iron and cobalt. The wire may be treated with any of the surface topology processes described above to enhance the anharmonicity of the wire system. For example, the wire may be pulled through a laser-treated diamond die (as described above) such that surface relief structures on the die impart corresponding nanometric topological structures on the wire surface. The wire may be loosely braided into a cable of 125 strands, or some other braid scheme. The cable is wrapped loosely around the Teflon spacer such that a maximum amount of wire surface area is exposed. The braiding scheme also provides the ability to increase the surface area for a given amount of wire material. Other cathode wire and material alternatives are also suitable. The wrapped spacer 68 is entirely submerged in the liquid within the containment vessel. From its location in the vessel, the cathode 50, comprising the spacer 68 and wire 70, is connected to the negative line 66 of the power supply 62 via a spot-welded solid nickel rod 72, or other connecting line. This rod is thick enough to carry a high current density without overheating a connecting fitting 74 in the vessel lid.

In an alternate cathode configuration, a scintillation material is plated with nickel and attached to the cathode configuration 50 described above. This configuration provides a radiation detector mechanism in intimate contact with host lattice material, and may be connected to the radiation detector line 51 described above.

In a further alternative cathode configuration (not shown), a sheet of planar nickel or palladium alloy NSP processed as described above via, e.g. diamond scribing and anisotropic etching, is used in its sheet form as a cathode, or alternatively, rolled in a manner like that of electrolytic capacitors, forming a coiled tube which provides a large cathode surface area within a comparatively small volume. Such a cathode configuration, like the others, is entirely submerged in the liquid within a containment vessel. The rolled structure is particularly efficient in that it allows the liquid to deliver the protons or deuterons while at the same time providing a surface cooling mechanism via flushing of the liquid across the cathode surface.

Figure 8:
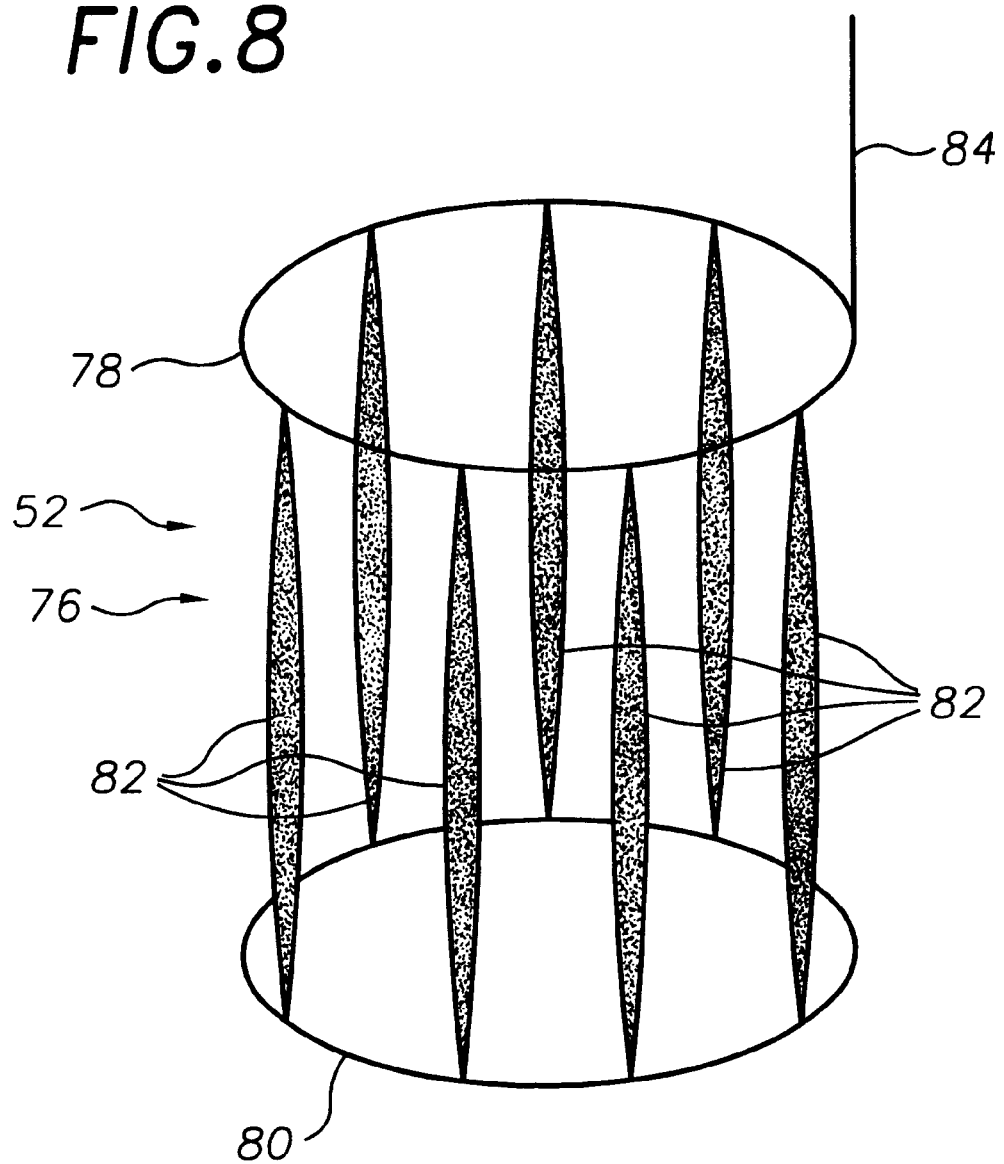
FIG. 8 schematically illustrates the anode of FIG. 7 in more detail.

Referring to FIG. 8, the anode 52 is shown in more detail. The anode consists of, for example, a cage 76 of chemically inert metal, such as titanium or nickel, which is plated with 0.0005" platinum. The cage diameter is 6" and the cage height is 6". Such a cage is made of top and bottom metal rings 78, 80, respectively, connected between which are metal fins 82, each fin having the dimensions of 0.030" in thickness and ⅝" in width. A number of such fins, five for example, are spot-welded to the top and bottom rings 78, 80. The particularly chosen size and number of fins is based on the amount of the cathode material used. Without an adequate anode surface size, the operation of the cell set-up may become current limited. The top ring 78 is also spot-welded to a ⅛" nickel rod 84 for connection to the positive line 64 of the power supply 62.

In operation, the power supply is set to provide a voltage drop of not less than 0.5 volts below the hydrogen overvoltage of 1.43 V forward biased between the anode and cathode. Electrolysis proceeds during the voltage application to dissolve a large ratio of hydrogen isotope, e.g., deuterium, into the host lattice; ideally a guest-host ratio of greater than 0.8 is achieved via the electrolysis.

As discussed above, nanoscale features on the host lattice, e.g., the nickel wire surface, enhance the transport of deuterium into the nickel surface and thereby promote such a high loading ratio. Further enhancement is provided using a chopped DC voltage rather than a constant DC voltage. The use of this signal scheme is motivated as follows. Maintenance of a high guest loading ratio requires a strong electric field gradient at the host surface. However, unintentional impurities in the electrolytic cell may hinder the existence of this gradient; such impurities in the cell invariably transport to the surface of the cathode, where they deposit on the cathode host surface. The impurities generally establish a polarization layer on the surface that reduces the effectiveness of the E-field there. This is due to the nature of the polarization layers responding in a capacitive manner; that is, the transport of charge across the polarization layer decays under the application of a constant DC field, as would be expected to occur across capacitor plates. Thus, such polarization layers act as an open circuit to an applied constant DC voltage. Accordingly, it is preferred that an AC voltage component be superimposed on a quiescent DC voltage to sustain transport across any polarization layers; such capacitive polarization layers act as a short circuit, rather than an open circuit, to the AC component.

The applied voltage is thus preferred to be a positive DC voltage with a duty cycle of between 5–2000 Hz, e.g., a square wave signal with a positive DC offset voltage, and an amplitude switching no less than 0.5 V below the hydrogen overvoltage of 1.43 V. With such a voltage scheme, the near surface of the host cathode acts like a diode, magnifying charge transport in the forward bias mode and restricting transport of dissolved guest species back out of the surface. In chemical terms, the DC chopping voltage acts to shift the dynamic equilibrium to a state favoring higher concentrations of guest species.

The current density of the operating cell is determined based on the cell's operating environment; the current density of the cathode host material is preferably not more than 100 mA/cm$^2$. Given a requirement to keep the power density to a reasonable level, and considering the fact that the anharmonicity enhancement techniques of the invention are surface phenomenon, the power density is minimized via a cathode design providing an increase in surface to volume ratio of the cathode. For example, the cathode host material may be fabricated, as described above, as large, thin sheets, and then the two electrodes may be interleaved with anode structures wound in parallel with the cathode in a design like that of an electrolytic capacitor. In such a design, the electrode sheets are ideally fabricated thinly, for example, as thin as 0.001", separated by a distance of 0.025". This separation distance is provided by some insulating media, e.g., even the liquid itself. Heat resulting from the operation of such an anode-cathode configuration in the operating cell electrolyte is transferred via cycling of the electrolyte through the cylindrical volume.

During cell operation, the electrolyte temperature is operated at a selected point for optimizing transport of heat from the electrodes. For example, the electrolyte may be maintained at or near its boiling point because this phase change can transport energy at a constant temperature.

Operation of a cell in the manner described above provides optimization of the materials and system for enhancing anharmonic oscillations of the system and correspondingly enhancing the probability for interaction of nuclei within the lattice. As discussed above, the methods of the invention taught herein for producing this enhancement are all based on recognition by the inventors herein that nanometric discretization of highly nonlinear materials produces large localized vibrational instabilities, giving rise to large-amplitude oscillation of nuclei within the material. Such oscillation provides a corresponding enhancement of the potential for nuclei in the material to interact.

Beyond the nanometric surface preparation schemes discussed above, nanometric discretization of anharmonic materials, i.e., nonlinearly bonded materials, is recognized by the inventors to enable and accommodate nonequilibrium conditions that provide enhancement of energetic reactions such as combustion processes. More specifically, aggregations of condensed matter, whether in solid or liquid form, are recognized to possess unique quantum mechanical energy localization properties when the bonding between atoms in the aggregations is nonlinear and the size of the aggregations is in the sub-micron regime. Here nonlinear atomic bonding is meant to characterize electronic interactions and their effect on the oscillations of parent nuclei whose subsequent displacement modes are not characterized by simple harmonic motion. Such nonlinear nanometric aggregations provide the ability to accommodate quantum confinement conditions in a condensed matter system. It is this quantum confinement condition, in combination with nonlinear inter-atomic bonding, that supports a nonlinear, nonequilibrium response to an external excitation in an energetic reaction such as a combustion process.

Hydrogen-bonded fuels such as hydrocarbons are recognized by the inventors to be uniquely well-suited as an anharmonic condensed matter system that can be manipulated to accommodate quantum confinement conditions whereby the fuel exhibits a nonequilibrium response during a combustion process. Hydrogen-bonded fuels are found to possess a substantial component of anharmonicity due to the substantial nonlinearity in the hydrogen intermolecular bonding. As explained later in the discussion, a composition of hydrogen-bonded fuel is specified in the invention for achieving a combination of quantum confinement and nonlinear inter-atomic bonding that produces a nonequilibrium combustion process.

First considering classical thermodynamic analysis of combustion, this analysis is based on the classical ideal gas model in which gas molecules, at or close to equilibrium, can independently translate in any of three degrees of freedom. The phenomenon of pressure is classically defined with respect to an ideal gas molecule in terms of collision of such a molecule with a wall during, e.g., a combustion process. That is, each time a molecule of mass m traveling with a velocity component u impacts a wall of, e.g., a combustion chamber, the molecule's momentum changes from $+m(u)$ to $-m(u)$, and the net momentum change is $2 m(u)$. The rate of change of momentum, $d(mu)/dt$, is defined as the net force per molecule. Pressure is then defined as the net force per unit area. The pressure exerted by N ideal gas molecules with average velocity u in a container of volume V is then given as $$P = mNu^2/3V. \tag{6}$$

Classically, the definition of temperature is related to pressure as $$T = PV/R, \tag{7}$$

where R is the gas constant. With this rather limited definition of temperature, the molar energy, E, of an ideal gas is a function solely of its temperature, namely as $$E = 3/2 RT. \tag{8}$$

This notion of energy of gas molecules is fundamentally based on satisfaction of the classical equipartition energy principle, which requires that each of the three degrees of translational freedom of the ideal gas be equally accessible for molecules of the gas, and that each of these translational degrees of freedom equally store and contribute to energy of the molecule.

Now considering molecular systems from a quantum mechanical perspective, molecules are seen to possess additional energy storage capabilities beyond translation. These storage capabilities are equivalently referred to as energy states or energy modes, and together consist of translational, rotational, vibrational, and electronic modes. The translational mode actually consists of three translational modes, one for each of the three dimensions. The quantum mechanical properties of molecular systems depend on the quantization of these energy modes and how energy is distributed among all of the accessible modes for molecules in a given region of space.

Throughout the time that a molecular system such as condensed matter hydrocarbon fuel system undergoes a chemical reaction during, e.g., combustion, the system is not at thermodynamic equilibrium. Therefore, the classical thermodynamic assumptions discussed above do not apply to the system during the combustion process, and can only be applied to end products of the process when they reach equilibrium. In particular, the equipartition energy principle assumption of only three equally populated translational modes as the sole contributor to energy conversion is not applicable. Instead, partitioning of energy among any of translational, vibrational, rotational, and electronic energy modes must be considered and must be expected to change with time during the course of the combustion process.

As explained in more detail below, the inventors herein have recognized that shock wave phenomena provide an energy transfer process by which a selected one of the three possible translational energy modes may be preferentially excited over the other translational modes and the rotational, vibrational, and electronic modes, due to anisotropic local pressure conditions in which more energy is directed along the direction of the selected translational mode than in directions normal to the shock wave front. As a result, the cohesive binding energy in a fuel undergoing a combustion event that is enhanced by a shock wave is liberated anisotropically into the forward direction of the shock wave propagation. In addition, because the energy transfer kinetics associated with a shock wave exceed the elastic response capability of a fuel system, a shock wave magnifies any nonlinearities of the fuel system; in other words, the nonlinear, anharmonic characteristics of hydrocarbon fuels, as discussed above, are enhanced by shock wave phenomena, to thereby enhance the quantum mechanical nature of specific fuel compositions, as explained below.

In accordance with the invention, a hydrocarbon fuel composition is specified which preferentially skews the energy released by the fuel during combustion into the translational energy modes over the vibrational, rotational, and electronic energy modes. In the invention, this fuel composition synergistically reacts with a shock wave during a combustion event to further skew the released combustion energy into a desired one of the three translational modes.

Partitioning of energy among the possible translational, rotational, vibrational, and electronic energy modes of a quantum mechanical system is determined based on temperature, entropy, and internal energy conditions of the system. This partitioning follows a so-called partition function, Q, that is separately defined for each possible energy mode. At equilibrium, there exists a well-defined distribution of energy mode populations that is reflected in a general statement of system temperature, T, based on how internal energy in the system is partitioned, as:

$$T = dS/dU, \tag{9}$$

where S is the entropy of the system, giving a measure of the system partitioning among the accessible energy states, and U is the internal energy of the system, giving a measure of the motion of the system components. The entropy, S, and internal energy, U, are each in turn determined based on the system partition function Q as:

$$S = k \ln Q + U/T, \tag{10}$$

and $$U = kT^2 (d\ln Q/dT)|_v, \tag{11}$$

where k is the Boltzmann constant.

Thus it is seen that the partition function Q determines both the entropy and internal energy of a system. The quantum mechanical rules governing the nature of partitioning of energy modes of a system are correlated with the number of possible energy distributions possible for a given system. Indeed, not all conceivable distributions are physically possible, based on quantum mechanical considerations for a given system; there exists limitations upon the number of ways that molecules of a system may be distributed among the energy modes, or equivalently, limitations upon the ways in which energy may be partitioned among the system molecules. As a result, the partition function is needed to quantify quantum mechanical partitioning considerations, in answer to the questions of which of all conceivable energy mode distributions are physically possible for a given system, and what the probabilities of occurrence are for those distributions that can exist.

The answer to this first question is defined by quantum mechanics. Electrons, protons, and neutrons are all Fermions, and as a basic quantum mechanical premise, no two Fermions can occupy the same wave function. Thus, each wave function, $\Psi_{k(j)}$, of energy, $\epsilon_j$, is either empty or filled with no more than one particle. The total number of particles of a given energy level, $n_j$, is determined by quantum mechanics as being equal to or less than the degeneracy of the level $g_j$. Each distinct way of assigning $n_j$ indistinguishable particles among $g_j$ distinct but indistinguishable wave functions is a distinct and microscopically separate state, or microstate. Each of such microstates produces the same macroscopically observable state, or macrostate. In answer to the second question posed above then, the probability of occurrence of any given macrostate is proportional to the number of possible microstates that could lead to it.

The most probable macrostate can be determined for a system by extremizing the partitioning of microstates subject to the boundary conditions of a fixed number of particles and a fixed total amount of energy in the system. This leads to a clear prescription for the number of states available for a system molecule, given as a molecular partition function, q, generally as:

$$q = \Sigma_j g_j e^{-\epsilon_j / kT}. \tag{12}$$

Given this molecular partition function for a system, the average energy per molecule, $<\epsilon>$, is given generally as:

$$<\epsilon> = 1/q \Sigma_{j=0} (\epsilon_j g_j e^{-\epsilon_j / kT}), \tag{13}$$

or equivalently,:

$$<\epsilon> = 1/q (dq/d(kT)). \tag{14}$$

The molecular partition function for translational modes of a system, $q_t$, is derived based on the quantum potential well analysis for a rectangular potential well of dimensions a, b, and c, where the possible energy levels for the potential well are given by:

$$\epsilon_{j,k,l} = h^2/8m \{j^2/a^2 + k^2/b^2 + l^2/c^2\}, \tag{15}$$

and where j, k, and l are integral quantum numbers for translational motion, h is Planck's constant, and m is the mass of the molecule. The molecular translational mode partition function, $q_t$ is then given for the three translational modes as:

$$q_t = \Sigma_j \Sigma_k \Sigma_l \exp\{h^2/2kTm(j^2/a^2 + k^2/b^2 + l^2/c^2)\}. \tag{16}$$

For large system dimensions, the summations in this relationship can be replaced by integrals because the separation between energy levels at large dimensions is so small that they may be treated as a continuum of energy levels. The molecular translational mode partition function then becomes:

$$q_t = [\int_{j=0} \exp(-h^2/8ma^2kTj^2)dj][\int_{k=0} \exp(-h^2/8mb^2kTk^2)dk][\int_{l=0} \exp(-h^2/8mc^2kTl^2)dl] \tag{17}$$

and because (a·b·c)=the volume, V, of the potential well, the integrals in this expression may be evaluated to give the molecular translational partition function as:

$$q_t = 2\pi m^{3/2}/h^2 kTV. \tag{18}$$

Then evaluating the general relationship given above in (14) for average molecular energy using this expression (18), the mean molar translational energy, $<\epsilon>_t$, is given as:

$$<\epsilon>_t = 3/2kT. \tag{19}$$

Turning now to the molecular partition functions for the other energy modes, the molecular partition function for rotational states is determined as:

$$q_r = \Sigma_{J=0}(2J+1)\exp[-(hB/kT)(J^2+J)], \quad (20)$$

where B is a rotation constant derived from the moment of inertia, I, of the molecule in question; and J is the quantum number for quanta of angular momentum, where J=0±1±2±3, . . . For large system dimensions, this summation may be evaluated as an integral, giving the molecular rotational partition function as:

$$q_r = 8\pi kT/h^2(I). \quad (21)$$

Then evaluating the general relationship given above in (14) for average molecular energy using this expression (21), the mean molar rotational energy, $<\epsilon>_r$, is given as:

$$<\epsilon>_r = RT(d/dT(\ln qr)|v=RT, \quad (22)$$

where RT has been substituted for NkT, where N is Avogadro's number.

The molecular partition function for vibrational modes is expressed as:

$$q_v = \Sigma_{v=0} e^{-vx}. \quad (23)$$

This partition function is not easily evaluated because the assumption of closely spaced levels at large dimensions does not hold for vibrational modes; the summation of expression (23) cannot thus be replaced with an integral. However, the parametric form of the partition function can here be specified to an arbitrary precision as:

$$q_v = kT/h\nu_0. \quad (24)$$

With this general form for the molecular partition function of vibrational modes, the mean molar vibrational energy, $<\epsilon>_v$, is determined based on the general expression (14) for average molecular energy, as:

$$<\epsilon>_v = RT^2(d(\ln q_v/dT)|_v = RT^2(1/T) = RT. \quad (25)$$

The partition function for electronic energy modes is more complicated than the other energy mode partition functions; while those partition functions are directed to partitioning of molecules, the electronic partition function is directed to partitioning of electrons of those molecules, and under quantum mechanical laws, only two electrons can share the same energy level. There are $g_i!/(g_i-n_i)!$ different ways of distributing $n_i$ indistinguishable electrons among $g_i$ energy levels—this $g_i$ term is referred to as the orbital degeneracy. Because $g_i$ is so much larger than $n_i$, the electronic energy partition function, $q_e$, is given as:

$$q_e = g_0 + g_1 e^{-\beta\epsilon_1} + g_2 e^{-\beta\epsilon_2} + \ldots, \quad (26)$$

where β is the thermometric parameter and $\epsilon_1$ is the energy of the first excited energy level. For most cases and at ordinary temperatures, the energy of the first excited electronic energy level is very large, and as a result, all terms but the first term of this expression are very small. To a good approximation then, the partition function for electronic energy modes is $q_e = g_0$, and using the expression for average molecular energy (14), the average molecular energy of the electronic states is $<\epsilon>_e = 0$. This makes intuitive sense, and leads to the specification that molecules, such as $CO_2$ and $H_2O$, are generally not electronically excited.

Taken together, the translational, rotational, vibrational, and electronic partition functions define an overall molecular partition function for a system as:

$$q = q_t \cdot q_r \cdot q_v \cdot q_e, \quad (27)$$

and the total molar partition function for the system, Q, is then given as:

$$Q = q_t^N/N! q_v^N \cdot q_r^N \cdot q_e^N \cdot e^{-E/kT}, \quad (28)$$

where N is Avogadro's number.

This discussion of energy mode partition functions specifically relied on the assumption that the system being characterized by the functions is macrosized, i.e., is of large dimensions, except in the case of the vibrational mode analysis, which did not need to rely on this simplification. The inventors herein have recognized that at small dimensions, in the nano-regime, the partition functions change correspondingly with the dimensional change. Specifically, it is found that in the nano-regime, the spacing between energy levels cannot be treated as a continuum, as they are in the macro-regime. Instead, it is found that the energy level quantization and corresponding separation is measurably large.

Consider the form of the four partition functions for the four energy modes, repeated below, to see how each is impacted by a dimensionality change:

$$q_t = 2\pi m^{3/2}/h^2 kT(a \cdot b \cdot c), \quad (29)$$

where (a·b·c) are the three linear dimensions defining the size of the quantum well produced by the size of the system under consideration;

$$q_r = \Sigma_{J=0}(2J+1)\exp[-(hB/kT)(J^2+J)], \quad (30)$$

$$q_v = kT/h\nu_0, \text{ and} \quad (31)$$

$$q_e = g_0. \quad (32)$$

It is recognized by the inventors that only the molecular partition function for the translational energy modes is impacted by a dimensionality change; note in the four equations above that only qt depends on the "size" of the system under consideration. Thus, only translational mode energy levels and populations of those levels are impacted by a system dimensionality change; the other modes exhibit energy level profiles and populations that are substantially unchanged when the dimensionality of the system is changed.

Figure 9:
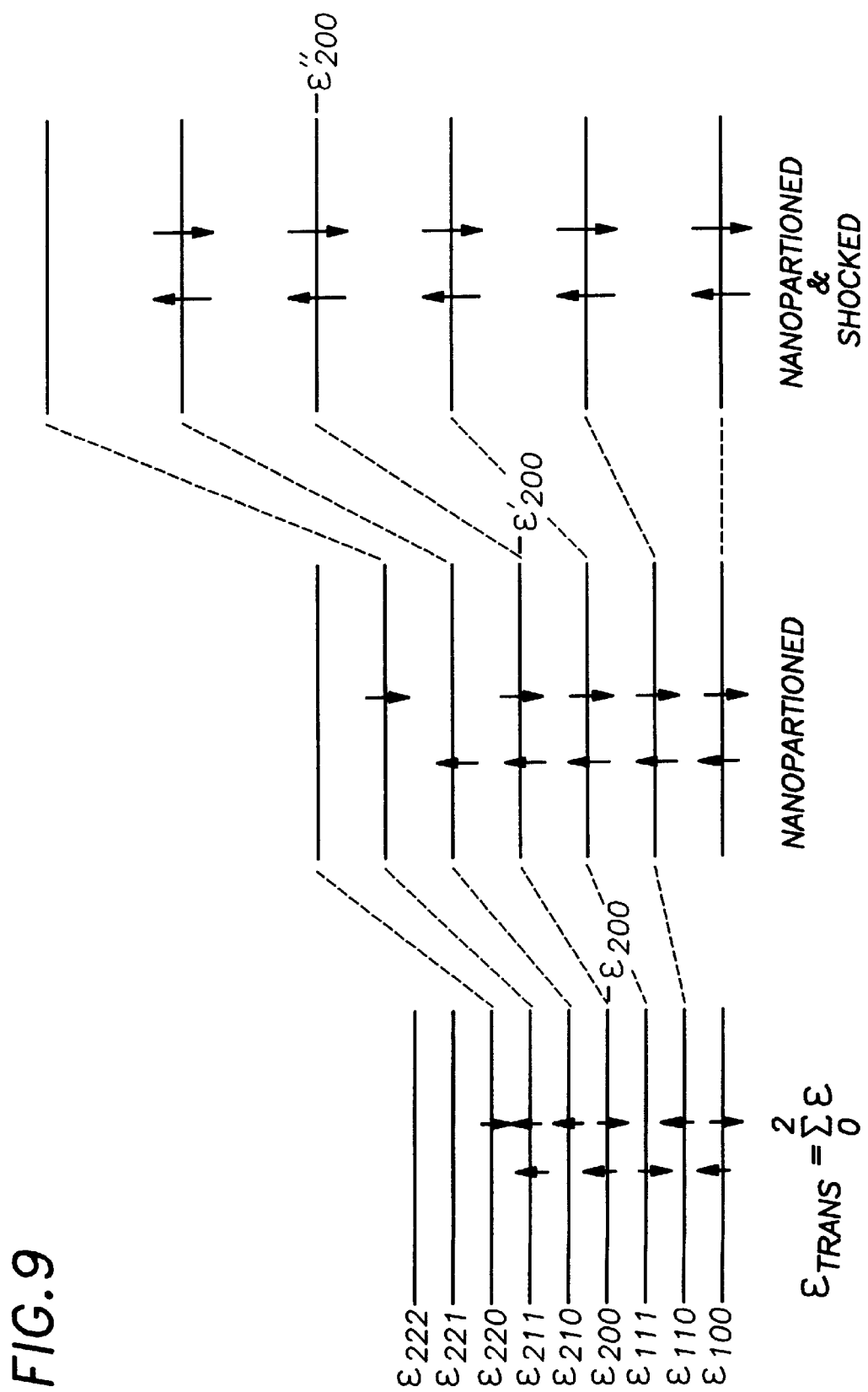
FIG. 9 diagrammatically illustrates quantum translational energy level spacing in a condensed matter system.

The impact of a dimensionality change on the translational energy mode partition function and corresponding energy level spacing is schematically illustrated in FIG. 9. FIG. 9 depicts the energy level spacing and particle population distribution, e.g., molecular population distribution, for any one of the three translational modes of an arbitrary region in a semi-infinite condensed matter medium. For the condition of large, macro-scale dimensions, the translational energy mode spacing and population is depicted on the left of the figure. Each energy level corresponds to one combination of the integral quantum numbers for translational motion, j, k, and l, which may each take on the value of 0, 1, or 2. The "stack" of energy levels in the figure is meant to depict the condition in which the energy of a given level is higher than that of the energy levels depicted below that level.

At large dimensions, the spacing between the energy levels is relatively small. The population of these closely-spaced levels is random, due to the balancing of entropy and internal energy considerations, as discussed above with expressions (10) and (11); each level may be populated by 0, 1 or 2 molecules. Thus, while energy considerations would predict that the levels fill sequentially from the bottom of the energy profile, at large dimensions, the driving force to maximize entropy, i.e., randomness, competes well, because at this dimension, the penalty in energy is on the order of kT.

A substantial decrease in system volume, or equivalently, system confinement region, due to a decrease in system size, or a corresponding increase in system pressure, causes an increase in spacing between the allowed translational energy levels, as depicted in the center of FIG. 9. An example of such a decrease would be a change in system dimension from the micron-regime or greater to the nanometric regime. This decrease in size causes a given energy level, e.g., $\epsilon_{200}$, to move from a first energy to a higher energy, depicted as $\epsilon_{200}'$. The $\epsilon_{200}$ and $\epsilon_{200}'$ energy levels also correspond to the weighted average energy for the macro-sized and reduced-size systems, respectively. Their marking explicitly illustrates that the average translational energy is increased by the reduction in system size.

The energy level spacing increase is a direct result of the fact that, as given above in expression (15), each translational energy level is inversely proportional to the size, or volume, of the system being characterized. Correspondingly, the difference in energy between two adjacent translational energy levels is inversely proportional to the volume, or confinement region size, of the system, and energy level spacing therefore increases in correspondence with an increase in the energy of the translational energy levels. As a result, the highest energy of the energy level spectra of the reduced-volume system is increased over that of the macro-size system, whereby higher energy levels are available to be populated in the reduced-volume system.

In characterizing a system undergoing such a shrinking of confinement region, it is assumed that the total energy of the system remains constant and that the number of particles, e.g., molecules, in the system remains constant. These are reasonable assumptions that may be expected to characterize most systems of interest. As a result of these assumptions, shrinking of the dimensions of the system causes the system molecules to be forced into lower quantum states, whereby the entropy of the system is decreased. This decreased entropy is a direct result of the fact that, as discussed above in connection with expressions (10) and (11), system entropy, S, is proportional to the partition function, which in turn is proportional to the system size, while system energy, U, remains constant with system size. Thus, as system size, or confinement region, decreases, so does system entropy. This condition is shown in FIG. 9 where it is seen that the symmetry of the population is greater for the reduced-size case depicted in the center of the figure than for the macro-size case depicted on the left side of the figure.

It must be noted again that this reduction in entropy, along with the increase in allowed energy level spectra, are directly related to reduced system dimensionality; and that this skewing in energy spectra and population is only exhibited by translational energy modes. The rotational, vibrational, and electronic energy modes are not directly sensitive to confinement conditions.

Referring now back to FIG. 9, there is illustrated on the right of the figure the system condition in which a reduced-size, or nanopartitioned, system is subjected to a transient pressure pulse, or shock wave. Such a pressure pulse results in an even smaller system confinement region. This reduction in confinement region further separates the translational energy levels for the same reasons given above. The enhanced energy level separation intrinsically alters the population of the energy levels to produce a more symmetric configuration. This increased symmetry corresponds to a reduction in entropy and is a consequence of the system drive to lower the total translational energy profile to match that of the equilibrium energy. However, the weighted average energy of the nanopartitioned and shocked system, $\epsilon_{200}''$, is greater than that of either the semi-infinite, macro-size system or the quantum confined system.

As explained in more detail below, during a transient pressure pulse, the characteristic of dS/dU for the system is negative, i.e., the change in entropy with respect to internal energy is negative, corresponding to a condition of population inversion, as a result of the decrease in entropy and increase in energy levels. Such a system condition, also referred to as a negative temperature condition, is understood by the inventors to display counterintuitive responses to excitations and unanticipated driving forces for controlling the return of the system to thermodynamic equilibrium.

In accordance with the invention, a hydrocarbon fuel is nanopartitioned to set up a system condition like that just described, in which the energy levels of the translational modes of the fuel system are spaced widely apart, whereby the weighted average of the translational energy levels is higher than it would be for a macro-sized embodiment of the hydrocarbon fuel system. As explained further below, the expanded translational energy levels of such a nanopartitioned fuel, combined with the lower symmetry population of those energy levels, controls the allowable exit channels for combustion products emitted by combustion of the nanopartitioned fuel. Specifically, the quantum characteristics of a nanopartitioned fuel define the range of allowable translational energies that the fuel can produce through combustion of the fuel. In other words, a nanopartitioned fuel enables combustion products to take on a higher level of translational energy than is enabled by conventional, continuous fuel systems.

The total accessible energy content that can be tapped by hydrocarbon fuel combustion has historically been well-established by calorimetric studies typically conducted under carefully controlled, near-equilibrium conditions. At thermal equilibrium, the system of reaction products, namely $CO_2$ and $H_2O$, exhibit an expected full spectrum of translational, rotational, vibrational, and possibly electronic modes.

In combustion of a nanopartitioned fuel according to the invention, this predictable, equally distributed energy spectrum of equilibrated reaction by-products does not exist. Instead, the translational energy produced by combustion of the nanopartitioned regions of the fuel is amplified as a result of the translational energy level spacing phenomena explained above. This translational energy amplification must be balanced, however, by other of the system energy modes, in order to meet the quantum mechanical restriction of constant system energy. The inventors herein have recognized that the energy mode balancing required for increased translational mode energy is attained at the expense of the rotational and vibrational energy modes.

This condition is illustrated by a quantitative example. Consider a molecule of carbon monoxide at room temperature and under macro-sized containment requirements; for example, a system of carbon monoxide at 300° K in a box 10 cm on a side. The spacing between energy levels of the various energy modes may be determined based on the above relations for partitioning. For any of the translational energy modes, the spacing between energy levels, $\Delta E_t$, is given as:

$$\Delta E_t = \epsilon_{1,1,0} - \epsilon_{1,1,0} = h^2/8ma^2, \quad (33)$$

based on the expression for the translational molecular partition function, expression (15) above, where a is the dimension of interest for the given one of the translational modes. This $\Delta E_t$ expression defines the spacing between, e.g., the $\epsilon_{1,1,0}$ energy level and the $\epsilon_{1,1,0}$ energy level.

Given the carbon monoxide system specification above, the spacing between two translational energy levels is given by expression (33) to be $\Delta E_t \sim 1.7 \times 10^{-20}$ kcal/mole. Comparing this with kT, the Boltzmann constant-temperature relation, which at room temperature is about 0.59 kcal/mole, it is seen that indeed, at large dimensions, or equivalently, for macroscopically-sized systems, the separation between energy levels in the translational energy mode is immeasurably small, and further that many states above the ground state are populated, because $\Delta E_t$ is so much smaller than kT.

The separation between levels of the rotational energy mode may be determined for the carbon monoxide system based on an expression for this rotational state separation, $\Delta E_r$, as:

$$\Delta E_r = \epsilon_{J=1} - \epsilon_{J=0} \sim h/4\pi^2 I \sim 0.01 \text{ kcal/mole}. \quad (34)$$

It is seen that at large dimensions, the separation between energy levels in the rotational energy mode is also very small, and that because $\Delta E_r$ is much smaller than kT, many states above the ground state are populated.

The separation between levels of the vibrational energy mode is determined based on an expression for $\Delta E_v$, given as:

$$\Delta E_v = hc\omega_e, \quad (35)$$

where c is the speed of light and $\omega_e$ is the characteristic Debye frequency. This relationship for rotational energy level spacing is based on the partition function for vibrational energy levels discussed above. For the carbon monoxide system considered at room temperature, the rotational energy level spacing is given by expression (35) as $\Delta E_v = 6.21$ kcal/mole. This spacing is quite large compared with kT at 300° K, indicating that very few carbon monoxide molecules are vibrationally excited above the ground state.

Finally, considering the electronic energy mode, the partition function for the electronic energy mode is a constant, and the separation between the ground and first excited electronic states is given by the ionization energy of the system under consideration. For the carbon monoxide system, the energy of the first excited state may be specified accordingly as $E_e = 186.0$ kcal/mole. Thus, like the rotational modes, the spacing between the ground state and the first electronic energy level is so large that it may be stated that the rotational and electronic modes are not fully populated; only the translational and rotational modes are characterized by a spectrum of energy levels that are spaced closely enough to accommodate population of many states above the ground state.

Now consider the same carbon monoxide system at a confinement dimension of 10 Å, rather than 10 cm, and at room temperature. In this nanopartitioned case, the rotational, vibrational, and electronic mode energy level spacing and populations are the same as they were for the 10 cm case above, but the translational mode energy level spacings are quite different. Based on the relation for translational energy level spacing given above in expression (33), the translational energy level spacing are in this nanopartitioned case given as $\Delta E_t = 1.7$ kcal/mole. This separation is of the same order as kT at room temperature and roughly equal to kT at 750° C.

Thus, at nanopartitioning confinement dimensions, the carbon monoxide system exhibits a translational energy mode spectrum that is amplified over that of the same system at macro-sizes. The excess translational energy that may be accommodated by the amplified energy mode spectrum results in extraction of energy quanta from the other energy modes into the translational mode; particularly from the rotational and vibrational modes. Stated another way, the skewing of the translational mode population to higher energy levels is compensated for by a reduction in the mode populations of the other energy modes.

The excess energy and mode population required to compensate for the nanopartitioned translational energy mode increase is primarily provided by the rotational mode, because the energy levels of the rotational mode are spaced closely together, whereby there is a large population available for extraction. This is illustrated in the above example for carbon monoxide, where it is seen that the spacing between rotational energy levels is much less than kT at room temperature. In contrast, the energy level spacing for the vibrational and electronic modes of isolated molecules are so much larger than kT that only the ground state of these modes is likely to be populated, and as a result, these modes do not have a viable energetic population to offer for translational energy compensation.

It must be noted that this characterization of the various energy mode levels and populations is specifically directed to intramolecular energy modes, i.e., energy modes of an isolated molecule. In a condensed matter system such as a hydrocarbon fuel, these energy modes also exist, but additional modes also exist for characterizing the cohesive binding energy between the molecules of the fuel. This cohesive binding energy may be characterized by an intermolecular vibrational energy mode, or equivalently, by an electronic energy mode. Unlike intramolecular vibrational and electronic energy modes, intermolecular vibrational and electronic energy modes characterizing cohesive binding energy have closely-spaced energy levels. Populations of intermolecular vibrational and electronic energy modes therefore provide viable chemical binding energy states that may be tapped for amplified translational energy compensation.

It is widely recognized that some amount of chemical binding energy is extracted from a hydrocarbon fuel by a conventional combustion process. In the invention, however, an even larger amount of cohesive binding energy is extracted as a result of the skewing of translational mode energy spectra, due to nanometric partitioning; compensation for the increased accommodation of translational energy and population intrinsically requires repartitioning of the chemical binding energy intermolecular vibrational and electronic energy modes into translational energy. As a result, all of the rotational, vibrational, and electronic energy modes are characterized as contributing energy to an amplified translational energy mode during combustion of a nanometrically-partitioned hydrocarbon fuel. As a result, as explained below, more energy can be extracted from the combustion event than might otherwise be possible. In other words, a nanopartitioned fuel in accordance with the invention provides the ability to extract, by way of a combustion event, energy from all possible energy modes of the fuel, in contrast with conventional fuel and combustion systems, in which only translational energy may be appreciably extracted.

Aside from cohesive binding energy extraction, the extraction of energy from the rotational energy mode of a condensed matter hydrogen fuel system into the translational mode of that system is enabled by the correlation between translational and rotational levels that characterize hydrogen bonded systems. The angular dependence of the intermolecular forces of hydrogen molecules are indeed so significant that the intermolecular translational and rotational partition functions are not separable, and anharmonic, i.e., nonlinear, mixing of the modes occurs, even in semi-infinite hydrogen system aggregations. This nonlinear condition, which extends from interatomic bonding to intermolecular bonding and which enables redirection of energy among various modes, combined with the quantum confinement condition produced by nanometric partitioning, which produces a skewed translational mode spectrum, together result in a condition that may generally be termed energy localization. Energy localization is thus here meant to require the conditions of nonlinear interatomic and intermolecular bonding along with quantum confinement. The invention herein contemplates an extension of this phenomena to any anharmonic condensed matter system; any anharmonic condensed matter system, in any form, when partitioned to a size regime where quantum confinement conditions prevail, will produce energy localization, whereby the energy spectra of the system are skewed to translational energy modes.

Turning now to nanopartitioning of a liquid hydrocarbon fuel system in accordance with the invention, such a fuel system is preferably nanopartitioned such that the fuel consists of distinct, separate fuel regions, e.g., fuel droplets, that are each of a sub-micron diameter, and more preferably that are each of a diameter of between about 10 Å and 100 Å. The partitioned fuel regions constitute hydrocarbon fuel molecular aggregations; as such, each molecular aggregation contains multiple molecules of hydrocarbon fuel. Partitioning of the fuel on a micro or milli scale, i.e., in the range of microns or millimeters, is found to produce less than optimal conditions for quantum confinement phenomena to prevail. In addition, it is found that at very small partitioning dimensions, e.g., at a dimension of less than about 10 Å, the quantum confinement phenomena are less prevailing; nanopartitioning thus preferably is not below about 10 Å.

The nanopartitioned hydrocarbon fuel system may consist of any number of components, as will be understood by those in the field of petroleum processing, that are desirously included to achieve specific combustion conditions. For example, a hydrocarbon fuel may consist of a gasoline-alcohol mixture or other mixture, such as those conventionally designed to provide combustion enhancement agents.

Nanopartitioning of a hydrocarbon fuel is achieved in accordance with the invention by way of any of a wide range of techniques. These techniques may all be applied to any of four main classes of fuel systems, or other suitable fuel systems. In a first class of fuel systems, a hydrocarbon fuel is combined with an immiscible fluid, e.g., a liquid that is substantially insoluble in the fuel; many materials commonly referred to as solvents are acceptable such immiscible fluids. In a second class of fuel systems, an emulsion of a fuel and other immiscible fluid is combined with a surfactant. A third class of fuel systems is characterized by fuel combined with a surfactant only, and a final fourth class of fuel systems includes fuel only, i.e., includes neither a surfactant nor a solvent in the partitioned fuel system. Each of these fuel system combinations will be discussed in turn below.

Referring now to FIG. 10, there is shown apparatus for producing a nanopartitioned fuel by way of mechanical processing techniques. In a first such technique, shown in FIG. 10A, a fuel system 100, consisting of any of the four fuel system component combinations given above, is held in a beaker 102 or other containment vessel. An ultrasonic horn 104 is positioned with respect to the beaker such that one end 106 of the horn is immersed in the fuel system. Operation of the ultrasonic horn in a conventional manner produces ultrasonic cavitation in the fuel system, whereby vapor pockets 108 form in the fuel system, resulting in a texturing of the fuel system. This texturing produces distinct fuel regions or droplets, e.g., hydrocarbon molecular aggregations, each of which are of a micron or sub-micron dimension.

In the case of a fuel system component combination of fuel and immiscible fluid such as an insoluble solvent, it is preferable that the peak pressure pulses overcome the intrinsic tensile strength of the solvent. Thus, where the solvent consists of, e.g., water, it is preferable that the peak pressure pulses produced by the ultrasonic horn 104 exceed 150 Mpa, or 1500 Atm. This pressure level is that at which the intrinsic tensile strength of water may be overcome. In general, ultrasonic cavitation in a liquid system is enhanced at surface inhomogeneities of the system, where gas pockets, or nuclei, easily form. Such nuclei, or distinct gaseous regions, are prevented from dissolving by any of several possible mechanisms, once the nuclei exceed a critical size. The dynamic tensile strength, or cavitation threshold, for a fuel-water system thus depends upon the size of the produced gaseous nuclei, the surface tension of the system, and the near-past pressure conditions of the system. This may be understood in part by the fact that cavitation produced by one pressure pulse event may result in nuclei that affect the threshold for subsequent cavitation conditions.

This ultrasonic cavitation process can be combined with a homogenization process to produce a desired nanopartitioning of a fuel system. Referring to FIG. 10B, in one example homogenization process, a fuel system, e.g., a fuel-solvent combination 110, is passed through a homogenization tube 112, which includes a frit 114 positioned at a point along the length of the tube. The frit 114 consists of quartz, polytetrafluorocarbon, available as Teflon®, nylon, or other inert material in which a number of pores 116, several of which are shown schematically, have been formed through the length of the frit material. The frit pores, formed by conventional methods, are preferably each of a diameter in the micron range, and preferably are less than 100 $\mu$m in diameter.

The fuel system 110 to be nanopartitioned is passed through the homogenization tube and frit at high pressure, e.g., 20,000 psi–40,000 psi; upon exit, the processed system 118 takes on a partitioning profile that corresponds to the frit size and process pressure. Very small frit pores and/or very high process pressures are known to result in destruction of fuel, solvent, and surfactant molecular structures. Thus, a balance between the desired scale of the fuel system partitioning and process limitations must by achieved. This can indeed be achieved by a two-step nanopartitioning process where the homogenization process is carried out in series with an ultrasonic cavitation process, whereby the two processes operate synergistically to produce nanopartitioning of a fuel system. It should be noted, however, that both the homogenization and cavitation processes can be individually employed to produce a desired partitioning scale. As mentioned previously, it is preferred that the fuel system be partitioned to hydrocarbon fuel droplets, e.g., hydrocarbon molecular aggregations, that are each of sub-micron dimensions, and most preferably are of a range between about 10 Å and 100 Å.

Figure 10A:
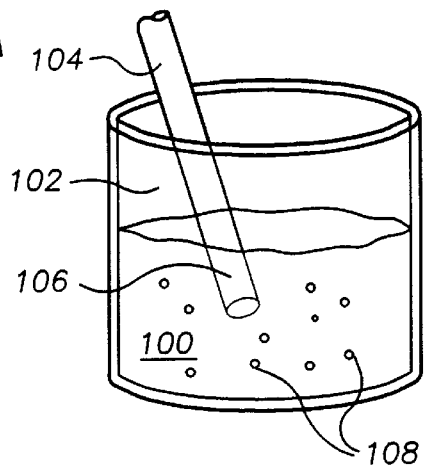
FIGS. 10A–10G illustrate various apparatus configurations for nanopartitioning a fuel in accordance with the invention.
Figure 10B:
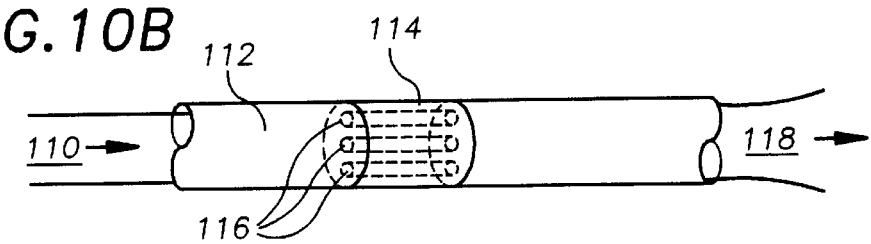
Figure 10C:
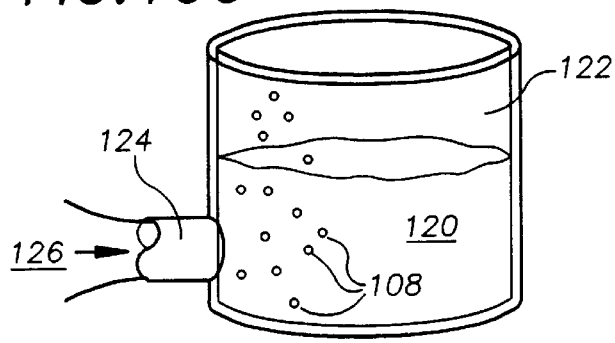

In a first variation of the cavitation/homogenization processes, shown in FIG. 10C, a starting amount of a fuel system 120 to be partitioned is held in a beaker 122 or other suitable vessel, to which is attached an input port 124. Any one component of the fuel system, e.g., a solvent or surfactant, or all components of a fuel system can be injected 126 into the vessel via the input port 124 at high pressure. Such high pressure injection acts to agitate the amount of fuel system already in the vessel, resulting in gaseous cavitation nuclei sites 108, and partitioning of the liquid system.

Figure 10D:
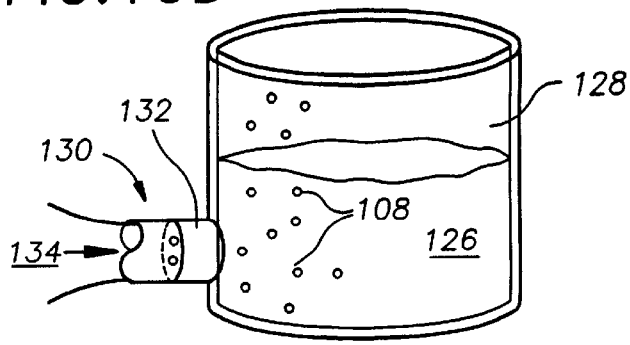

Similarly, as shown in FIG. 10D, a starting amount of a fuel system 126 can be held in a beaker 128, to which is attached a homogenization tube 130. The tube 130 includes a frit section 132, like that shown in greater detail in FIG. 10B. One component or all components of the fuel system can be injected 134 through the frit tube 130 at high pressure, whereby they are partitioned by the frit pores. Once injected into the beaker 128, the partitioned components initiate cavitation events that produce nuclei sites 108 in the fuel system, resulting in further partitioning of the system.

Figure 10E:
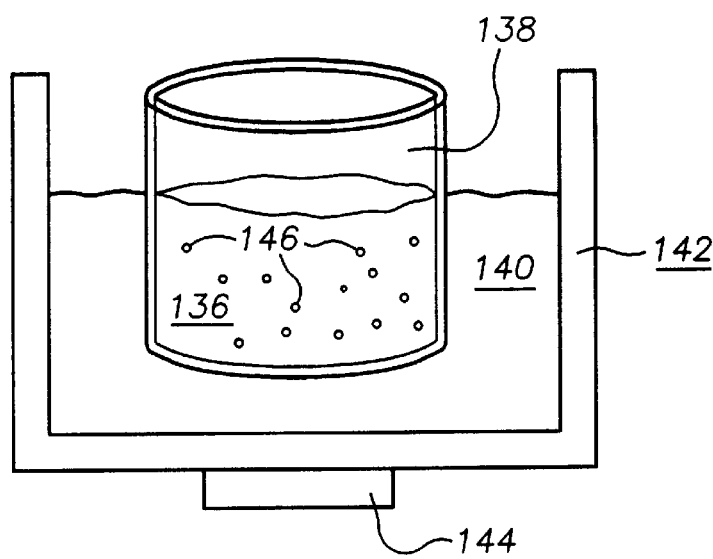

In alternatives to the ultrasonic cavitation horn technique like that shown in FIG. 10A, an ultrasonic transducer as shown in FIG. 10E can be employed to partition a fuel system. Here, a fuel system 136 to be partitioned is held in a first beaker 138, which itself is submerged in an ultrasonic bath 140, held in an exterior vessel 142. The ultrasonic bath and fuel system are agitated by way of a conventional ultrasonic transducer/pulse generator 144. Application of the ultrasonic pulses results in mechanical agitation of the fuel system to the point that it is separated into distinct confinement regions.

Figure 10F:
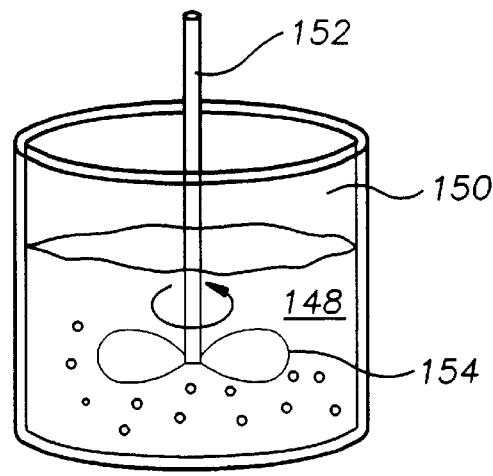

In yet another alternative technique, shown in FIG. 10F, agitation of a fuel system can be accomplished by way of a stirring mechanism. Here, the fuel system to be partitioned 148 is held in a vessel 150, into which is submerged a stirring tool 152. The stirring tool preferably includes a geometric end section 154 consisting of a looped configuration or other geometric configuration that enhances stirring and agitation. In operation, the stirring tool is rotated, e.g., as shown, in the fuel system. At high stirring speeds, the fuel system is agitated to the point that it is effectively separated into distinct nanopartitioned molecular aggregations.

Figure 10G:
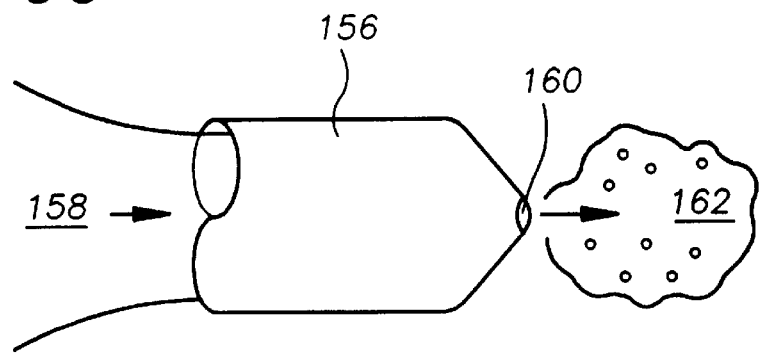

Aside from cavitation and homogenization, an atomization technique can be employed in accordance with the invention to nanopartition a fuel system. In such a technique, as shown in FIG. 10G, a fuel system to be partitioned 158 is injected at high pressure into an atomizer 156. The atomizer is provided with an outlet port 160 having a dimension on the order of microns, and preferably less than 100 μm in diameter. High pressure injection of the fuel system through the atomizer results in atomized molecular aggregations 162 of the fuel at the atomizer outlet. As with the homogenization process discussed above, this atomization process is sensitive to the size of the outlet port size and the atomization pressure; molecular destruction of the fuel system may occur at very high pressures or very small port dimensions. Accordingly, it is preferable to employ the atomization process using a "safe" range of pressures and port dimensions and if necessary, combine the atomization process with another process, e.g., a cavitation process, to achieve a desired nanopartitioning dimension.

Turning now to the specifics of the four main classes of fuel systems described above, recall that they include the combinations of a fuel-only system, a fuel-immiscible fluid system, such as a fuel-solvent system, a fuel-surfactant system, and a fuel-solvent-surfactant system. As mentioned above, any of the mechanical partitioning techniques provided by the invention are applicable to any combination of fuel system components. A fuel-only system is one in which no additives are included; here the fuel alone is partitioned to the desired nanometric confinement condition. As discussed above, the fuel may consist of any acceptable hydrocarbon fuel, e.g., gasoline, and may include additives such as ethanol, methanol, or other additive, as is conventional.

A fuel system comprising a combination of a fuel and an immiscible fluid is by definition made up of a fuel and another phase or phases that are substantially insoluble with the fuel. Many liquids known as solvents exhibit this characteristic for a range of specific fuels. Appendix A provides a listing of example solvents that are contemplated by the invention. This listing is meant to provide examples only and does not limit the scope of solvents or other immiscible fluids contemplated by the invention. The only requirement of solvents to be employed in accordance with the invention is that they be substantially insoluble in a selected fuel.

For many applications, water is the preferable fuel system solvent phase. Water exhibits a high degree of anharmonicity. Water thus provides the ability to produce a synergistic fuel-solvent combination that is strongly anharmonic overall, whereby energy and population exchange between various energy modes is easily accommodated. The low cost and high abundance of water are two additional factors that make water a preferable solvent. However, as will be understood by those skilled in the art, there may be other of the solvents given in Appendix A that are better suited for specific fuel system applications; and for some applications, it may be preferable to use a fuel alone.

Surfactants are known to enhance the stability of an emulsion. A surfactant phase may be employed in a fuel-solvent-surfactant combination in accordance with the invention to enhance the stability of a fuel-solvent emulsion over time. It must be noted that a surfactant is not, however, required in the fuel system, but rather, acts as a stabilization enhancer. If long-term stability of a fuel-solvent emulsion combination is not required, or if a specific nanopartitioned fuel-solvent combination is found to exhibit adequate stability for a given application, a surfactant may be unnecessary. A surfactant may also be combined with a fuel alone to enhance partitioning of the fuel, without combination with a solvent. Appendix B provides an example listing of surfactants contemplated by the invention. As with Appendix A, Appendix B is meant to provide examples only; the scope of surfactants contemplated by the invention is not limited to this list.

Other fuel system component combinations are within the scope of the invention. For example, a material that is substantially insoluble in both a fuel and solvent phase or surfactant phase can be added to a fuel-solvent combination or fuel-surfactant combination. Such a material may, e.g., act as an agent for producing a size-specific precipitation reaction that is not expected of a conventional surfactant material. This size-specific precipitation should most preferably be tailored to the desired nanopartition dimensions of the fuel. Additional fuel system combinations, e.g., a fuel and one or more other non-solvent, non-surfactant materials, is also contemplated by the invention; any such combination preferably accommodates nanopartitioning of the fuel component in the system. Preferably, any components added to a fuel in a combination nanopartitioned fuel system do not increase production of pollutants during combustion of the fuel system and do not degrade engine components by way of, e.g., abrasive wear or chemical corrosion, beyond that which a fuel itself might produce.

It is not required that the mechanical nanopartitioning techniques described above or the other nanopartitioning techniques to be discussed below produce a specific nanopartitioning confinement of any solvent phases, surfactant phases, or other immiscible phases combined with a fuel in the nanopartitioned fuel system. The only requirement of a selected partitioning technique in accordance with the invention is that nanometric fuel regions, e.g., hydrocarbon fuel molecular aggregations, are produced for enabling energy localization and translational energy mode population skewing in the fuel. Solvents, surfactants, other immiscible phases, or other materials included in a fuel system may be partitioned in the nano-regime or smaller, partitioned in the micron, milli, or other regime, or may remain completely unpartitioned.

Turning now to additional nanopartitioning techniques, supercritical fluid processing techniques can be employed in accordance with the invention in a process whereby mixtures selectively precipitate out into uniformly sized aggregations having a size dimension that is determined by the pressure and temperature of the process. In an example of one such process, supercritial $H_2O$ and $CO_2$ fluids are together employed to nanopartition a fuel-water system combination. The critical temperature of carbon dioxide is 31° C. at a pressure of 73 atmospheres. The critical temperature of water is 374° C. at a pressure of 218 atmospheres. These properties enable a supercritical $H_2O$—$CO2$ fluid combination to exhibit superior liquid solvent capabilities as well as mass transport capabilities superior to that of conventional liquid solvents.

This supercritical combination, when maintained at a temperature above the critical temperature of either component, exhibits high solubility with a hydrocarbon fuel, in contrast with the low solubility that characterizes both substances at lower solubility temperatures. Thus, in a first step of the process, a mixture of fuel, $H_2O$, and $CO_2$, is held above a temperature of 374° C. at a pressure of 218 atmospheres, to completely dissolve the three components into a homogeneous mixture. This pressure-sensitive mixture exhibits low viscosity, high diffusivity, and low surface tension.

In a second step, the pressure and temperature are rapidly reduced. This sudden decrease reduces the solubility of the dissolved fluids in the hydrocarbon fuel. Such a sudden decrease is accomplished, e.g., by aspirating the supercritical mixture from a vessel in which the high pressure, high temperature conditions are maintained, out through an injector nozzle. As it is aspirated, the hydrocarbon fuel precipitates out of the mixture with an extremely fine size scale that is determined by the hydrodynamic flow conditions of the nozzle. This precipitation is what produces a desired nanopartitioning of the fuel component in the system.

In one example, the supercritical mixture is emitted from an orifice having a cross-section of 625 $\mu m^2$. With a supercritical pressure of 238 atmospheres, the flow rate of the mixture out of the nozzle is about 10 SLPM. Given an expansion zone of 100 mils in length, the time required for the mixture to expand to ambient pressures is about $10^{-7}$ seconds, corresponding to a supersonic velocity. At this velocity, shock waves are induced in the liquid as it cools adiabatically. The resulting supersaturation condition of the mixture leads to catastrophic nucleation processes whereby nuclei of a dimension less than about 100 Å are produced. The huge pressure reduction gradients that accompany the mixture's expansion to ambient pressures accommodates a supersaturation ratio far larger than could be achieved in a non-supercritical process. At ambient pressures, the resulting mixture consists of nanopartitioned fuel confinement regions, e.g., hydrocarbon molecular aggregations, in a fuel-water combination.

In yet another nanopartitioning process in accordance with the invention, a catalytic reformation reaction is enabled and initiated to partition a fuel system mixture. In this process, a chemically reactive site is set up to allow a cluster of two components to nucleate and grow to a certain size, after which the components are detached from the site. This two-step sequence is preferable carried out at a plurality of surface sites simultaneously, whereby a reasonable volume of nanopartitioned fuel system components are produced in a short time. In one example of this process, internal surfaces of a reaction vessel are conditioned to include such nucleation sites. In a second example, a densely-packed granular material, e.g., a chalcogenide, is processed by intercalating the fuel system materials to be included in the fuel system. Once intercalated, the fuel system components react in the chalcogenide channels. After a desired nanometric size is reached, the fuel system is then flushed from the chalcogenide.

As will be understood by those skilled in the art, the nanopartitioning techniques discussed above are but examples of a wide range of processes that effectively produce a fuel system in which the fuel component is nanopartitioned. The nanopartitioning techniques contemplated by the invention are not limited to specific techniques or types of techniques; but rather, are characterized in general by their ability to effectively partition a hydrocarbon fuel into sub-micron regions of confinement, e.g., hydrocarbon molecular aggregations, that enable translational mode energy localization and rebalancing of energy among various energy modes in the fuel.

Turning now to considerations for combustion of a nanopartitioned fuel system, combustion processes in accordance with the invention optimize population of fuel system translational modes and effectively extract the enhanced translational energy of the fuel before the combusted fuel molecules thermalize and return to randomized energy mode levels and populations. In other words, the combustion process of the invention sets up an enhanced translational velocity and energy profile for combustion products. This anisotropic energy mode profile is selected and motivated based on considerations of combustion velocity and energy profiles and their effectiveness at transferring momentum to a piston or other such moveable momentum transducer in a combustion chamber.

A conventional combustion process extracts energy from a hot, fully equilibrated gas and transfers a corresponding amount of momentum to a piston. In such a fully equilibrated combustion process, combustion products are characterized by a full complement of translational, rotational, vibrational, and electronic energy spectra; and additionally, each of the three possible translational energy modes—one for each linear coordinate direction—are equally populated. A simple geometric analysis demonstrates that rotational, vibrational, and electronic energy modes of combustion products do not, however, contribute to momentum exchange with, or thrust of, a translating piston; indeed, only combustion energy in the one translational mode whose linear coordinate axis coincides with the translational axis of the piston stroke appreciably contributes to the piston thrust.

A simple manifestation of this phenomena is that during a combustion process, molecules in the combustion products that are moving perpendicular to the piston stroke do not contribute to momentum transfer to the piston. Instead, these molecules produce low grade heat. Only the molecules translating with a velocity component parallel to the axis of piston translation substantially contribute to piston thrust.

Based on this, the inventors herein have recognized that superior momentum transfer is achieved in a combustion process that employs a nanopartitioned fuel, which as explained above exhibits population skewing to the translational energy modes of the fuel during combustion, and that employs an energy extraction technique to enhance transfer of energy from the one translational energy mode whose axis corresponds to that of, e.g., a piston stroke, or that of the axis of movement of other such moveable momentum transducer. The energy extraction technique is also selected to preferably extract an appreciable amount of, e.g., the piston-aligned translational energy before the fuel system returns to equilibrium and the various energy modes become more equally populated.

In accordance with the invention, the energy extraction technique to be employed by a combustion process is achieved with a planar shock wave applied to a nanopartitioned fuel as the fuel is combusted. A combustion chamber in accordance with the invention therefore preferably accommodates apparatus for initiating such a shock wave. In the invention, combustion of a nanometrically partitioned fuel is enhanced by a shock wave excitation in three ways. First, as explained above with regard to FIG. 9, a shock wave applied to a nanopartitioned fuel produces a transient pressure pulse in the fuel, during which the translational energy mode skewing of the fuel is amplified. Second, initiation of a planar shock wave excitation along the translational axis corresponding to that of, e.g., a piston stroke, or that of another moveable element, such as a turbine blade, enhances transfer of momentum to the piston from the one translational mode of the fuel that corresponds to the piston stroke axis. Third, the supersonic speed of the shock wave excitation enhances transfer of an appreciable amount of energy from the fuel before the combusted fuel re-equilibrates and repartitions the enhanced translational energy back into other energy modes.

Considering the first of these functions of the shock wave excitation in a combustion event in more detail, as a shock wave excitation passes through a nanopartitioned fuel, very high local pressures develop in the fuel along the direction of the shock wave front propagation. The condensed matter densification resulting from this pressure leads to additional energy level separation and population skewing of the one translational energy mode that corresponds to the direction of the shock wave front propagation. In other words, the shock wave excitation favors the energy level population of the translational energy mode aligned with the shock wave front, whereby the internal energy of the combustion products is moved to a more anisotropic state. Stimulation of the population of one of the fuel's translational modes spectra to a non-equilibrium condition even greater than that produced by the nanopartitioning of the fuel is therefore achieved by the shock wave excitation.

The second function of the shock wave excitation, namely, efficient transfer of energy along a given translational axis from a corresponding translational energy mode to a piston, is a function of the force with which the shock wave front propagates through the combustion chamber along the translational axis of the piston. Alignment of the shock wave front with the translational energy mode of highest energy localization results in transfer of energy from that mode to a far greater degree than any of the other modes because the shock wave front applies high forces along the direction of that mode. This alignment thereby provides the link between translational mode energy enhancement and the extraction of that enhanced amount of energy. Because the shock wave itself produces enhancement of the one translational energy mode, such alignment is inherent. The alignment causes the $H_2O$ and $CO_2$ molecules formed during combustion of the nanopartitioned fuel to have enhanced velocity components in the direction of the piston, whereby a superior degree of momentum transfer is accomplished.

The third function of the shock wave excitation is based on high speed of the excitation relative to a combustion event. Shock waves are fundamentally characterized as phenomena in which the magnitude of the excitation exceeds the response characteristics of the medium through which the shock wave propagates. This effect is compounded in a nonlinear, i.e., anharmonic, condensed matter system in which, unlike an elastic, or harmonic, condensed matter system, the amplitude of an excitation is not independent of the frequency and velocity of propagation of the excitation. Thus, the magnitude of the shock wave excitation in the nanopartitioned fuel and the corresponding enhanced excursion of the fuel from equilibrium is fundamentally magnified by the speed and frequency of the shock wave excitation. While this excitation speed pushes the system farther from equilibrium, it is also the mechanism by which energy is quickly transferred before the system re-equilibrates; under shock conditions there is insufficient time for the system to achieve equilibrium. It is therefore not only the shock wave alignment, but the speed of the shock wave that enables substantial energy transfer before the enhanced translational energy of the combustion products diminishes.

Figure 11:
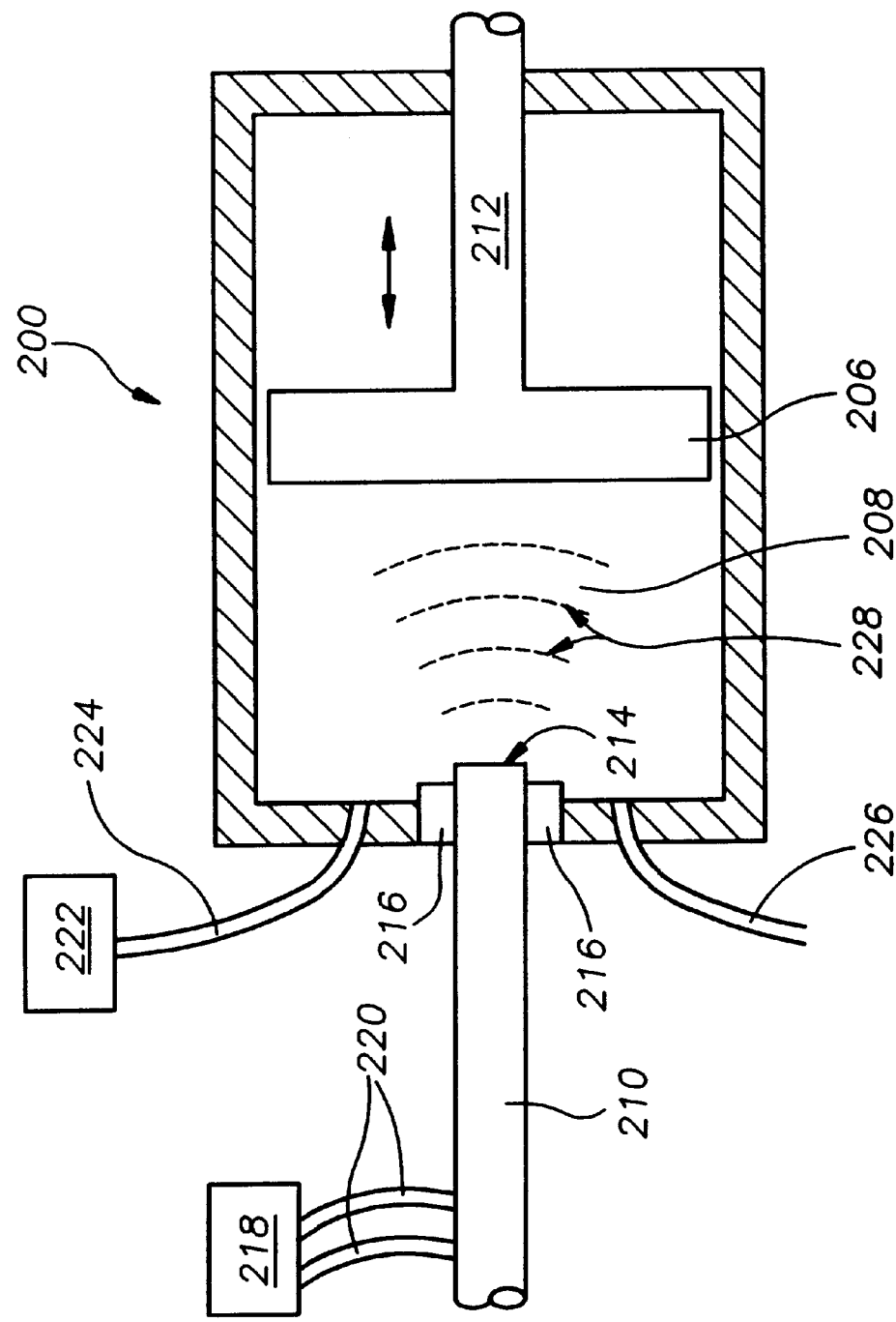
FIG. 11 schematically illustrates an example combustion chamber configuration in accordance with the invention.

Referring now to FIG. 11, there is shown a combustion chamber 200 in accordance with the invention for combusting nanopartitioned fuels. The combustion chamber includes a piston 206 which slidingly reciprocates in response to a combustion event along the long axis of the chamber interior 208, such axis of reciprocation being indicated by the two-headed arrow in the figure. A shock wave initiator, shown generally as 210, is positioned at the end of the chamber opposite the piston shaft 212 with a distal end 214 exposed to the chamber interior 208, and from which the shock wave is preferably emitted. The shock wave initiator is preferably hermetically sealed in the combustion chamber.

As will be understood by those skilled in the art, there exists any number of suitable mechanisms for inducing a shock excitation of the nanopartitioned fuel as it is combusted. Several preferable examples are provided in later discussions. A shock excitation mechanism in accordance with the invention is not limited to a specific apparatus or type of apparatus, but instead, is characterized in general by an ability to produce an intense, supersonic reaction front that is largely planar and directed along the motion of the piston.

The shock wave initiator 210 is electrically isolated from the combustion chamber 208 by insulators 216 or other suitable insulating structure. Power for the shock wave initiator is provided by, e.g., a power supply 218, connected to the shock wave initiator by way of heavily insulated wires.

A fuel stream is admitted to the interior combustion chamber 208 from, e.g., a fuel tank or other fuel reservoir 222, via a fuel injection port 224. The fuel supply preferably consists of a fuel system like that described above, wherein fuel in the fuel system is characterized by hydrocarbon droplets, or molecular aggregations, each of a sub-micron dimension, and preferably of a dimension of between about 10 Å and 100 Å. Air is admitted to the chamber interior 208 from an air injection port 226. The injected fuel and air are mixed in the chamber by conventional means.

A combustion process in accordance with the invention preferably is initiated with a high-intensity, broad shock front 228 produced by the shock wave initiator. The shock front 228 travels along the axis of piston reciprocation, shown in the figure by the double-headed arrow. Once reaching the piston 206, the shock wave is reflected and travels back to the opposite chamber end, where it is again reflected. Thus, the shock wave travels back and forth through the chamber along the axis of piston reciprocation, imparting many supersonic impulses to the piston head, each impulse transferring more momentum from the non-equilibrated combustion reaction products to the piston head.

The time scale of the shock wave excitation and reflection is so short compared with the time scale of the combustion event that a plurality of shock excitations can be initiated during one combustion event and a plurality of shock wave reflections occur during one combustion event. Preferably, a repetitive cycle of shock wave excitations is synchronized with the cycle of reflecting shock waves such that they combine to produce a coherent composite shock excitation rather than two excitations fronts moving in opposite directions.

The shock wave initiator is preferably capable of initiating a shock wave in the fuel-air mixture with a shock excitation characterized by a sub-millisecond rise time, and most preferably characterized by a nanosecond rise time. In addition, because many shock wave excitations can be imparted to the combusting fuel during one combustion event, it is preferable that the shock wave initiator be capable of producing a shock repetition cycle of at least about 30 impulses per second, or more preferably, between about 100 and 600 impulses per second. Such a shock wave cycle repetition can result in high pressure loading on the interior of the chamber, and accordingly, it is preferable that the piston and chamber components all be characterized by a strength higher than that of conventional, spark-ignited engines. Most preferably, the combustion chamber and piston are of a strength comparable to that of diesel engine components, and generally are characterized by an ability to endure high loading without fatigue. For some applications, it may thus be preferable to construct the combustion chamber walls of a weight greater than might be used for conventional combustion chamber walls; the individual shock wave impulses could deform lightly constructed chambers. Other components generic to combustion chamber construction, e.g., journal bearings, should also preferably be of diesel strength.

Considering now the shock wave initiation and propagation in more detail, the shock wave front may be characterized as being formed by large temperature and pressure gradients. The fuel-air gas mixture local to the shock initiation point is rapidly pressurized and heated even before any chemical reaction occurs. Once a critical temperature and pressure are reached in the local gas mixture the chemical reaction of combustion is intentionally and controllably initiated. This initiation acts to accelerate the motion of the shock front and to further amplify the local pressure and temperature. The chain-carrier concentration in the reaction zone grows until it approximates the concentration of the reactants themselves. At these local conditions, virtually every reaction collision results in a reaction. While the specific nature of shocked reaction kinetics is unpredictable, it is known that certain fuel-air mixtures will themselves develop shock excitations under such conditions. Here the mixture burns at an ever-increasing rate until the deflagration rate, i.e., flame burning rate, exceeds some critical velocity.

Implicit in the mechanism of transition from deflagration to detonation is the existence of the predetonation burn of the flame. This distance of flame travel prior to full detonation may be quite long in conventional combustion, even exceeding the length of the combustion chamber. Increased combustion pressure causes faster detonation development relative to low pressure. It is thus preferable in the invention to set the combustion chamber conditions for high pressures in the range of, e.g., diesel engine pressure. This high pressure, in combination with the intentionally induced shock wave pressure front, ensures a small distance of flame travel prior to detonation.

A shock wave initiator in accordance with the invention preferably is embodied by a high-speed, high-intensity discharge apparatus that produces a planar pressure front emanating from the inception of discharge. One example discharge apparatus is shown in cross section in FIG. 12. Here the shock wave initiator consists of a cylindrical insulator 230 or other suitably shaped insulator consisting of, e.g., a ceramic material, in the center of which is positioned a conducting section 232. An outer annular conducting section 234 encircles the outer axial surface of the cylindrical insulator 230. Preferably the radial distance between the center conductor and the outer annular conductor is about 1 cm.

The cylindrical shock wave initiator is charged and discharged by an resistor-inductor-capacitor circuit 236, or other suitable circuit, connected to the initiator by way of cabling 238. The charge/discharge circuit preferably is characterized by very low inductance, whereby a very short discharge rise time, e.g., of less than about 100 nsec, and more preferably in the range of about 10 nsec to 20 nsec, is produced. Upon discharge from the circuit 236, a horizontal breakdown event occurs between the inner central conductor and the outer annular conducting region. This horizontal breakdown event produces a planar shock wave front of a peak equivalent pressure of preferably greater than about 50,000 psi, and more preferably, greater than about 90,000 psi. The planar shock wave front 228 evolves in time to produce a planar supersonic impulse that upon reaching a piston head in a combustion chamber effectively transfers momentum from a combustion reaction to the piston head.

Figure 12:
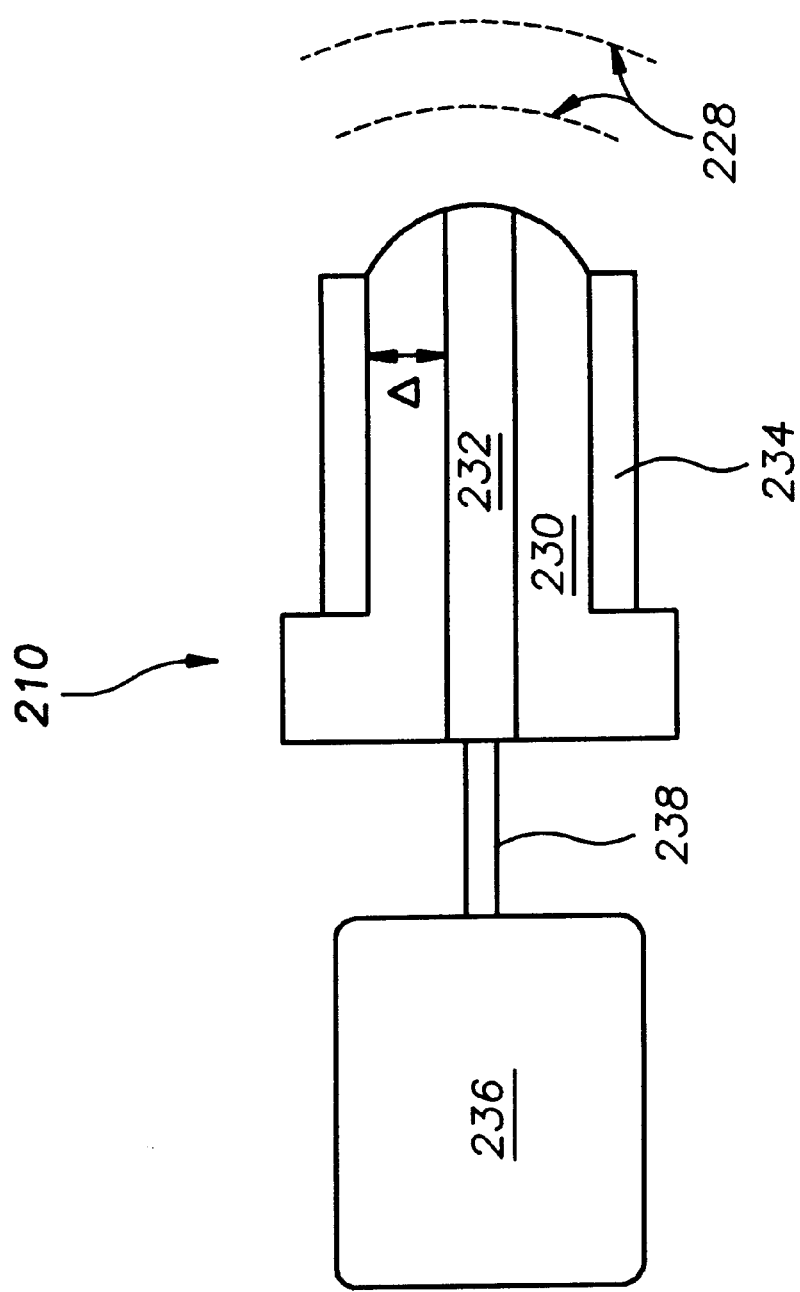
FIG. 12 schematically illustrates an example shock wave excitation initiator configuration in accordance with the invention.

A discharge device similar to that of FIG. 12 is discussed by Pate et al. in U.S. Pat. No. 4,589,398, issued May 20, 1986, the entirety of which is hereby incorporated by reference. Pate shows use of such a discharge apparatus in combination with a combustion chamber to produce a high-velocity turbulent deflagration and supersonic detonation combustion process that employs only one discharge ignition per combustion cycle. Pate suggests that such a discharge may produce shock-wave-amplification-by-coherent-energy-release and shock-wave-amplification-by-stimulated-energy-release, whereby energy of a shock wave is effectively coupled to combustion reactants for promoting rapid combustion.

While Pate's analysis and discharge apparatus design focus only on promotion of rapid combustion by way of one discharge ignition event, the inventors herein have recognized that such a discharge apparatus can be adapted as a shock wave initiator in accordance with the invention for enhancing the anisotropic energy properties of a nanopartitioned fuel. Specifically, positioning of such a discharge apparatus such that the axis of shock wave excitations it produces is aligned with a piston stroke axis results in enhanced momentum transfer, as explained previously. Additionally, adaptation and control of the discharge apparatus to produce a synchronized, repetitive cycle of shock excitations during one combustion event produces further momentum transfer enhancement.

An alternative shock wave initiator in accordance with the invention consists of a piezoelectric shock apparatus, i.e., an actuator that can move abruptly within the combustion chamber to produce a pressure wave that superimposes itself over a compressed fuel-air mixture to be combusted. Preferably, the piezoelectric actuator is controlled to produce a planar pulse just prior to auto ignition. The actuator may be embodied by, e.g., a piezoelectric actuator element, as is commonly known and available, coupled to a large-area planar surface element positioned at the interior combustion chamber surface. Preferably, the actuator element is positioned parallel to the piston head such that the actuator delivers a shock excitation along the axis of the piston stroke. The planar surface element ensures that the shock wave front is directed along the piston stroke for maximum momentum transfer to the piston.

In another alternative shock wave initiator in accordance with the invention, a radio frequency pulse generator is formed out of the combustion chamber-piston configuration itself. Here the top surface of the piston head and the surface of the combustion chamber opposite the piston head serve as electrodes in an induction circuit. Each are coated with an insulating layer such that they are electrically isolated from each other. A timed power pulse of high frequency, preferably greater than 100 MHz and more preferably greater than 1 GHz, is delivered between the electrodes by way of a power circuit. The power delivered by the pulses induces ionization of gases close to the surface of the electrodes. This ionization process initiates a detonation wave across the entire electrode surface, thereby initiating a planar shock wave at each surface. The duration of each power pulse is not critical because only several microseconds are required to initiate the shock wave from the ionization layer.

In yet another example of a shock wave initiator, a flash lamp, known also as a discharge lamp, may be positioned along the surface of the combustion chamber opposite the piston head. The high frequency discharge lamp is operated to produce a sheet of radiation across the chamber surface where it is positioned, whereby a simultaneous initiation of combustion is achieved at the surface. Such a high-speed electromagnetic impulse produces a supersonic combustion initiation because, characteristically, high-frequency electromagnetic radiation possesses sufficient energy to break the chemical bonds in hydrocarbon fuels. Visible and near-ultraviolet radiation can initiate combustion in a near-critical fuel-air mixture. The speed of light is the only limitation as to the speed with which the radiation initiates a shock-wave combustion event.

Other shock wave initiation mechanisms suitable for the nanopartitioned fuel combustion system of the invention will be understood by those skilled in the art to not require specific apparatus or geometry, but only to necessarily provide a high-speed, high-intensity shock wave front that is planar and that is aligned with the axis of reciprocation of a piston or other moveable momentum transducer in the combustion chamber. The shock wave initiation is preferably controlled to produce a very fast pulse rise time that coincides with top-dead-center positioning of the piston, at which point the fuel-air mixture to be combusted is in its highest state of compression and a position of greatest mechanical advantage. As explained previously, any shock wave initiator employed in accordance with the invention also is preferably capable of producing multiple shock excitations, during one combustion cycle, that are synchronized with prior shock excitations reflecting in the chamber.

Considering now other aspects of a combustion apparatus in accordance with the invention, the combustion apparatus may be adapted to reduce or eliminate production of nitrous oxide, $NO_x$, emissions by application of a precious metal or other transition metal to interior surfaces of the combustion chamber and the top of the piston head. Precious metals and transition metals, and their alloys, have been shown to decompose ozone; and it has been observed that the production of nitrous oxide emissions is primarily controlled by an intermediate reaction involving ozone. Control of the production of the intermediate ozone species therefore controls the nitrous oxide in output emission. Application of a metal such a nickel to internal surfaces of the combustion chamber, e.g., in the form of a catalyst, lowers ozone concentration and reduces $NO_x$ production by the combustion event. Given that the side walls of the chamber interior are conventionally coated with a thin oil film for lubrication of piston reciprocation, only the piston head and the interior combustion chamber wall opposite the piston head need have at least a portion of their surfaces coated with a metal catalyst.

Performance of a combustion chamber in accordance with the invention may be improved further by employing a fuel system injector, shown generally at 224 in FIG. 11, that injects a fuel system at extremely high pressure through many orifi simultaneously into the combustion chamber. High fuel system injection pressures of between, e.g., about 10,000 psi and 50,000 psi permit delay in the sequence of shock wave excitation initiations until the piston is positioned at top-dead-center. As explained above, this piston-shock initiation correspondence is preferred so that the fuel system reactants are pulsed when at their highest state of compression.

Optimally, the fuel system is injected into the combustion chamber in an instantaneously abrupt time period. This condition is approached as a practical matter by injecting the fuel system through many orifi rather than only one orifice. The parallel injection profile produced by injection through the orifi array further enhances mixing of the fuel system with injected air. Preferably, air is injected into the combustion chamber at the top-dead-center positioning of the piston cylinder head. More complete combustion of the fuel system reactants is achieved by efficient and fast mixing of the injected fuel system and the injected air.

Preferably, the fuel system injection orifi array are each of a small port dimension, e.g., in the micron regime, whereby the fuel system is atomized upon injection through the array. This high pressure atomization injection promotes enhanced shearing of the fuel system components; further partitioning of the fuel system may thus be accomplished by the injection array. Indeed, a fuel system may be nanopartitioned entirely by the injection process without the need for an additional pre-combustion nanopartitioning technique. Such a duel injection/nanopartitioning scheme may be preferable for fuel systems known to have only short stability times during which nanopartitioned fuel regions remain separated and stable. As will be understood by those skilled in the art, a multiple-orifi injection system is not an absolute requirement of the invention; conventional injection systems, while perhaps providing less superior performance capabilities, are nevertheless adequate for combustion of nanopartitioned fuel systems.

Like the multiple-orifi injection system just described, a shock wave initiator mechanism may be employed to itself nanopartition, as well as ignite, a fuel injected to a combustion chamber. This combined partitioning/ignition scheme may be preferable for the reasons given above, namely, for nanopartitioning a specific fuel system known to have only a short separation stability time.

The consumption of a nanopartitioned fuel during combustion of the fuel may be reduced in a combustion chamber in accordance with the invention by reducing the internal friction of the piston as it reciprocates along the length of the combustion chamber. The sliding friction between the edges of the piston head and the interior chamber walls wastes energy in the form of heat. This heat is conventionally removed by way of a cooling system and so does not contribute to mechanical work produced by the combustion. The piston sliding friction can be reduced by improved lubrication or by reduction in the size of the piston head edge that contacts the interior chamber walls. A reduction in the size of the piston also reduces the power transferred to the piston, however, and thus does not provide measurable reduction in fuel consumption for a given power level.

In the invention, piston sliding friction is preferably reduced by employing a two-stroke cylinder instead of a conventional four-stroke cylinder. The two-stroke combustion process produces twice as many explosions per unit of sliding friction as are produced by a four-stroke engine scheme. Historically, two-stroke engines have not been favored because the level of unburned hydrocarbons, carbon monoxide, soot, and nitrous oxide emissions produced by such an engine has generally not met the required emissions standards. Use of a two-stroke combustion process in combination with a catalyst, such as nickel, to combust a nanopartitioned fuel results in a marked decrease in the amount of undesirable emissions, whereby the efficiency of a two-stroke engine may be attained without the expected accompanying toxic emissions.

The fuel consumption of a combustion chamber in accordance with the invention may be further reduced by operation in a fuel system-to-air mixture ratio that is lean. It is known that fuel consumption may be reduced by such a mixture; intimate mixing of an injected fuel stream in a lean proportion to an injection air stream promotes more complete combustion and results in a degree of combustion that would conventionally be achieved only through a less lean fuel-air mixture. High pressure conditions applied to pre-ignited fuel-air mixtures also promotes lower fuel consumption. It is thus preferable that high pressure, e.g., a pressure level in the turbo diesel range, be combined with a lean fuel-air ratio to achieve reduced fuel consumption. These operating conditions are best carried out in a combustion chamber of diesel strength that can accommodate a high internal chamber pressure and shock wave excitation.

Other embodiments are within the scope of the invention. A nanopartitioned fuel system may be employed in any combustion or burning engine or other apparatus, e.g., in turbine engines, jet engines, or other apparatus in which a nanopartitioned fuel system is burned or combusted to transfer momentum in a desired direction corresponding to a moveable momentum transduction mechanism, such as a piston, that produces work. While the shock excitation scheme provided by the invention synergistically enhances the anisotropy of nanopartitioned fuel products, such a shock excitation scheme is not an absolute requirement for combustion or burning of a nanopartitioned fuel.

Similarly, the shock excitation combustion scheme of the invention may be applied to any fuel system, whether or not the fuel system is nanopartitioned. The shock excitation acts with any fuel to reduce the randomness of the reaction products and promote anisotropy, in the direction of the shock wave front, of the energy to be transferred from the reaction products to a mechanism for producing work.

From the foregoing, it is apparent that the nanopartitioned fuel systems and shock excitation combustion schemes described above not only achieve improved combustion mechanisms but do so in a particularly effective and efficient manner. It is recognized, of course, that those skilled in the art may make various modifications and additions to the preferred embodiments described above without departing from the spirit and scope of the present contribution to the art. Accordingly, it is to be understood that the protection sought to be afforded hereby should be deemed to extend to the subject matter claimed and all equivalents thereof fairly within the scope of the invention.

APPENDIX A
SOLVENTS

The following materials, commonly referred to as solvents, can be employed in accordance with the invention in a nanopartitioned hydrocarbon fuel system.

| Acids: | Carbonates: | Hydroxy Esters: |
|---|---|---|
| Acetic acid | Dimethyl carbonate | 2-Hydroxyethyl |
| Butyric acid | Ether Alcohols: | acetate |
| Isobutyric acid | 2-(2-Butoxyethoxy) | Monobasic Esters: |
| Formic acid | ethanol | Allyl acetate |
| Halogen Acids: | Ethoxyethoxyethanol | n-Amyl acetate |
| Chloroacetic acid | Methoxyethoxyethanol | n-Butyl acetate |
| Trichloroacetic acid | 2-Butoxyethanol | Ethyl acetate |
| Monohydric Alcohols: | 2-Ethoxyethanol | Ethyl butyrate |
| Ailyl alcohol | 2-Methoxyethanol | Ethyl formate |
| Amyl alcohol | Tetrahydrofurfuryl | Isoamyl acetate |
| Isoamyl alcohol | alcohol | Methyl acetate |
| tert-Amyl alcohol | Halgoen Alcohols: | Iso-propyl acetate |
| n-Butyl alcohol | 2-Chioroethanol | Ether Esters: |
| Isobutyl alcohol | Polyhydric Alcohols: | Butoxyethyl acetate |
| sec-Butyl alcohol | Ethylene glycol | 2-Ethoxyethyl acetate |
| Cyclohexanol | Aromatic Alcohols: | 2-Methoxyethyl |
| Ethyl alcohol | Benzyl alcohol | acetate |
| 2-Ethyl-1-butanol | Amides: | Tetrahydrofurfuryl |
| 2-Ethyl-1-hexanol | N,N- | acetate |
| Methyl alcohol | Dimethylformamide | Halogen Esters: |
| Propyl alcohol | Formamide | Ethyl chloroacetate |
| Isopropyl alcohol | Halogen Compounds: | Ethyl chloroformate |
| Polyhydric Esters: | 1-Bromobutane | Ethyl trichloroacetate |
| Benzyl acetate | 2-Bromobutane | Poly Amines: |
| Diethyl phthalate | Bromochloromethane | Ethylenediamine |
| Dimethyl phthalate | 1-Bromo- | Aromatic |
| Ethers: | 3-chloropropane | Hydrocarbons: |
| Allyl ether | 1-Bromopentane | Benzene |
| Bis(2- | 2-Bromopentane | Bibenzyl |
| ethoxyethyl)ether | 1-Bromopropane | Cumene |
| 1,2-Bis(2- | 2-Bromopropane | p-cymene |
| methoxyethoxy)ethane | Bromotri- | m-Diethylbenzene |
| Bis(2-(2-methoxy- | chloromethane | 1,3-Diisopropyl- |
| ethoxy)ethyl)ether | Carbon | benzene |
| Bis(2- | tetrachloride | Ethylbenzene |
| methoxyethyl)ether | 1-Chlorobutane | Toluene |

APPENDIX A
SOLVENTS

The following materials, commonly referred to as solvents, can be employed in accordance with the invention in a nanopartitioned hydrocarbon fuel system.

| | | |
|---|---|---|
| Butyl ether | Chloroform | 1,3,5-Triethylbenzene |
| 1,2-Dimethoxyethane | 1-Chlorohexane | 1,2,4- |
| 1,4-Dioxane | 1-Chloro-3- | Trimethylbenzene |
| Ethylether | methylbutane | o-Xylene |
| Isopropyl ether | 2-Chloro-2- | m-Xylene |
| Isoamyl ether | methylpropane | p-Xylene |
| Tetrahydrofuran | 2-Chloro-2- | Ketones: |
| Tetrahydro-2- | methylbutane | Acetone |
| methylfuran | 1-Chloropentane | Cyclohexanone |
| Aromatic | 2-Chloropropane | Cyclopentanone |
| Halogen Compounds: | Dibromomethane | 2,6-Dimethyl-4- |
| Chlorobenzene | 1,4-Dichlorobutane | heptanone |
| 2-Chlorotoluene | 1,1-Dichloroethane | 2-Heptanone |
| 3-Chlorotoluene | cis-1,2-Dichloroethane | 3-Heptanone |
| 4-Chlorotoluene | trans-1,2-Dichloroethene | Mesityl oxide |
| Paraffinic Satrated | 1,2-Dichloropropane | Methyl isobutyl ketone |
| Hydrocarbons: | Ethyl bromide | Methyl ethyl ketone |
| n-Decane | Ethylene chloride | 2-Octanone |
| Diisoprane | Hexachloroethane | 2-Pentanone |
| n-Dodecane | Methylene chloride | 3-Pentanone |
| n-Elcosane | e-Tetrachloroethane | Nitriles: |
| n-Heptane | Tetrachloroathene | Acetonitrile |
| n-Hexadecane | 1,1,1-Trichloroethane | Benzonitrile |
| n-Hexane | 1,1,2-Trichloroethane | Nitro Compounds: |
| 3-Methlpentane | Trichloroethane | Nitrobenzene |
| Neohexane | 1,2,3-Trichloropropane | Nitroethane |
| n-Octadecane | Naphthenic | Nitromethane |
| n-Octane | Hydrocarbons: | 1-Nitropropane |
| n-Pentane | Cyclohexane | Other Solvents: |
| 2,2,4- | Cyclopentane | Acetonitrile |
| Trimethylapentane | Decahydronaphthalene | 2-Butanol |
| Aromatic Ethers: | Methylcyclohexane | Butyl alcohol |
| Benzyl ether | Methylcyclopentane | tert-Butylmethyl ether |
| Phenols: | Commercial Chemicals: | Dichloroethane |
| o-Cresol | Kerosense | N,N- |
| m-Cresol | Ligroin | Dimethylformamide |
| p-Cresol | (BP range 60–80 C) | Dipropyl ether |
| Phenol | Mineral spirits | Ethyl ether |
| p-Methoxyphenol | (BP range 130–145 C) | Isooctane |
| Sulfur Compounds: | Petroleum ether | Methanol |
| Dimethylaulfolane | (BP range 30–60 C) | 1,1,2,2- |
| Methyl sulfoxide | Terpentine | Tetrachloroethane |
| | | Water |
| | | Xylene |

APPENDIX B
SURFACTANTS

The following materials, commonly referred to as surfactants, can be employed in accordance with the invention in a nanopartitioned hydrocarbon fuel system.

| | |
|---|---|
| Nonionic surfactants: | Esters of polyhydric alcohols; alkoxylated amides; esters of polyoxyalkylene, polyoxypropylene and of polyoxyethylene-polyoxypropylene glycols; ethers of polyoxyalkylene glycols; tertiary acetylenic glycols; and polyoxyethylated alkyl phosphates. |
| Anionic surfactants: | Carboxylic acids and soaps; sulfated esters, amides, alcohols, ethers and carboxylic acids (all salts); sulfonated petroleum, aromatic hydrocarbons, aliphatic hydrocarbons, esters, amides, amines, ethers, carboxylic acids, phenols and lignins (all salts); acylated polypeptides (salts); and phosphates. |
| Cationic surfactants: | Amines; amine salts, trialkylamine oxides; n-polyethoxylated long chain amines; quaternary ammonium salts; heterocyclic amines (salts); alkylolamine-fatty acid condensates (oxazolines); alkyl phosphonamides; amphoterics; perfluoro compounds, sequestrants, ilicones and inorganic cationics. |

In the following listings, the abbreviation "P.O.E." refers to Polyoxyethylene (Polyethylene glycol) and the abbreviation "P.O.P." refers to Polyoxypropylene.

Fatty Acids:

| | |
|---|---|
| Caprylic acid | Abietic acid |
| Pelargonic acid | Coconut oil fatty acids |
| Capric acid | Corn oil fatty acids |
| Lauric acid | Cottonseed oil fatty acids |
| Myristic acid | Soya oil fatty acids |
| Palmitic acid | Tallow fatty acids |
| Stearic acid | Hydrogenated fish oil fatty acids |
| Behenic acid | Tall oil (fatty acids) |
| Undecylenic acid | Dimer acids |
| Oleic acid | Trimer acids |
| Erucic acid | Castor oil |
| Linoleic acid | Hydrogenated castor oil |
| Ricinoleic acid | Lanolin |
| Naphthenic acid | Lanolin fatty acids |

Fatty Acid Salts:

| | | |
|---|---|---|
| Lithium stearate | Ammonium oleate | Cadmium stearate |
| Sodium caprate | Ammonium linoleate | Calcium stearate |
| Sodium laurate | Ammonium ricinoleate | Calcium oleate |
| Sodium myristate | Ammonium naphthenate | Calcium linoleate |
| Sodium palmitate | Ammonium abietate | Calcium ricinoleate |
| Sodium stearate | Morpholine laurate | Calcium naphthenate |
| Sodium undecylenate | Morpholine myristate | Cobalt stearate |
| Sodium oleate | Morpholine palmitate | Cobalt naphthenate |
| Sodium linoleate | Morpholine stearate | Copper stearate |
| Sodium ricinoleate | Morpholine undecylenate | Copper oleate |
| Sodium naphthenate | Morpholine oleate | Copper naphthenate |
| Sodium abietate | Morpholine linoleate | Iron stearate |
| Sodium polymerized carboxylates | Morpholine ricinoleate | Iron naphthenate |
| Sodium salt of tall oil | Morpholine napthenate | Lead stearate |
| Potassium caprate | Morpholine abietate | Lead oleate |
| Potassium laurate | Triethanolamine caprate | Lead naphthenate |
| Potassium myristate | Triethanolamine laurate | Magnesium stearate |
| Potassium palmitate | Triethanolamine myristate | Magnesium oleate |
| Potassium stearate | Triethanolamine palmitate | Manganese stearate |
| Potassium undecylenate | Triethanolamine stearate | Manganese naphthenate |
| Potassium oleate | Triethanolamine undecylenate | Nickel oleate |
| Potassium linoleate | | Strontium stearate |
| Potassium ricinoleate | | Tin oleate |
| Potassium naphthenate | Triethanolamine oleate | Zinc laurate |
| Potassium abietate | Triethanolamine linoleate | Zinc palmitate |
| Ammonium caprate | Triethanolamine ricinoleate | Zinc stearate |
| Ammonium laurate | | Zinc oleate |
| Ammonium myristate | Triethanolamine - naphthenate | Zinc linoleate |
| Ammonium palmitate | | Zinc naphthenate |
| Ammonium stearate | Triethanolamine abietate | Zinc resinate |
| Ammonium undecylenate | Aluminum palmitate | |
| | Aluminum stearate | |
| | Aluminum oleate | |
| | Barium stearate | |
| | Barium naphthenate | |

APPENDIX B
SURFACTANTS

Olefins:

Phosphorous Compounds and Mercaptans:

Linear alpha olefin C14
Linear alpha olefin C16

POE octyl phosphate
Sodium phosphated castor oil
Ammonium phosphated castor oil
2-Ethylhexyl polyphosphate sodium salt
Capryl polyphosphate sodium salt
Sodium di(2-ethylhexyl)phosphate
Lecithin (Soy Phosphatides)
POE tert-dodecylmercaptoethanol

Polyethylene and Propylene Glycol Esters:

| | | |
|---|---|---|
| Hydroxyethyl laurate | PEG monooleate | Propylene glycol - monolaurate |
| Hydroxyethoxyethyl - laurate | PEG dioleate | Propylene glycol - monostearate |
| Hydroxy-ethoxyethoxy - ethyl laurate | Ethylene glycol - monoricinoleate | Propylene glycol dilaurate |
| PEG monolaurate | Diethylene glycol - monoricinoleate | Propylene glycol distearate |
| PEG dilaurate | PEG monoricinoleate | Dipropylene glycol - monostearate |
| Ethylene glycol - monostearate | Diethylene glycol coconate | Propylene glycol - monooleate |
| Diethylene glycol - monostearate | POE coco fatty acids ester | Propylene glycol - monoricinoleate |
| Triethylene glycol - monostearate | POE castor oil | Propylene glycol - monoisostearate |
| PEG monostearate | Ethylene glycol hydroxy - stearate | Propylene glycol - monohydroxystearate |
| Ethylene glycol distearate | PEG trihydroxy stearate | Propylene glycol - dipelargonate |
| PEG distearate | POE hydrogenated castor - oil | Isopropylester of lanolin - fatty acids |
| PEG monoisostearate | POE tall oil | POE propylene glycol - monostearate |
| PEG diisostearate | POE abietic acid | |
| Hydroxyethyl oleate | POE lanolin | |
| Hydroxyethoxyethyl oleate | Acetylated lanolin | |
| Hydroxy-ethoxyethoxy - ethyl oleate | POE lanolin acetylated | |
| | Methoxy PEG monooleate | |

Alcohols, Phenols and Polyoxyethylene Derivates:

| | |
|---|---|
| Stearyl alcohol | POE tridecyl phenyl ether |
| Oleyl alcohol | POE lanolin alcohol ether |
| Octyl phenol | POE cholesterol |
| Nonyl phenol | tert-Octylphenoxy ethanol |
| p-Dodecyl phenol | POE n-octylphenol |
| Dinonyl phenol | POE tert-octylphenol |
| Tridecyl alcohol | POE nonylphenol |
| Tetradecyl alcohol | POE dinonyl phenol |
| Lanolin Alcohols | POE dodecyl phenol |
| Cholesterol | Dimethyl hexynol |
| POE lauryl alcohol ether | Dimethyl octynediol |
| POE cetyl alcohol ether | Tetramethyl decynediol |
| POE stearyl alcohol ether | POE tetramethyldecynediol |
| POE oleyl alcohol ether | POP EtO |
| POE isohexadecyl alcohol ether | Polyoxypropylene-polyoxyethylene block - copolymer |
| 2,6,8-Trimethyl-4-nonyloxypolyethyleneoxyethanol | Alkyl ether of POE/POP |
| POE tridecyl alcohol ether | |

Glycerol Esters:

| | | |
|---|---|---|
| Glycerol monocaprylate | Decaglycerol decastearate | POE sorbitol beeswax - ester |
| Glycerol monolaurate | Pentaerythritol - monolaurate | POE sorbitol beeswax - ester |
| Glycerol mono/dicocoate | Pentaerythritol - monostearate | Sucrose monolaurate |
| Glycerol dilaurate | Pentaerythritol distearate | Sucrose cocoate |
| Glycerol monostearate | Pentaerythritol tetrasterate | Sucrose monomyristate |
| Glycerol monostearate - distilled | Pentaerythritol | Sucrose monopalmitate |
| Glycerol distearate | | Sucrose dipalmitate |
| Glycerol monooleate | monooleate | Sucrose monostearate |
| Glycerol dioleate | Pentaerythritol dioleate | Sucrose distearate |
| Glycerol trioleate | | Sucrose monooleate |
| Glycerol monoisostearate | Pentaerythritol trioleate | Sucrose dioleate |
| Glycerol monoricinoleate | Pentaerythritol - tetraricinoleate | Lauryl lactate |
| Glycerol - monohydroxystearate | Sorbitan monolaurate | Cetyl lactate |
| POE glycerol monostearate | POE sorbitan monolaurate | Sodium laury lactate |
| Acetylated glycerol - monostearate | Sorbitan monopalmitate | Sodium stearoyl lactate |
| Succinylated glycerol - monostearate | POE sorbitan - monopalmitate | Sodium isostearoyl-2-lactylate |
| Diacetylated glycerol - monostearate tartrate | Sorbitan monostearate | Sodium stearoyl-2-lactylate |
| Modified glycerol - phthalate resin | POE sorbitan monostearate | Calcium stearoyl-2-lactylate |
| Triglycerol monostearate | Sorbitan tristearate | Sodium capryl lactate |
| Triglycerol monooleate | POE sorbitan tristearate | Lauryl alcohol |
| Triglycerol - monoisostearate | Sorbitan monooleate | Cetyl alcohol |
| Decaglycerol tetraoleate | POE sorbitan monooleate | |
| | Sorbitan sesquioleate | |
| | Sorbitan trioleate | |
| | POE sorbitan trioleate | |
| | POE sorbitol hexaoleate | |
| | POE sorbitol oleate laurate | |
| | POE sorbitol polyoleate | |

Amides and Amide Derivates:

| | |
|---|---|
| Stearamide | Stearic acid diethanolamide |
| Oleamide | Oleic acid diethanolamide |
| Erucamide | POE oleic amide |
| Behenamide | Coco acid diethanolamide |
| Lauric acid monoethanolamide | POE coco amide |
| Tallow monoethanolamide | POE hydrogenated tallow amide |
| POE lauric amide | Lauric acid monoisopropanolamide |
| Myristic acid diethanolamide | Oleic acid monoisopropanolamide |

Sulfates:

| | |
|---|---|
| Sodium n-octyl sulfate | Sulfated nonylphenyl ether of - tetraethyleneglycol ammonium salt |
| Sodium 2-ethylhexyl sulfate | Sulfated lauryl ether of tetraethyleneglycol - sodium salt |
| Sodium decyl sulfate | POE sodium lauryl monoether sulfate |
| Sodium lauryl sulfate | POE sodium lauryl ether sulfate |
| Sodium tridecyl sulfate | POE ammonium lauryl sulfate |
| Sodium sec-tetradecyl sulfate | Sulfated oleic acid sodium salt |
| Sodium cetyl sulfate | Sulfated castor oil-fatty acids sodium salt |
| Sodium sec-heptadecyl sulfate | Sulfated propyloleate sodium salt |
| Sodium oleyl sulfate | Sulfated isopropyloleate sodium salt |
| Sodium oleyl stearate sulfate | Sulfated butyloleate sodium salt |
| Sodium tridecyl ether sulfate | Sulfated glycerol monolaurate sodium salt |
| Potassium lauryl sulfate | Sulfated glycerol trioleate sodium salt |
| Magnesium lauryl sulfate | Sulfated castor oil sodium salt |
| Triethanolamine lauryl sulfate | Sulfonated marine oil |
| Ammonium lauryl sulfate | Sulfated neatsfoot oil sodium salt |
| Diethanolamine lauryl sulfate | Sulfated rice bean oil sodium salt |
| Triethanolammonium lauryl sulfate | Sulfated soya bean oil sodium salt |
| POE octylphenol sodium salt | Sulfated synthetic sperm oil |
| Alkylaryl polyether sulfate sodium salt | Sulfated tallow sodium salt |
| Sulfated POE nonylphenol sodium salt | |

Miscellaneous Surfactant Compounds:

| | |
|---|---|
| Perfluoro surfactant - anionic | Silicone defoamer - oil |
| Perfluoro surfactant - cationic | Silicone defoamer - water dispersible |
| Ethylenediamine tetraacetic acid disodium - salt | Sodium tetraborate |
| | Sodium carbonate |
| Ethylenediaminetetraacetic acid - tetrasodium salt | Sodium phosphate - tribasic |
| | Sodium silicate |

APPENDIX B
SURFACTANTS

| | |
|---|---|
| Sodium dihydroxyethyl glycinate | Alkyl benzene sulfonic acid |
| Trisodium nitrilotriacetate | (propylene - tetramer) |
| Sodium citrate | |

Sulfonates:

| | |
|---|---|
| Sodium toluene sulfonate | Ammonium dibutyl naphthalene sulfonate |
| Sodium xylene sulfonate | Ethanolamine dibutyl naphthalene sulfonate |
| Sodium cumene sulfonate | |
| Sodium dodecylbenzene sulfonate | |
| Sodium tridecylbenzene sulfonate | Sodium sulfooleate |
| Sodium kerylbenzene sulfonate | Sodium monobutylphenylphenol - monosulfonate |
| Calcium dodecylbenzene sulfonate | |
| Ammonium xylene sulfonate | Disodium dibutylphenyl phenol disulfonate |
| Triethanolammonium dodecylbenzene - sulfonate | Potassium monoethylphenyl-phenol - monosulfonate |
| Alkylammonium dodecyl-benzene sulfonate | Ammonium monoethylphenyl-phenol - monosulfonate |
| Aliphatic hydrocarbons-sulfonic acid | Guanidinium monoethyl-phenylphenol - monosulfonate |
| Sodium petroleum sulfonate | |
| Calcium petroleum sulfonate | Sodium decyl diphenyl ether disulfonate |
| Bryton barium sulfonate | |
| Magnesium petroleum sulfonate | Sodium dodecyl diphenyl ether disulfonate |
| Ammonium petroleum sulfonate | |
| Isopropylamine petroleum sulfonate | Calcium polymerized alkyl-benzene - sulfonate |
| Ethylenediamine petroleum sulfonate | Sulfonated polystyrene |
| | Sulfonated aliphatic polyester |
| Triethanolamine petroleum sulfonate | Sodium-2-sulfoethyl oleate |
| | Sodium amyl sulfooleate |
| Sulfonated napthalene | Sodium lauryl sulfoacetate |
| Sodium diisopropyl naphthalene sulfonate | Sodium diisobutyl sulfosuccinate |
| | Sodium diamyl sulfosuccinate |
| Sodium dibutyl naphthalene sulfonate | Sodium dihexyl sulfosuccinate |
| | Sodium dioctyl sulfosuccinate |
| Sodium benzyl naphthalene sulfonate | Sodium ditridecyl sulfosuccinate |
| | Sodium akylarylpolyether sulfonate |
| Sodium naphthalene formaldehyde - condensate sulfonate | Sodium akylarylpolyether sulfonate |
| | Sodium lignosulfonate |
| Sodium polymerized alkyl-naphthalenesulfonate | |
| Potassium polymerized alkyl-naphthalene - sulfonate | |

Amines and Amine Derivatives:

| | |
|---|---|
| tert-C 11–14 Amine | Soya amine |
| n-Dodecylamine | Diococo amine |
| n-Tetradecylamine | Dihydrogenated tallow amine |
| n-Hexadecylamine | Dimethyl hexadecylamine |
| n-Octadecylamine | Dimethyl octadecylamine |
| C 18–24 Amine | Dimethyl cocoamine |
| Oleylamine | Dimethyl soya amine |
| Cocoamine | N-Coco-1,3-diaminopropane |
| Hydrogenated tallow amine | N-Soya-1,3-diaminopropane |
| Tallow amine | N-Tallow-1,3-diaminopropane |
| POE tert-amine | N-Coco-b-aminobutyric acid |
| POE stearyl amine | Stearamidoethyl diethylamine |
| POE oleyl amine | Sodium-N-coco-b-amino propionate |
| C 12-14 tert-alkylamines, ethoxylated | N-Tallow trimethylene diamine diacetate |
| POE coco amine | Disodium-N-tallow-b-imino dipropionate |
| POE tallow amine | |
| POE soya amine | Disodium-N-lauryl-b-imino dipropionate |
| POE octadecylamine | |
| N-b-Hydroxyethyl stearyl imidazoline | Cetyl betaine |
| | Coco betaine |
| POE (3) N-tallow trimethylene diamine | Myristamidopropyl betaine |
| | Oleyl betaine |
| N-b-Hydroxyethyl coco imidazoline | Coconut amido betaine |
| | Oleyl amido betaine |
| N-b-Hydroxyethyl oleyl imidazoline | Coconut oil acid ester of sodium isethionate |
| n-Dodecylamine acetate | Coco amido alkyl dimethylamine |
| Hexadecylamine acetate | Behenic amido alkyl dimethylamine |
| Octadecylamine acetate | Isostearic amido alkyl dimethylamine |
| Oleylamine acetate | Oleic amido alkyl dimethylamine |
| Cocoamine acetate | Sodium-N-methyl-N-palmitoyl taurate |
| Hydrogenated tallow amine acetate | |
| Tallow amine acetate | Sodium-N-methyl-N-oleyl taurate |
| Soya amine acetate | Sodium-N-coconut acid N-methyl taurate |
| N-Stearyl-N'.N'-diethylethylene-diamine acetate | |
| N-Oleylethylenediamine formate | Sodium-N-methyl-N-tall oil taurate |
| | N-Lauryl sarcosine |
| Cocoamidopropyl dimethyl amine oxide | Cocoyl sarcosine |
| | N-Oleyl sarcosine |
| Lauryl dimethylamine oxide | Sodium-N-lauryl sarcosinate |
| Myristyl dimethylamine oxide | |
| Sodium carboxymethylnonylhydroxy-ethy imidazolinium hydroxide | |
| Sodium carboxymethylundecylhydroxy-ethyl imidazolinium hydroxide | |
| Sodium carboxymethylcocohydroxy-ethyl imidazolinium hydroxide | |
| Sodium carboxyethyloleylhydroxy-ethyl imidazolinium hydroxide | |
| Sodium carboxymethylstearylhydroxy-ethyl imidazolinium hydroxide | |
| Sodium carboxymethylsodiumcarboxy-ethyl coco ether imidazolinium | |

Quaternary Amine Salts:

| | |
|---|---|
| Dodecyltrimethyl ammonium chloride | Lauryldimethylbenzyl ammonium chloride |
| Hexadecyltrimethyl ammonium chloride | Stearyldimethylbenzyl ammonium chloride |
| Octadecyltrimethyl ammonium chloride | Laurylpyridinium chloride |
| | 1-Hexadecylpyridinium chloride |
| Cetyltrimethyl ammonium bromide | Cetylpyridinium bromide |
| Cetyldimethylethyl ammonium bromide | Lauryl isoquinolinium bromide |
| | Substituted oxazoline |
| Coco trimethyl ammonium chloride | Substituted oxazoline |
| Tallow trimethyl ammonium chloride | |
| Soya trimethyl ammonium chloride | |
| Dicoco dimethyl ammonium chloride | |
| Dimethyl 80% behenyl benzyl ammonium chloride | |
| Methyl bis(2-hydroxyethyl)coco ammonium chloride | |
| Dihydrogenated tallow dimethyl ammonium chloride | |
| Methyldodecylbenzyl trimethyl ammonium chloride | |
| n-Alkyl dimethyl benzyl ammonium chloride | |
| Alkyldimethyl-3.4-dicholor-benzyl ammoniumchloride | |
| Octylphenoxyethoxyethyl dimethyl-benzyl ammonium chloride | |
| Octylcresoxyethoxyethyl dimethyl-benzyl ammonium chloride | |
| Cocoamidopropyl PG-dimonium chloridephosphate | |
| 2-Hydroxyethylbenzyl stearyl imidazolinium chloride | |
| 2-Hydroxyethylbenzyl coco imidazolinium chloride | |
| Ethyl bis(polethoxyethanol)alkyl ammonium chloride | |
| Diethyl heptadecyl imidazolinium ethylsulfate | |

What is claimed is:

1. A nanopartitioned combustible liquid hydrocarbon fuel-water mixture consisting essentially of water and liquid hydrocarbon fuel, with a proviso that surface-active substances, including surfactants, are excluded, the hydrocarbon fuel being dispersed in the water as hydrocarbon molecular aggregations having a diameter less than about 100 Å, produced by a process comprising the steps of:

a) forming a supercritical fuel-water mixture; and b) emitting the supercritical fuel-water mixture from a nozzle, whereby the temperature and pressure of the supercritical fuel-water mixture is reduced at a rate that causes hydrocarbon fuel of the supercritical fuel-water mixture to precipitate, thereby forming the nanopartitioned combustible liquid hydrocarbon fuel-water mixture.

\* \* \* \* \*